United States Patent
Bi et al.

(10) Patent No.: US 10,708,673 B2
(45) Date of Patent: Jul. 7, 2020

(54) SYSTEMS AND METHODS FOR VIDEO PROCESSING

(71) Applicants: QUALCOMM Incorporated, San Diego, CA (US); Ning Bi, San Diego, CA (US); Fan Ling, Shanghai (CN); Jingting Ding, Shanghai (CN); Yu Sun, Hangzhou (CN)

(72) Inventors: Ning Bi, San Diego, CA (US); Fan Ling, Shanghai (CN); Jingting Ding, Shanghai (CN); Yu Sun, Hangzhou (CN)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 15/758,881

(22) PCT Filed: Sep. 25, 2015

(86) PCT No.: PCT/CN2015/090684
§ 371 (c)(1),
(2) Date: Mar. 9, 2018

(87) PCT Pub. No.: WO2017/049577
PCT Pub. Date: Mar. 30, 2017

(65) Prior Publication Data
US 2018/0295428 A1    Oct. 11, 2018

(51) Int. Cl.
*H04N 21/845*    (2011.01)
*G06F 16/71*    (2019.01)
(Continued)

(52) U.S. Cl.
CPC ......... *H04N 21/8455* (2013.01); *G06F 16/71* (2019.01); *G06F 16/739* (2019.01);
(Continued)

(58) Field of Classification Search
None
See application file for complete search history.

(56) References Cited

U.S. PATENT DOCUMENTS

| 6,219,837 | B1 * | 4/2001 | Yeo ................... G06F 17/30843 |
| | | | 348/564 |
| 6,549,643 | B1 | 4/2003 | Toklu et al. |
| (Continued) | | | |

FOREIGN PATENT DOCUMENTS

| CN | 100557604 C | 11/2009 |
| CN | 102156707 A | 8/2011 |
| (Continued) | | |

OTHER PUBLICATIONS

Wikipedia: "Background Subtraction," Retrieved from internet on Mar. 30, 2018, https://en.wikipedia.org/wiki/Background_subtraction, pp. 1-7.
(Continued)

*Primary Examiner* — Jason K Lin
(74) *Attorney, Agent, or Firm* — Moore IP

(57) ABSTRACT

A system and method of video processing are disclosed. In a particular implementation, a device includes a processor configured to generate index data for video content. The index data includes a summary frame and metadata. The summary frame is associated with a portion of the video content and illustrates multiple representations of an object included in the portion of the video content. The metadata includes marker data that indicates a playback position of the video content. The playback position is associated with the summary frame. The device also includes a memory configured to store the index data.

35 Claims, 17 Drawing Sheets

(51) Int. Cl.
| | |
|---|---|
| G06F 16/738 | (2019.01) |
| G06F 16/74 | (2019.01) |
| H04N 21/8549 | (2011.01) |
| H04N 21/234 | (2011.01) |
| H04N 21/2343 | (2011.01) |
| H04N 21/81 | (2011.01) |
| H04N 21/2187 | (2011.01) |
| G06F 16/783 | (2019.01) |
| H04N 21/4725 | (2011.01) |
| H04N 7/18 | (2006.01) |
| G06K 9/00 | (2006.01) |
| H04N 21/472 | (2011.01) |

(52) U.S. Cl.
CPC ........ *G06F 16/743* (2019.01); *G06F 16/7837* (2019.01); *G06K 9/00744* (2013.01); *H04N 7/18* (2013.01); *H04N 7/188* (2013.01); *H04N 21/2187* (2013.01); *H04N 21/23418* (2013.01); *H04N 21/234318* (2013.01); *H04N 21/4725* (2013.01); *H04N 21/47217* (2013.01); *H04N 21/8153* (2013.01); *H04N 21/8453* (2013.01); *H04N 21/8549* (2013.01); *G06K 2009/00738* (2013.01)

(56) References Cited

U.S. PATENT DOCUMENTS

| | | | |
|---|---|---|---|
| 7,577,199 | B1 | 8/2009 | Herz |
| 7,619,647 | B2 | 11/2009 | Wren et al. |
| 8,036,263 | B2 | 10/2011 | Wang et al. |
| 8,335,345 | B2 | 12/2012 | White et al. |
| 8,345,923 | B2 | 1/2013 | Garoutte |
| 8,462,212 | B1 | 6/2013 | Kundu et al. |
| 8,743,204 | B2 | 6/2014 | Carbonell et al. |
| 2004/0064691 | A1 | 4/2004 | Lu et al. |
| 2004/0085483 | A1 | 5/2004 | Li et al. |
| 2004/0197088 | A1* | 10/2004 | Ferman ............... G06F 3/0481 386/251 |
| 2005/0046699 | A1 | 3/2005 | Oya et al. |
| 2005/0185823 | A1* | 8/2005 | Brown ............ G08B 13/19604 382/103 |
| 2005/0232606 | A1 | 10/2005 | Hosoda et al. |
| 2005/0281535 | A1 | 12/2005 | Fu et al. |
| 2007/0061727 | A1 | 3/2007 | Boregowda et al. |
| 2007/0212023 | A1 | 9/2007 | Whillock |
| 2008/0059178 | A1 | 3/2008 | Yamamoto et al. |
| 2010/0011297 | A1* | 1/2010 | Tsai ..................... G06F 16/739 715/721 |
| 2012/0062732 | A1* | 3/2012 | Marman .................. H04N 7/18 348/142 |
| 2014/0211987 | A1 | 7/2014 | Fan et al. |
| 2014/0270708 | A1* | 9/2014 | Girgensohn ............. H04N 9/79 386/282 |
| 2014/0333775 | A1 | 11/2014 | Naikal et al. |
| 2015/0002665 | A1 | 1/2015 | Sentinelli et al. |
| 2015/0104149 | A1 | 4/2015 | Sim et al. |
| 2015/0318020 | A1* | 11/2015 | Pribula ............ H04N 21/43615 386/227 |
| 2016/0005281 | A1* | 1/2016 | Laska ..................... H04N 7/18 348/143 |
| 2016/0133297 | A1* | 5/2016 | Thornton ............... G11B 27/06 386/230 |
| 2016/0232234 | A1* | 8/2016 | Baek ................. G06F 17/30793 |
| 2016/0358436 | A1* | 12/2016 | Wautier ........... G08B 13/19667 |
| 2017/0040036 | A1* | 2/2017 | Ryu ..................... G11B 27/031 |
| 2017/0064413 | A1* | 3/2017 | Nayak ................ H04N 21/8133 |
| 2019/0035091 | A1 | 1/2019 | Bi et al. |

FOREIGN PATENT DOCUMENTS

| | | |
|---|---|---|
| CN | 202003350 U | 10/2011 |
| CN | 103761284 A | 4/2014 |
| CN | 104284158 A | 1/2015 |
| CN | 104581437 A | 4/2015 |
| EP | 1184810 A2 | 3/2002 |
| JP | 2005210573 A | 8/2005 |
| JP | 2006121475 A | 5/2006 |
| JP | 2007019769 A | 1/2007 |
| JP | 2008154100 A | 7/2008 |
| JP | 2009212711 A | 9/2009 |
| JP | 2010166288 A | 7/2010 |
| JP | 2010187046 A | 8/2010 |
| JP | 2012248070 A | 12/2012 |
| JP | 2013148973 A | 8/2013 |
| KR | 20150084567 A | 7/2015 |
| WO | 2007120337 A2 | 10/2007 |
| WO | 2015108236 A1 | 7/2015 |

OTHER PUBLICATIONS

Correa C.D., et al., "Dynamic Video Narratives", ACM Transactions on Graphics, 2010, vol. 29, No. 3, 9 Pages.

International Search Report and Written Opinion—PCT/CN2015/090684—ISA/EPO—dated Jan. 7, 2016.

Kamoji S., et al., "Key Frame Extraction for Video Summarization Using Motion Activity Descriptors," IJRET: International Journal of Research in Engineering and Technology, Mar. 2014, vol. 3 (3), pp. 491-495.

Techradar, "Mastering Drama Shot on the Galaxy S4 and Note 3", Retrieved from: http://www.techradar.com/us/news/phone-and-communications/mobile-phones/Mastering-Drama-Shot-on-the-GALAXY-S4-and-Note-3/articleshow/38706319.cms on Jun. 30, 2015, 5 Pages.

Zhang X.D., et al., "Dynamic Selection and Effective Compression of Key Frames for Video Abstraction," Pattern Recognition Letters, 2003, vol. 24, pp. 1523-1532.

Stringa E., et al., "Real-Time Video-Shot Detection for Scene Surveillance Applications", Jan. 1, 2000 (Jan. 1, 2000), pp. 69-79, XP055583893, DOI: 10.1109/83.817599Retrieved from the Internet: URL:http://dx.doi.org/10.1109/83.817599 [retrieved on Apr. 26, 2019], Section III, pp. 74-75, Figures 1,12.

Gallo N., et al., Fast Dynamic Video Content Exploration, 2013 IEEE International Conference on Technologies for Home1 and Security (HST), IEEE, Nov. 12, 2013, pp. 271-277, URL, https://ieeexplore.ieee.org/stamp/stamp.jsp?tp=&arnumber=6699013.

Ryall K., et al., "Temporal Magic Lens: Combined Spatial and Temporal Query and Presentation", Sep. 12, 2005 (Sep. 12, 2005), International Conference on Simulation, Modeling, and Programming for Autonomous Robots, Simpar 2010, [Lecture Notes in Computer Science, LECT.Notes Computer], Springer, Berlin, Heidelberg, pp. 809-822, XP047447486, ISBN: 978-3-642-17318-9.

Shah R., et al., "Interactive Video Manipulation Using Object Trajectories and Scene Backgrounds", IEEE Transactions on Circuits and Systems for Video Technology, IEEE, Sep. 2013, pp. 1565-1576, URL, https://leeexplore.ieee.org/stamp/stamp.jsp?tp=&amumber=6470667.

Supplementary European Search Report—15904453—Search Authority—Munich—Feb. 20, 2019.

* cited by examiner

SYSTEMS AND METHODS FOR VIDEO PROCESSING

I. FIELD

The present disclosure is generally related to video processing.

II. DESCRIPTION OF RELATED ART

In video surveillance systems, such as a closed circuit television (CCTV) system, a camera may be mounted in a fixed position. Video content (e.g., a video stream) generated by the camera may be uneventful most of the time with no movement within a field of view of the camera. Multiple options may be available to locate events of interest (e.g., movement) in a recorded video stream. For example, an event of interest may be identified in the recorded video stream by playing the recorded video in a fast forward mode. As other examples, an event of interest may be identified by generating a summary clip of the video stream by skipping frames when encoding (e.g., encoding every $n^{th}$ frame of the video stream, where n is an integer) or by generating a time-lapse video of the recorded video stream. Each of these options may be inefficient and time consuming.

III. SUMMARY

In a particular aspect, a device includes a processor configured to generate index data for video content, the index data including a summary frame and metadata. The summary frame is associated with a portion of the video content and illustrates multiple representations of an object included in the portion of the video content. The metadata includes marker data that indicates a playback position of the video content. The playback position is associated with the summary frame. The device further includes a memory configured to store the index data In another particular aspect, a device includes a display configured to present a summary frame. The summary frame illustrates multiple representations of an object included in a portion of video content. The device also includes a processor configured to identify a playback position corresponding to the portion of the video content. The playback position is identified based on the summary frame. The processor is further configured to initiate playback of the video content at the playback position.

In another particular aspect, an apparatus includes a display configured to present a graphical user interface (GUI). The GUI includes a summary frame that illustrates a first set of representations of an object. The apparatus also includes a processor electrically coupled to the display and configured to receive a selection indicating a particular representation of the first set of representations.

In another particular aspect, an apparatus includes means for presenting a summary frame that illustrates multiple representations of an object included in a portion of video content. The apparatus also includes means for identifying a playback position corresponding to the portion of the video content. The playback position is identified based on the summary frame. The apparatus further includes means for initiating playback of the video content at the playback position.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1A:
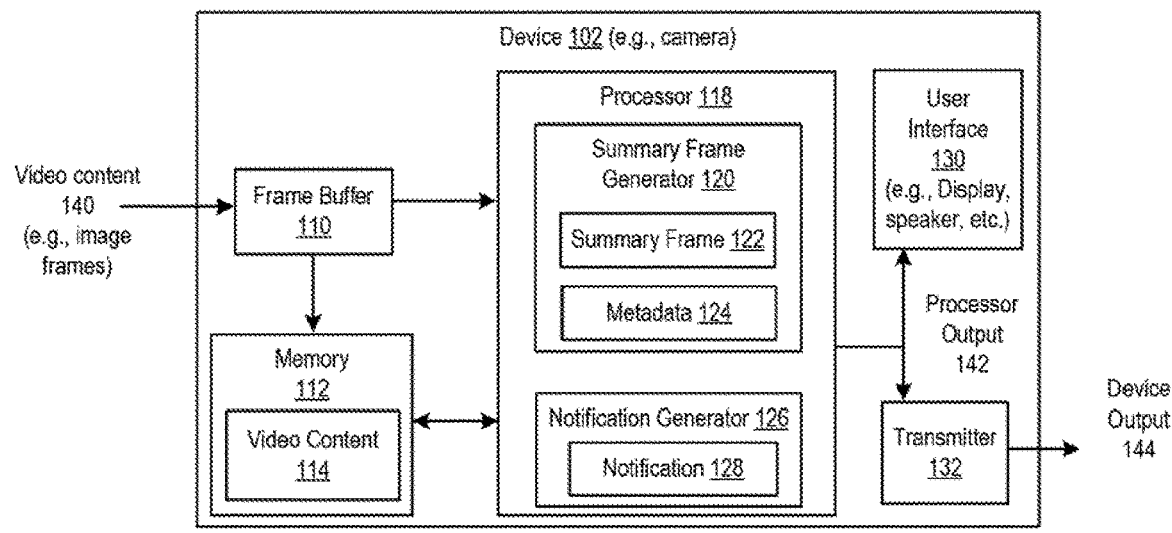
FIG. 1A is a block diagram of a first illustrative system for processing image data to generate a summary frame.
Figure 1A:
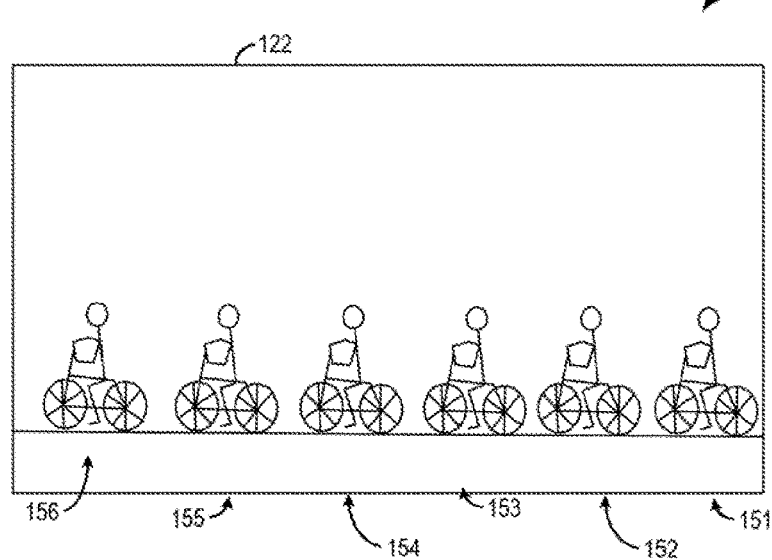

Particular aspects of the present disclosure are described below with reference to the drawings. In the description, common features are designated by common reference numbers throughout the drawings. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term).

The present disclosure describes methods of processing video content, such as a video stream (e.g., a video segment), to generate a summary frame (e.g., an image) that summarizes a portion of the video content. For example, the video content may capture an event, such as a motion event associated with an object (e.g., a person, a car, etc.). The video content may be provided to an image processing device that identifies a beginning and an end of a motion event period (of the event) within the video content. For example, the motion event period may be associated with the object entering and exiting a field of view of the camera. The image processing device may generate a summary frame associated with at least a portion of the video content. The summary frame may illustrate multiple representations of the object. To illustrate, in response to the end of the motion event period, the summary frame may be generated and sent to a device (e.g., a remote device) to enable a user to quickly view a single image that summarizes movement of the object in the video content during the motion event period.

The image processing device may be included in a camera or a video playback device, as illustrative, non-limiting examples. In some implementations, the image processing device may be included in a video surveillance system and may be used to index a video sequence, such as a video sequence that includes one or more motion events. In some implementations, the summary frame may be included in a notification that also includes an identifier associated with the portion of the video content that corresponds to the event (e.g., the motion event period). For example, the identifier may be included in metadata that is embedded in the summary frame. The identifier may enable the device to request the portion of the video content from the video surveillance system.

In some implementations, the image processing device may generate a notification that includes multiple "concatenated" summary frames. For example, the image processing device may generate a first summary frame corresponding to a first motion event period and may generate a second summary frame corresponding to a second motion event period. The first motion event period may be associated with a first portion of first video content captured by a first camera and the second motion event period may be associated with a second portion of second video content captured by a second camera. Alternatively, the first motion event period and the second motion event period may be associated portions of video content captured by a single camera. In some implementations, a concatenated summary frame may include a first set of representations of a first object during a first motion event and a second set of representations of a second object during a second motion event. Each set of representations may be superimposed over a common background of the concatenated summary frame. The image processing device may store one or more summary frames, such as the first summary frame and the second summary frame, generated during a time period (e.g., a six hour period) and may send a single notification that includes the one or more summary frames.

By sending the notification that includes a summary frame of a portion of video content, a data size of the notification may be reduced as compared to sending a notification that includes a video clip of the portion the video content. Accordingly, the notification that includes the summary frame (and not the video clip) may be provided more quickly to the device than a notification that includes the video clip. Additionally, by sending the summary frame instead of sending the video clip, a user of the device may quickly review the summary frame, such as a single image, to gain an understanding of activity that occurred during a motion event period (e.g., during the portion of the video content).

Referring to FIG. 1A, an illustrative example of a system 100 operable to generate a summary frame is shown. The system 100 may include a device 102. In some implementations, the device 102 may be included in a video surveillance system, such as a closed circuit television (CCTV) system, as described with reference to FIG. 5. To illustrate, the device 102 may be a camera device, may include a camera, or may include a video system controller. Additionally or alternatively, the device 102 may include or be included in a playback device, such as computer, a laptop, a mobile device, a vehicle, or a server, as illustrative, non-limiting examples. The techniques described herein may be used with electronic devices, mobile devices, vehicles, gaming consoles, automotive system consoles (e.g., ADAS), wearable devices (e.g., personal mounted cameras), head mounted displays (HMDs), etc. Additional examples include, but are not limited to, robots or robotic devices, unmanned aerial vehicles (UAVs), and drones. Examples of vehicles can include a motor vehicle (e.g., a car, a truck, a motorcycle, a bus, or a train), a watercraft (e.g., a ship or a boat), an aircraft (e.g., an airplane or a helicopter), a spacecraft (e.g., a space shuttle), a bicycle, or another vehicle. A vehicle may be a wheeled vehicle, a tracked vehicle, a railed vehicle, an airborne vehicle, or a skied vehicle, as illustrative non-limiting examples. In some cases, a vehicle may be operated by one or more drivers. In other cases, a vehicle may be a computer-controlled vehicle, such as an autonomous vehicle. Furthermore, although one or more aspects may be described herein as including operations being performed at a device, it should be understood that in other examples such operations can be performed in the "cloud."

The device 102 may be configured to receive video content 140 (e.g., a video sequence), such as one or more image frames including image data. The video content 140 (e.g., image data) may be received from a capture unit (not shown) that includes a lens. For example, the capture unit may include or may be part of a camera. The capture unit may be configured to acquire a video frame sequence, such as the video content 140. In some implementations, each video frame of the video frame sequence may have a corresponding frame index. In some implementations, the device 102 may include the capture unit, as described with reference to FIGS. 1B-1C.

The device 102 may include a frame buffer 110, a memory 112, a processor 118, a user interface 130, and a transmitter 132. The frame buffer 110 may be configured to store one or more frames of the video content 140 (e.g., one or more frames of the video frame sequence), a frame timestamp, a frame sequence index value, or a combination thereof, as illustrative, non-limiting examples. In some implementations, the frame buffer 110 may be coupled to an image capture unit that generates the video content 140. As used herein, "coupled" may include "communicatively coupled," "electrically coupled," or "physically coupled," and combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signal) directly or indirectly, such as via one or more wires, buses, networks, etc. For example, the frame buffer 110 may be in electrical communication with an image capture device. As another example, the frame buffer 110 may receive the video content 140 from a storage device, such as a memory, that is coupled to or included in the device 102. To illustrate, the storage device may be external to the device 102 and may be coupled to the device 102 via a network, such as a wired network, a wireless network, or a combination thereof. As another example, the storage device may be removably coupled to the device 102. To illustrate, the memory device may include a memory card, such as a secure digital (SD) card, that may be physically coupled to the device 102.

The memory 112 may be coupled to the frame buffer 110 and may be configured to store video content 114, such as at least a portion of the video content 140, indices associated with at least the portion of the video content 140 (e.g., a video frame sequence), or a combination thereof. For example, the video content 114 may include a first frame and a second frame, and the memory 112 may store first data (e.g., a first frame index) associated with the first frame and second data (e.g., a second frame index) associated with the second frame. Additionally or alternatively, the memory 112 may be configured to store indices of video frame sequences (e.g., multiple video frame sequences), such as a first video frame sequence index and a second video frame sequence index. In some implementations, the video content 140 may be received at the frame buffer 110 and the memory 112 in parallel. Although the frame buffer 110 and the memory 112 are described as being separate, in other implementations, the memory 112 may include the frame buffer 110. In some implementations, the video content 114 may be associated with one or more portions of the video content 140 in which motion (e.g., a motion event) is detected, as described with reference to FIG. 2. Although the memory 112 is illustrated as being included in the device 102, in other implementations, the memory 112 may be external to the device 102 or removably coupled to the device 102. For example, the memory 112 may include a memory card or other removable storage device, such as a universal serial bus (USB) drive.

The processor 118 may be electrically coupled, communicatively coupled, or both, with the frame buffer 110. For example, the processor 118 may be in electrical communication with the frame buffer 110. The processor 118 may include a digital signal processor (DSP), central processing unit (CPU), a graphical processing unit (CPU), or a combination thereof as illustrative, non-limiting examples.

The processor 118 may include a summary frame generator 120 and a notification generator 126. The summary frame generator 120 may be configured to generate a summary frame 122, metadata 124, or both. The summary frame 122 may provide a visual summary of the portion of the video content 140 in which a motion event is detected. For example, the summary frame 122 may illustrate multiple representations of an object detected as moving in the portion of the video content, as described further herein. The object may be associated with or correspond to one or more detected blobs. The multiple representations of the object included in the summary frame 122 may correspond to key frames selected from the portion of the video content 140, as described with reference to FIGS. 2-5. In some implementations, the processor 118 may be configured to initiate production of the summary frame 122 based on a motion event across multiple video frames in the video content 140 (e.g., multiple frames in a video frame sequence), as described further herein.

For example, the processor 118 may combine a first representation of the object from a first frame of the portion of the video content 140 and a second representation of the object from a second frame of the portion of the video content 140 to generate the summary frame 122. To illustrate, an example of the summary frame 122 is depicted at 150. The example 150 of the summary frame 122 provides a visual summary of a portion of the video content 140, such as a summary of a person and a bike. For example, the summary frame 122 may provide a single-frame visual summary of a motion event. To illustrate, the summary frame 122 may depict multiple representations 151-156 of the person and the bike. Each of the multiple representations 151-156 may correspond to a different frame selected from the portion of the video content 140. For example, the first representation 151 may correspond to a first frame associated with a first frame index of a video frame sequence, the second representation 152 may correspond to a second frame associated with a second frame index of the video frame sequence, etc. In some implementations, each of the first frame and the second frame may each be associated with a key frame corresponding to the motion event. The summary frame generator 120 may be configured to select one or more key frames, as described with reference to FIGS. 2-4. In some examples, the multiple representations may be presented (e.g., using coloring, textures, shading, etc.) such that a user can determine the movement direction of the person and bike. In other examples, each representation may include an indicator, such as a numerical value, a letter, an arrow, etc., that indicates a sequence of the multiple representations in time. Although each of multiple representations 151-156 is illustrated as being separate (e.g., non-overlapping) in the example 150, in other implementations, a first representation may at least partially overlap a second representation, where the first representation is associated with a first frame that occurs earlier or later in a sequence of frames than a second frame associated with the second representation.

Referring to the device 102, the metadata 124 may include a file name corresponding to the video content 140, a summary frame identifier, a date or time the video content 140 was generated, a date or time the summary frame 122 was generated, a motion event start time, a motion event end time, a motion event duration, an identifier of a video segment (e.g., a video clip corresponding to the motion event period), an indication of a frame used to generate a representation of the object included in the summary frame 122, a capture unit identifier (e.g., a camera identifier) associated with the capture unit that generated the video content 140, a camera location, a link (e.g., a uniform resource locator (URL)) to a storage location of the memory 112 where the video content 114 is stored, or a combination thereof. To illustrate, the metadata 124 may include the associated first frame index (corresponding to the first representation 151) and the associated second frame index (corresponding to the second representation 152). In some implementations, the metadata 124 may be included in (e.g., embedded in) the summary frame 122. Additionally or alternatively, in some implementations, the metadata 124 may include environmental information (e.g., weather conditions during generation of the video content 140), semantic information (e.g., event identification), object identification information, scene classification information, or a combination thereof. If the memory 112 stores the video content 114 that corresponds to the portion of the video content 140 used to generate the summary frame 122, the metadata 124 may be included in or stored with the video content 114.

The notification generator 126 may be configured to generate a notification 128 associated with the summary frame 122. The notification 128 may include an indication that a particular motion event has begun, an indication that the summary frame 122 is being generated, an indication that the motion event has ended, an indication that the summary frame 122 has been generated, an indication of a duration of the motion event, the summary frame 122, the metadata 124, or a combination thereof, as illustrative, non-limiting examples. For example, the notification generator 126 may generate the notification 128 in response to the summary frame 122 being generated by the summary frame generator 120. In some implementations, the notification 128 may include an email or a short message service (SMS) message, as illustrative, non-limiting examples.

The processor 118 may be communicatively coupled, electrically coupled, or both, to the user interface 130, the transmitter 132, or both. For example, the processor 118 may be in electronic communication with the user interface 130, the transmitter 132, or both. The processor 118 may be configured to provide a processor output 142 to the user interface 130, the transmitter 132, or both. The user interface 130 may be configured to generate an output associated with the summary frame 122, the metadata 124, the notification 128, or a combination thereof. To illustrate, the user interface 130 may include a display (e.g., a screen or a touch screen), a transducer, such as a speaker (e.g., a loudspeaker), a light (e.g., a light emitting diode (LED)), etc. if the user interface 130 includes the screen, the screen may be configured to display the summary frame 122, the notification 128, or a combination thereof. As another example, if the user interface 130 includes the loudspeaker, the loudspeaker may be configured to play a sound associated with the completion of generation of the summary frame 122. As a further example, if the user interface 130 includes a light, the light may be configured to be illuminated in response to completion of the generation of the summary frame 122.

The transmitter 132 may be configured to provide a device output 144, such as a notification signal indicating a summary frame (e.g., the summary frame 122) is being generated or has been generated. For example, the device output 144 may include the summary frame 122, the metadata 124, the notification 128, or a combination thereof. In some implementations, the transmitter 132 may be included in a transceiver (not shown), such as a transceiver that includes the transmitter 132 and a receiver.

Although the user interface 130 and the transmitter 132 are described as being included in the device 102, in other implementations, one or both of the user interface 130 and the transmitter 132 may be external to the device 102. For example, the user interface 130 may include a display that is external to the device 102.

During operation, the processor 118 may detect a motion event period corresponding to the video content 140 (e.g., multiple image frames). The processor 118 may generate the summary frame 122 that illustrates multiple representations of an object (e.g., the person and the bike). The object may be included in a portion of the video content 140 that corresponds to the motion event period. After the summary frame 122 is generated, the summary frame 122 may be included in the notification 128. The summary frame 122 may be presented via the user interface 130 (e.g., a display) and the notification 128 may be sent, via the transmitter 132, to one or more other devices.

In some implementations, the summary frame generator 120 may be configured to detect a motion event period (e.g., a beginning of a motion event, an end of a motion event, or both) and to generate the summary frame 122 associated with the portion of the video content 140. In this example, the metadata 124 may include a first timestamp associated with a beginning of the motion event period, a second timestamp associated with an end of the motion event period, or a combination thereof.

In some implementations, the notification generator 126 may be configured to generate a notification in response to each summary frame generated by the summary frame generator 120. For example, in response to the summary frame 122, the notification generator 126 may generate the notification 128 that includes the summary frame 122 (e.g., a single summary frame), as described with reference to FIG. 1B. In other implementations, the notification generator 126 may "concatenate" multiple summary frames into a notification (e.g., a single notification), as described with reference to FIG. 1C. For example, the notification generator 126 may generate a notification for a time period (e.g., a programmable time period) and may include each summary frame generated for the time period in the notification. In some implementations, concatenation of different summary frames may be based on different programmable time periods. To illustrate, a first programmable time period may correspond to an hour. In response to the first programmable time period elapsing, the notification generator 126 may generate a notification that includes each summary frame generated during the first programmable time period. As another example, a second programmable time period may correspond to eight hours.

In some implementations, the processor 118 may be configured to index the video content 140 (or the video content 114) to generate indexed video content. For example, the video content 140 or the video content 114 may be indexed according to a first particular frame corresponding to the beginning of a motion event period, one or more frames associated with the motion event period and used to generate the summary frame 122, a second particular frame corresponding to the end of the motion event period, or a combination thereof. As another example, the video content 140 (or the video content 114) may be indexed based on an offset applied to the first particular frame, one or more of the frames associated with the motion event period and used to generate the summary frame 122, the second particular frame, or a combination thereof. To illustrate, the video content 140 (or the video content 114) may be indexed using a frame at a first offset value (e.g., sixty frames) before the first particular frame corresponding to the beginning of the motion event period and using another frame at a second offset value (e.g., thirty frames) after the second particular frame corresponding to the end of the motion event period. In some implementations, the processor 118 may store the indexed video content at the memory 112. Additionally or alternatively, the processor 118 may be configured to store a video segment (e.g., a video clip) associated with the motion event period at the memory 112. For example, the video segment may be stored at the memory 112 separate from (in addition to or instead of) the indexed video content.

In some implementations, the processor 118 may include a video encoder that is configured to compress the video content 140 (or the video content 114), the summary frame 122, or both, as described with reference to FIGS. 1B-1C. For example, the video encoder of the processor 118 may be configured to encode the summary frame 122 to generate an encoded file representative of the summary frame 122. In some implementations, the encoded file may include metadata e.g., at least a portion of the metadata 124) associated with the summary frame 122.

By generating the summary frame 122, a single image frame may be generated that summarizes a portion of the video content 140 that is "of interest" due to motion occurring in the portion of the video content 140. The summary frame 122 may enable a user to quickly review the summary frame 122 to gain an understanding of motion activity that occurred during the portion of the video content. Additionally, by including the summary frame 122 in the notification 128 that is sent to another device, a data size of the notification 128 may be reduced as compared to sending a notification that includes the portion (e.g., a video clip) of the video content. Accordingly, the notification 116 that includes the summary frame 122 (and not the video clip) may be provided more quickly to another device than a notification that includes the video clip.

Figure 1B:
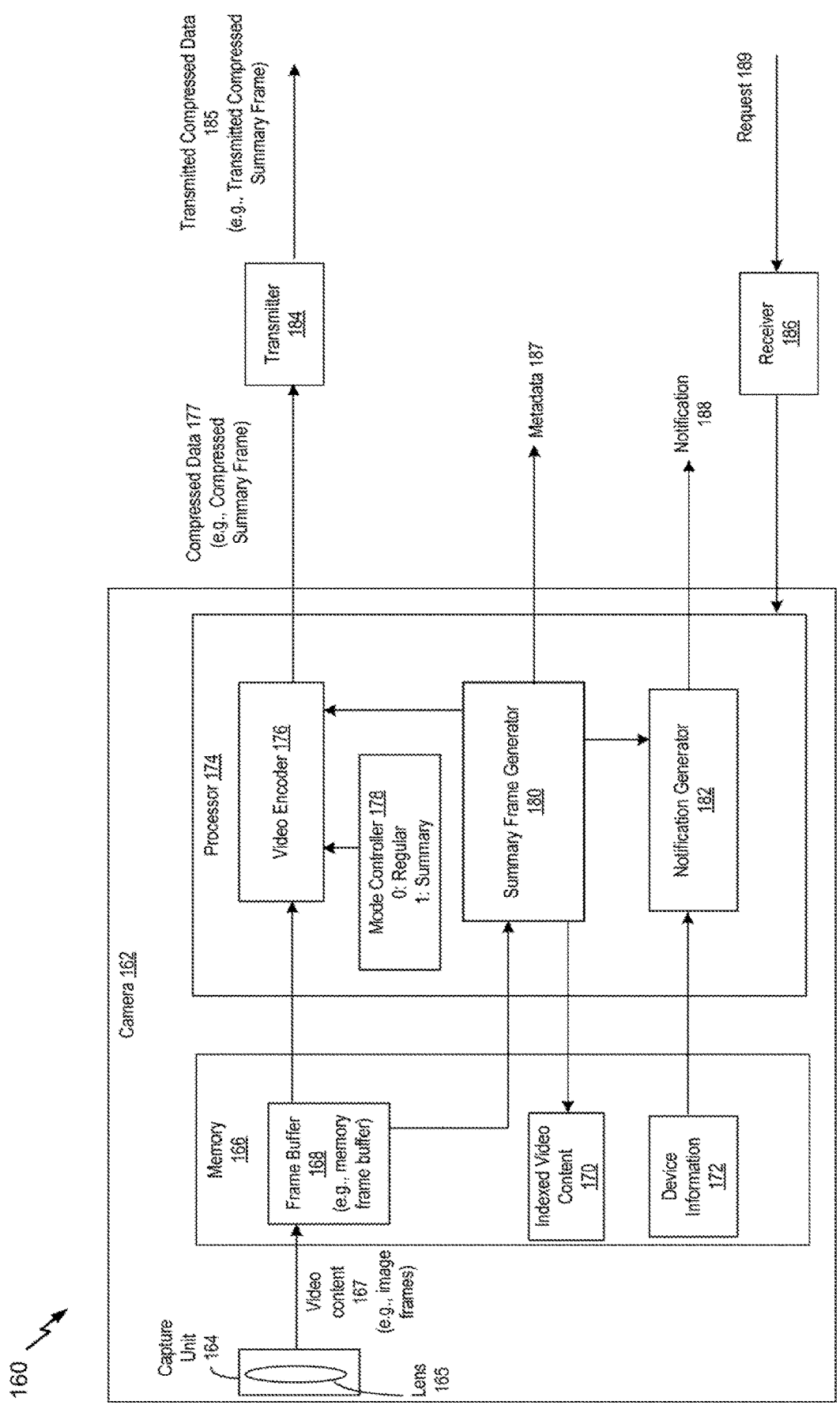
FIG. 1B is a block diagram of a second illustrative system for processing image data to generate a summary frame.

Referring to FIG. 1B, an illustrative example of a system 160 operable to generate a summary frame is shown. The system 160 may include or correspond to the system 100 of FIG. 1A.

The system 160 may include a camera 162, a transmitter 184, and a receiver 186. The camera 162 may include or correspond to the device 102 of FIG. 1. In some implementations, the transmitter 184 and the receiver 186 may be included in the same device, such as a transceiver. Although each of the transmitter 184 and the receiver 186 is described as being separate from the camera 162, in other implementations, the transmitter 184, the receiver 186, or both may be included in the camera 162. In some implementations, the camera 162 may include an Internet protocol (IP) camera, as an illustrative, non-limiting example.

The camera 162 may include a capture unit 164, a memory 166, and processor 174. The capture unit 164 may include a lens 165. The capture unit 164 may be configured to acquire a video frame sequence, such as video content 167 (e.g., image data). In some implementations, each video frame of the video frame sequence may have a corresponding frame index.

The memory 166 may include or correspond to the memory 112 of FIG. 1A. The memory 166 may include a frame buffer 168, indexed video content 170, and device information 172. The frame buffer 168 may include or correspond to the frame buffer 110 of FIG. 1. The indexed video content 170 may include or correspond to at least a portion of the video content 167 that is indexed using one or more summary frames, as described further herein. Additionally or alternatively, the indexed video content 170 may be indexed using one or more frames (e.g., key frames) of the video content 167 that are selected by a summary frame generator 180 to be used to generate a summary frame, as described further herein.

The device information 172 may be associated with one or more devices coupled (e.g., communicatively coupled) to the camera 162. Each of the one or more devices may be configured to receive data from the camera 162. For example a first device of the one or more devices may be remotely located from the camera 162 and configured to receive, from the camera 162, the video content 167, one or more summary frames, one or more notifications, a portion of the indexed video content 170, or a combination thereof. For each of the one or more devices, the device information 172 may include data that indicates a device address (e.g., an email address, a telephone number, an Internet protocol (IP) address, an account number, a profile, etc.) associated with the device, authentication information (e.g., user name, password, account number, etc.), authorization information (e.g., user rights), or a combination thereof, as illustrative, non-limiting examples. A device address of a particular device may enable the camera 162 to send data to the particular device. The authentication information may enable the camera 162 to authenticate the particular device in response to a request from the particular device to access video content (e.g., the video content 167 or the indexed video content 170) generated or stored at the camera 162. The authorization information may indicate data that may be provided to the particular device.

The processor 174 may include or correspond to the processor 118 of FIG. 1A. The processor may include the summary frame generator 180, a notification generator 182, a video encoder 176, and a mode controller 178. The summary frame generator 180 and the notification generator 182 may include or correspond to the summary frame generator 120 and to the notification generator 126, respectively, of FIG. 1A. The summary frame generator 180 may be configured to generate one or more summary frames, metadata 187, or a combination thereof. The one or more summary frames may include or correspond to the summary frame 122 of FIG. 1A. The metadata 187 may include or correspond to the metadata 124 of FIG. 1A. The summary frame generator 180 may be configured to provide the one or more summary frames to the video encoder 176, to the notification generator 182, to the memory 166 for storage, or to an indexer that is configured to index the video content 167 to generate the indexed video content 170. Additionally or alternatively, the summary frame generator 180 may be configured to provide the metadata 187 to the notification generator 182, to the indexer, or to the memory 166 for storage.

The notification generator 182 may be configured to generate one or more notifications, such as a notification 188. The notification 188 may include or correspond to the notification 128 of FIG. 1. In some implementations, the notification generator 182 may generate the notification 188 based on the device information 172. For example, the notification generator 182 may generate the notification 188 to be provided to a particular device e.g., to an address of the particular device) based on the device information 172.

The video encoder 176 may be configured to encode (e.g., compress) image data, such as video data. For example, the video encoder 176 may be configured to compress the video content 167, the indexed video content 170, or a summary frame generated by the summary frame generator 180.

The mode controller 178 may be configured to control whether the video encoder 176 compresses a summary frame generated by the summary frame generator 180 or compresses video content, such as the video content 167 or the indexed video content 170. In some implementations, the mode controller 178 may include a register that stores a value indicative of a mode of the camera 162. The mode controller 178 may be configured to control whether the video encoder 176 compresses the summary frame or compresses a video frame sequence, such as the video content 167. For example, if the value is zero, the camera 162 may be in a first mode in which the video encoder 176 is configured to encode the video content 167. If the value is one, the camera 162 may be in a second mode in which the video encoder 176 is configured to encode one or more summary frames generated by the summary frame generator 180. In the second mode, the summary frame generator 180 may be configured to generate a summary frame based on detecting an end of a motion event, as described with reference to FIG. 2. Additionally or alternatively, in the second mode, the notification generator 182 may be configured to generate one or more notifications, where each notification includes a single summary frame. For example, the notification generator 182 may generate a particular notification in response to the summary frame generator 180 generating a particular summary frame.

Although the mode controller 178 is described as having two modes, in other implementations, the mode controller 178 may include a single mode or more than two modes. Additionally or alternatively, the mode controller 178 may include a mode other than the modes described with reference to FIG. 1B. For example, the mode controller 178 may include a concatenation mode, as described with reference to FIG. 1C. The concatenation mode may cause the summary frame generator 180 to generate one or more summary frames based on a time period, such as a programmable time period. To illustrate, in response to expiration of a particular time period, the summary frame generator 180 may analyze a portion of the video content 167 generated during the particular time period to generate one or more summary frames based on the portion of the video content 167. For example, the summary frame generator 180 may generate at least one summary frame for each motion event detected in the portion of the video content 167. In some implementations, the notification generator 182 may generate the single notification 188 to include each of the one or more summary frames generated based on the portion of the video content 167. The concatenation mode may also enable the video encoder 176 to compress one or more summary frames generated by the summary frame generator 180 based on the portion of the video content 167. To illustrate, in some implementations, the video encoder 176 may compress multiple summary frames generated by the summary frame generator 180.

Although the mode controller 178 is described as being included in the processor 174, in other implementations, the mode controller 178 may separate from the processor. In such implementations, the mode controller 178 may be electrically coupled, or communicatively coupled, or both, to the processor 174, one or more components of the processor 174, or a combination thereof. For example, the mode controller 178 may be in electrical communication with the processor 174.

The camera 162 may be coupled to the transmitter 184 and to the receiver 186. The transmitter 184 may be configured to transmit data to one or more devices, such as a device that is communicatively coupled to the camera 162 via a wired connection, a wireless connection, or a combination thereof. The data transmitted by the transmitter 184 may include at least a portion of the video content 167, at least a portion of the indexed video content 170, one or more summary frames, at least a portion of the metadata 187, the notification 188, or a combination thereof, as illustrative, non-limiting examples. The data transmitted by the transmitter 184 may include encoded data (e.g., compressed data), un-encoded data (e.g., uncompressed data), or a combination thereof.

The receiver 186 may be configured to receive data from the one or more devices. In some implementations, the data received from the one or more devices may include a request 189, a portion of the device information 172, or a combination thereof, as illustrative, non-limiting examples. To illustrate, in a particular implementation, the receiver 186 may be configured to receive the request 189 for a notification signal (e.g., the notification 188) to be transmitted. As another example, the processor 174 may be configured to receive the request 189 (via the receiver 186) to transmit the metadata 187 associated with a particular summary frame generated by the summary frame generator 180.

Although the transmitter 184 and the receiver 186 are described as being separate from the camera 162, in other implementations, the transmitter 184, the receiver 186, or both, may be included in the camera 162. Although the transmitter 184 and the receiver 186 are described as being separate from each other, in other implementations, the transmitter 184 and the receiver 186 may be included in a transceiver.

During operation, the capture unit 164 may generate the video content 167 and provide the video content 167 to the frame buffer 168. The processor 174 may receive the video content 167 from the frame buffer 168 and may process the video content 167 according to a mode indicated by the mode controller 178. For example, in the first mode, the video encoder 176 may encode the video content 167 to be transmitted to another device via the transmitter 184. In the second mode, the summary frame generator 180 may generate a summary frame based on the video content 167. The video encoder 176 may encode the summary frame to generate compressed data 177, such as a compressed summary frame. The transmitter 184 may receive the compressed data 177 and may provide transmitted compressed data 185 (e.g., a transmitted compressed summary frame) to another device. In some implementations, the summary frame (or a compressed version thereof) may be included in the notification 188.

Figure 1C:
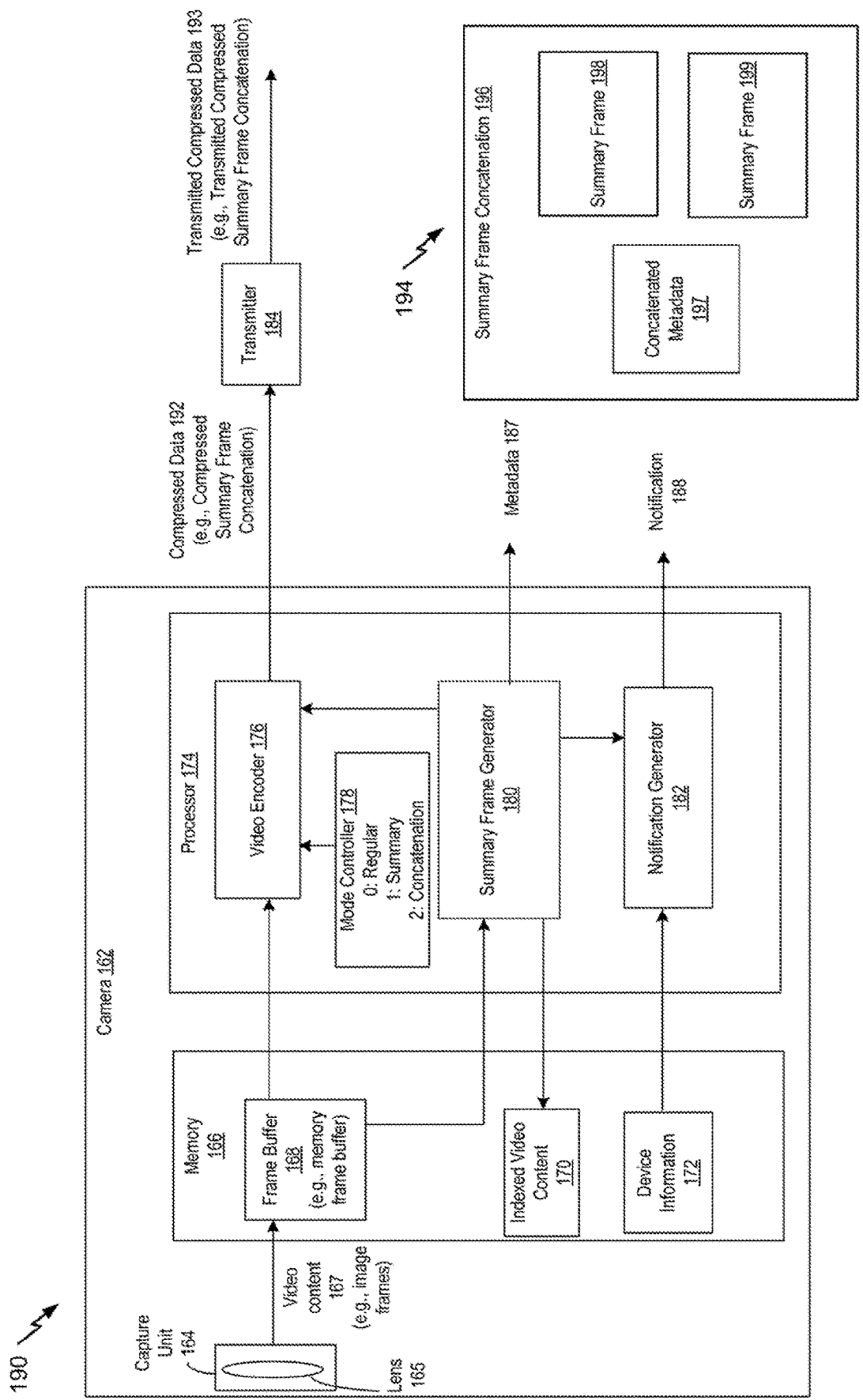
FIG. 1C is a block diagram of a third illustrative system for processing image data to generate a summary frame.

Referring to FIG. 1C, an illustrative example of a system 190 operable to generate a summary frame is shown. The system 190 may include or correspond to the system 100 of FIG. 1A or the system 160 of FIG. 1B.

As described with reference to FIG. 1B, the mode controller 178 may be configured to control whether the video encoder 176 compresses one or more summary frames (generated by the summary frame generator 180) or compresses video content, such as the video content 167 or the indexed video content 170. In some implementations, the mode controller 178 may include a register that stores a value indicative of a mode of the camera 162. For example, if the value is zero, the camera 162 may be in a first mode in which the video encoder 176 is configured to encode the video content 167. If the value is one, the camera 162 may be in a second mode in which the video encoder 176 is configured to encoded individual summary frames generated by the summary frame generator 180. In the example of FIG. 1C, if the value is two, the camera 162 may be in a third mode (e.g., a concatenation mode) in which the video encoder is configured to compress a group of one or more summary frames generated by the summary frame generator 180.

In the third mode, the summary frame generator 180 may generate one or more summary frames based on a time period (e.g., a programmable time period). To illustrate, in response to expiration of a particular time period, the summary frame generator 180 may analyze a portion of the video content 167 generated during the particular time period to generate one or more summary frames based on the portion of the video content 167. In some implementations, the notification generator 182 may generate the notification 188 to include the one or more summary frames generated based on the portion of the video content 167. During the concatenation mode, the video encoder 176 may compress one or more summary frames generated by the summary frame generator 180 based on the portion of the video content 167. For example, in some implementations, the video encoder 176 may compress a concatenation of different summary frames (e.g., multiple summary frames) generated by the summary frame generator 180.

An illustrative example of a summary frame concatenation 196 is depicted at 194. The example 194 of the summary frame concatenation 196 includes a first summary frame 198, a second summary frame 199, and concatenated metadata 197. In some implementations, the first summary frame 198 may be associated with a first motion event included in the video content 167 and the second summary frame 199 may be associated with a second motion event included in the video content 167. The concatenated metadata 197 may include a combination of all or a portion of first metadata corresponding to the first summary frame 198 and second metadata corresponding to the second summary frame 199.

Although summary frame concatenation 196 is described as including multiple distinct summary frames, in other implementations, the summary frame concatenation 196 may include a single concatenated summary frame. To illustrate, the first summary frame 198 may include a first set of representations of a first object and the second summary frame 199 may include a second set of representations of a second object. The concatenated summary frame may include the first set of representations of the first object and the second set of representations of the second object. The first set of representations of the first object and the second set of representations of the second object may be presented on a common background of the concentrated summary frame. In some implementations, the summary frame concatenation 196 may correspond to the notification 188.

During operation of the system 190, the capture unit 164 may generate the video content 167 and provide the video content 167 to the frame buffer 168. The processor 174 may receive the video content 167 from the frame buffer 168 and may process the video content 167 according to a mode indicated by the mode controller 178. For example, in the third mode, the video encoder 176 may encode one or more summary frames associated with a particular time period. The one or more summary frames may be combined (e.g., included in) a summary frame concatenation, such as the summary frame concatenation 196. The video encoder 176 may encode the summary frame concatenation 196 to generate compressed data 192, such as a compressed summary frame concatenation. The transmitter 184 may receive the compressed data 192 and may provide transmitted compressed data 193 (e.g., a transmitted compressed summary frame concatenation) to another device. In some implementations, the summary frame concatenation 196 (or a compressed version thereof) may be included in the notification 188.

Figure 2:
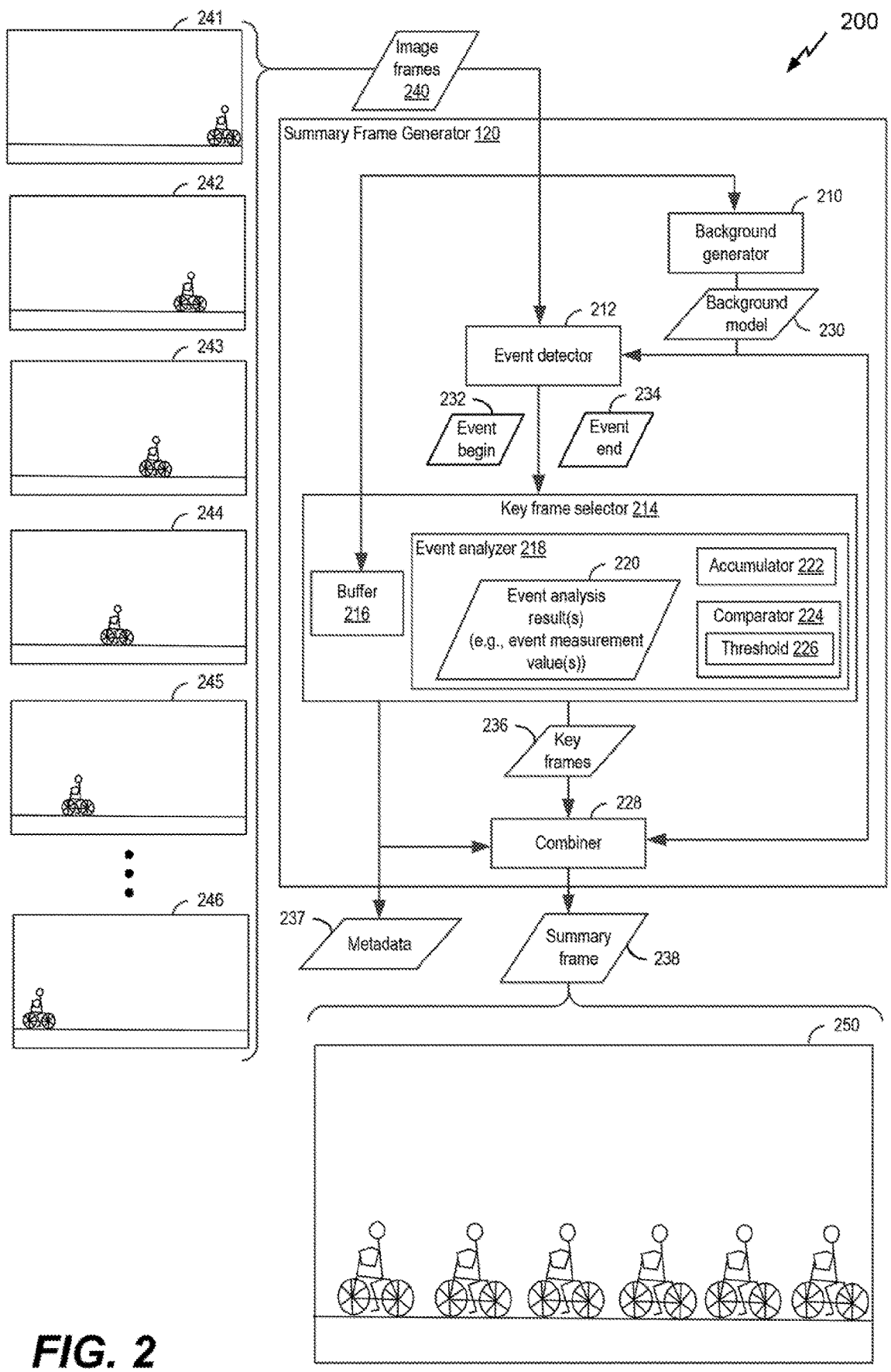
FIG. 2 is a block diagram of an illustrative example of a summary frame generator.

Referring to FIG. 2, an illustrative example of a system 200 operable to generate a summary frame is shown. The system 200 includes the summary frame generator 120 of FIG. 1A. The summary frame generator 120 is configured to receive image frames 240, such as multiple image frames. For example, the image frames 240 may include or correspond to the video content 140 of FIG. 1A or the video content 167 of FIGS. 1B-1C. The image frames 240 may be received from a storage unit (not shown), such as a buffer or a memory, or from a capture unit (not shown), such as the capture unit 164 of FIGS. 1B-1C. The image frames 240 may include a sequence of image frames, such as image frames 241-246. In some implementations, the capture unit that generated the image frames 240 is mounted in a fixed (and stationary) position and a background of a field of view of the camera may be considered to be stationary. For example, the background may include features, such as buildings, trees, signs, etc., that remain fixed (or relatively fixed) for an extended period of time.

The summary frame generator 120 may include a background generator 210, an event detector 212, a key frame selector 214, and a combiner 228. In some implementations, the image frames 240 may be received by the summary frame generator 120 on a frame-by-frame basis. Each frame of the image frames 240 received by the summary frame generator 120 may be provided to the background generator 210, the event detector 212, and the key frame selector 214.

The background generator 210 may be configured to generate (e.g., maintain) a background model 230 based on at least one frame of the of the image frames 240. For example, the background generator 210 may use one or more approaches, such as frame differencing, mean filtering, Gaussian averaging, background mixture modeling, a survey, etc., to generate the background model 230. In some implementations, the background generator 210 may continually update the background model 230 as the background generator 210 receives new image frames. The background model 230 may be provided to the event detector 212, to the combiner 228, or both.

The event detector 212 may be configured to detect a beginning and an end of a motion event based on the image frames 240. A period of time between the beginning and the end may be referred to as a motion event period. The event detector 212 may be configured to determine the beginning and the end of the motion event period. The event detector 212 may detect the motion event period by performing one or more detection algorithms, such as image segmentation, color segmentation, image filtering, features from accelerated segment test (FAST), speeded up robust features (SURF), scale-invariant feature transform (SIFT), corner detection, edge detection, background subtraction, blob detection, etc., as illustrative, non-limiting examples. For example, the event detector 212 may use background subtraction and foreground motion detection to determine the beginning and the end of the motion event period. Additionally or alternatively, the motion event period may be detected using one or more classification algorithms, a semantic analysis of scenes algorithm, or a combination thereof.

The beginning of the motion event period may be identified in response to detecting motion (e.g., movement) in a particular frame of the image frames 240 (e.g., the video content). As an illustrative, non-limiting example, the event detector 212 may detect motion in the image frames 240 using background subtraction. Background subtraction is an image processing technique in which a difference is determined between a first particular frame (of the image frames 240) and a reference frame, which may be referred to as a background image or a background model (e.g., the background model 230). The difference between the first particular frame and a first background image may be associated with at least one foreground object, sometimes referred to as a blob or a foreground blob. If the difference between the first particular frame and the background image is greater than or equal to a first threshold, the event detector 212 may indicate detection of the beginning of the motion event period (e.g., that motion is detected in the particular frame). To illustrate, the beginning of the motion event period may correspond to the first particular frame if a size, such as a number of pixels, of the foreground blob of the first particular frame is greater than or equal to a threshold size.

For example, the event detector 212 may be configured to receive a particular frame of the image frames 240 and to compare (e.g., determine a difference between) the particular image frame to the background model 230. If the difference (corresponding to an object) is greater than or equal to a threshold, the event detector 212 may determine that a motion event has begun. For example, the event detector 212 may receive a first image frame 241 and may determine that no motion is detected based on a comparison of the first image frame 241 to the background model 230. After receiving the first image frame 241, the event detector 212 may receive a second image frame 242 and may identify a beginning of a motion event based on a comparison of the second image frame 242 to the background model 230. For example, an object (e.g., a person on a bike) included in the second image frame 242 may cause a difference between the second image frame 242 and the background model 230 to be greater than or equal to the threshold.

The end of the motion event period may be identified in response to ceasing to detect motion (after the beginning of the motion event period is detected) in the image frames 240. For example, the event detector 212 may determine the end of the motion event period after the beginning of the motion event period is detected. The end of the motion event period may be determined in response a difference between a second particular frame (of the image frames 240) and a second background image being less than or equal to a second threshold. To illustrate, if a size of a second foreground blob associated with the second particular image is less than or equal to the second threshold, the event detector 212 may indicate that the second particular frame is associated with an end of the motion event period. The first background model (e.g., a first background image) and the second background model (e.g., a second background image) may be the same or may be different. In some implementations, the second background model may be an updated version of the first background model.

To illustrate identification of the end of the motion event, the event detector 212 may process subsequent input frames to identify the end of the motion event after determining that the motion event has begun. For example, the event detector 212 may identify the end of the motion event if a difference between a received image frame and the background model 230 is less than the threshold. To illustrate, the event detector 212 may receive an image frame 246 and may detect the end of the motion event based on a comparison of the image frame 246 and the background model 230. In some implementations, the event detector 212 may detect the end of the motion event by comparing two consecutively received image frames of the image frames 240. For example, the event detector 212 may compare the image frame 246 to a previously received image frame and, if a difference between the image frame 246 and the previously received image frames is less than or equal to a second threshold, the event detector 212 may identify the end of the motion event.

The event detector 212 may send a first indicator 232 (e.g., an event being indicator) and a second indicator 234 (e.g., an event end indicator) to the key frame selector 214. For example the event detector 212 may send the first indicator 232 in response to determining that the motion event has begun and may send the second indicator in response to determining that the motion event has ended. The first indicator 232 may include data that indicates a first time stamp corresponding to the beginning of the motion event, a first particular image frame or a first frame index value of the first particular image frame corresponding to the beginning of the motion event, or a combination thereof. The second indicator 233 may include a second time stamp corresponding to the end of the motion event, a second particular image frame or a second frame index value of the second particular image frame corresponding to the end of the motion event, a duration of the motion event, a number of frames associated with the motion event, an offset from the first particular image frame to the second particular image frame, or a combination thereof. Although the first indicator 232 and the second indicator 234 are described as being separate indicators, in other implementations, the first indicator 232 and the second indicator 234 may be combined into a single indicator. The event detector 212 may send the single indicator to the key frame selector 214 in response to determining the end of the motion event.

The key frame selector 214 (or a processor that includes or implements the key frame selector 214) may be configured to determine (e.g., select) multiple frames of the image frames 240 to be designated as key frames 236 for the motion event period (e.g., the motion event). For example, the key frame selector 214 may be configured to select two or more frames of the image frames 240 as the key frames 236, as described further herein.

The key frame selector 214 may include a buffer 216 and an event analyzer 218. The buffer 216 may be configured to store one or more image frames of the image frames 240. In some implementations, the buffer 216 may begin to store the one or more image frames in response to the first indicator 232 (e.g., the event begin indicator). In other implementations, the buffer 216 may operate as a first-in, first-out (FIFO) buffer and may continually buffer received image frames. Although the buffer 216 is described as being included in the summary frame generator 120, in other implementations, the buffer 216 may be separate from the summary frame generator 120. For example, the buffer 216 may include or correspond to the frame buffer 110 of FIG. 1A or the frame buffer 168 of FIGS. 1B-1C. As another example, the buffer 216 may be included in the same processor that includes the summary frame generator 120, such as being included in the processor 118 of FIG. 1A or the processor 174 of FIGS. 1B-1C.

The key frame selector 214 may use a selection algorithm to select multiple frames (from the frames stored in the buffer 216) to be provided as the key frames 236 to the combiner 228. In some implementations, the key frames 236 may be selected linearly. For example, the key frame selector 214 may select every $n^{th}$ frame (or $n^{th}$ key frame) of the portion of the image frames 240 corresponding to the motion event period, where n is a positive integer. For example, the key frame selector 214 may select every five hundredth frame of the portion of the image frames 240 to be included in the key frames 236. In other implementations, the key frame selector 214 may select a particular number of frames as the key frames 236. The key frames 236 may be a subset of the image frames 240 (e.g., a subset of multiple image frames corresponding to the motion event period). To illustrate, the key frame selector 214 may select a particular number of frames (e.g., a predetermined number of frames) from a total number of frames included in the portion of the image frames 240. Although referred to as "key frames" it is to be understood that the key frames may or may not be intracoded frames (I-frames). In some implementations, the frames selected may be evenly distributed throughout a portion (corresponding to the motion event) of the image frames 240. For example, if the particular number of frames is ten frames and the total number of frames of the portion (corresponding to the motion event) of the image frames 240 is one hundred twenty frames, every twelfth frame of the portion of the image frames 240 may be selected as a key frame. Alternatively, the particular number of frames may be randomly selected from portion (corresponding to the motion event) of the image frames 240 such as every third image or ten key frames that are evenly distributed during the motion event.

In other implementations, the key frame selector 214 may use a non-linear technique (e.g., a non-linear selection algorithm) that includes determining an analysis result for each frame of the motion event. The non-linear process may select key frames of the image frames 240 to be used to create a summary frame, as described further herein. The selected key frames may have a non-linear distribution with respect to the motion event, such that selection of the key frames appears random (e.g., the key frames are not evenly distributed in time during the motion event period).

For example, the non-linear selection technique may select the key frames 236 according to an event analysis result 220 (e.g., an event measurement result), such that selection of the key frames 236 appears random (e.g., the key frames 236 are not evenly distributed in time), as described further herein. The event analysis result 220 (e.g., an analysis measurement) for a frame may be representative of a relative amount of motion as compared to another frame, such as a reference frame (e.g., another frame of the image frames 240, the background model 230, etc.). The relative amount of motion may be determined based on a location of a blob, a size of blob, a shape of a blob, or a combination thereof. To illustrate, the relative motion of frame x, where x is a positive integer, may be determined as a difference between a first blob in frame x and a second blob in frame x-1 (e.g., a frame that precedes frame x). In some implementations, the relative amount of motion may be determined as a change in a number of pixels. In other implementations, the relative amount of motion may be determined as a vector based on a difference between a location of the first blob and a location of the second blob.

In some implementations, the key frame selector 214 (e.g., the event analyzer 218) may add multiple event analysis results 220 of consecutive image frames on a frame-by-frame basis to generate an accumulated value. To illustrate, for each frame associated with the motion event period, the event analyzer 218 may determine a corresponding accumulated value by adding an event analysis result 220 of the frame to a previous accumulated value. For each frame, the event analyzer 218 may compare the corresponding accumulated value to a fixed threshold (e.g., a predetermined threshold). If the corresponding accumulated value is greater than or equal to the fixed threshold, the frame corresponding to the event analysis result 220 that was most recently added to the accumulated value may be selected as one of the key frames 236. In response to a key frame being selected, the accumulated value may be decreased by the fixed threshold or may be set to an initial value (e.g., zero) for the next frame. If the corresponding accumulated value is less than the fixed threshold, the corresponding accumulated value may be used as a previous accumulated value for a next frame associated with a next event analysis result 220.

In other implementations, a threshold may be dynamically determined to enable a predetermined number of key frames to be selected. For example, the summary frame generator 120 may add multiple event analysis results 220 of all the frames associated with the motion event period (e.g., the portion of the video content) to determine a total event result. The total event result may indicate (e.g., quantify) a total amount of relative motion of the image frames 240 (e.g., the video content) during the motion event period. The event analyzer 218 may determine a dynamic threshold value corresponding to the motion event period by dividing the total event result by the predetermined number of key frames to be selected. Analysis results of consecutive image frames (associated with the portion of the video content) may be combined on a frame-by-frame basis to generate an accumulated value. To illustrate, for each frame associated with the motion event period, the summary frame generator 120 may determine a corresponding accumulated value by adding an event analysis result of the frame to a previous accumulated value. For each frame, the summary frame generator 120 may compare the corresponding accumulated value to the dynamic threshold value. If the accumulated value is greater than or equal to the dynamic threshold value, the corresponding frame may be identified as a key frame. In response to a key frame being selected, the accumulated value may be decreased by the dynamic threshold or may be set to an initial value (e.g., zero) for the next frame. If the corresponding accumulated value is less than the dynamic threshold, the corresponding accumulated may be used as a previous accumulated value for a next frame associated with a next event analysis result. By using the event analysis result for each frame, the non-linear selection technique may be configured to select more frames as key frames when an event analysis result(s) of a set of frames is high and may select fewer frames when an event analysis result(s) of a set of frames is low.

To implement the non-linear technique, the event analyzer 218 may include an accumulator 222 and a comparator 224. The accumulator 222 may be configured to add the event analysis results 220 of consecutive images on an image-by-image basis to generate an accumulated value. In some implementations, the accumulator 222 may include an adder, a register, or other circuitry configured to perform an addition operation.

The comparator 224 may be configured to compare an accumulated value to a threshold 226. In some implementations, the threshold 226 may be a fixed threshold. To illustrate, for each frame, the comparator 224 may compare a corresponding accumulated value to a fixed threshold (e.g., a predetermined threshold), and if the accumulated value is greater than or equal to the fixed threshold, the corresponding frame may be selected as a key frame and may be included in the key frames 236. Once a key frame is selected, the accumulated value may be set to an initial value (e.g., zero) for the next frame or may the accumulated value may be updated by subtracting a value of the threshold 226 from the accumulated value.

In other implementations, the threshold 226 may be dynamically determined to enable a predetermined number of key frames to be selected. For example, the accumulator 222 may add the event analysis results 220 of all the image frames associated with the motion event to determine a total event analysis result (e.g., a total event measurement value). The total event analysis result may be associated with (e.g., quantify) a total amount of relative motion associated the image frames 240 that correspond to the motion event. The event analyzer 218 may determine a dynamic threshold value (e.g., the threshold 226) for the motion event by dividing the total event analysis result by the predetermined number of key frames.

After the dynamic threshold value (e.g., the threshold 226) is determined, the accumulator 222 may add the event analysis results of consecutive images on an image-by-image basis to generate a corresponding accumulated value. For each frame, the comparator 224 may compare the accumulated value to the dynamic threshold value (e.g., the threshold 226), and if the accumulated value is greater than or equal to the dynamic threshold value, the corresponding frame may be identified as a key frame and may be included in the key frames 236. Once a key frame is selected, the accumulated value may be set to an initial value (e.g., zero) for the next frame or the accumulated value may be updated by subtracting a value of the threshold 226 from the accumulated value.

In some implementations, the key frames 236 may be selected as the image frames 240 are being received. For example, one or more of the key frames 236 associated with a motion event period may be selected before an end of the motion event period is determined. To illustrate, if every three hundredth frame is selected as a key frame, key frame selection may begin in response to the beginning of the motion event period being detected. In other implementations, the key frames 236 may be selected after the portion the image frames 240 associated with a motion event is received. For example, the key frames 236 of a particular motion event period may be selected after an end of the motion event period is determined (e.g., identified) by the event detector 212.

The key frame selector 214 may also be configured to generate metadata 237. The metadata 237 may include or correspond to the metadata 124 of FIG. 1A or the metadata 187 of FIGS. 1B-1C. The key frame selector 214 may provide the metadata 237 to the combiner 228, may provide the metadata 237 as an output of the summary frame generator 120, or both.

The combiner 228 may be configured to generate a summary frame 238. The summary frame 238 may illustrate multiple representations of an object. The object may be included in the portion of the image frames 240 corresponding to the motion event. The object may be associated with or correspond to one or more detected blobs. Each of the multiple representations of the object included in the summary frame 238 may correspond to (e.g., be extracted from) one of the key frames 236. For example, the combiner 228 may combine a first representation of the object from a first key frame and a second representation of the object from a second key frame to generate the summary frame 238.

To illustrate, the combiner 228 may receive the background model 230 and the key frames 236 (e.g., the subset of frames). The combiner 228 may be configured, for each of the key frames 236, to combine a representation of the object from the key frame with the background model 230. By combining the representation(s) of the object with the background model 230, the combiner 228 may generate the summary frame 238. Thus, the summary frame 238 may summarize motion of the object during the motion event in a single frame (e.g., a single image). The summary frame 238 may include or correspond to the summary frame 122 of FIG. 1. An illustrative example of the summary frame 238 is designated 250. In some implementations, the summary frame 238 may be communicated (e.g., transmitted) to another device that is remote from the summary frame generator 120, such as a device that is distinct from the summary frame generator 120.

In some implementations, the metadata 237, the summary frame 238 or both may be provided to an indexer (not shown), as described with reference to FIG. 6. The indexer may be configured to index video content, such as video content that includes the image frames 240, based on the metadata 237, the summary frame 238, or both.

In some implementations, the combiner 228 may include (e.g., embed) the metadata 237 in the summary frame 238. Although the metadata 237 is described as being generated and output by the key frame selector 214, in other implementations, the combiner 228 may generate metadata, such as the metadata 124 of FIG. 1A or the metadata 187 of FIGS. 1B-1C. In some implementations, if the combiner 228 generates metadata, the key frame selector 214 may not generate the metadata 237. Alternatively, in other implementations, the combiner 228 may generate the metadata and the key frame selector may generate the metadata 237.

In some implementations, the motion event period determined by the summary frame generator 120 may correspond to a portion of the image frames 240. The portion of the image frames 240 may be associated with a video segment (e.g., a video clip) of the image frames 240. The video segment may depict an entirety of the portion of the image frames, less than entirety of the portion of the image frames 240, or more than an entirety of the portion of the image frames 240. To illustrate, the video segment may include a first particular frame associated with a beginning of the motion event, a second particular frame associated with an end of the motion event, and one or more frames of the image frames 240 before, after, or between the first particular frame and the second particular frame, as an illustrative, non-limiting example.

In some implementations, the summary frame generator 120 (e.g., the event detector 212) may be configured to detect the motion event period (e.g., the beginning or the end of the motion event period) based on one or more image processing techniques, such as detection techniques, classification techniques, semantic analysis techniques, or a combination thereof. The detection techniques may include blob detection (as described above) or object detection. Object detection may be used to detect one or more objects in the image frames 240. Illustrative, non-limiting examples of objects that may be detected include a pedestrian, a face, a car, a fire, smoke, water (e.g., a flood), etc. In some implementations, a beginning of a motion event period may be determined in response to detection of a particular object in the image frames 240 (e.g. the video content) and an end of the motion event period may be determined when the particular object is no longer detected in the image frames 240 (e.g. the video content).

The classification techniques may classify a frame, or a portion thereof, using one or more classifiers, such as a scene classifier, an object classifier, a facial classifier, a sound and speech recognizer (if the video content is accompanied by audio content), or a combination thereof. The scene classifier may determine whether the frame depicts an indoor scene or an outdoor scene. If an indoor scene is determined, the frame may be classified as an office, a classroom, a store, a library, a restaurant, a living room, etc. Alternatively, if an outdoor scene is determined, the frame may be classified as a street view, a landscape, a beach, an ocean, a mountain, a forest, buildings, etc. The object classifier may determine if a detected object is a human, an automotive, a bicycle, a bag, a box, a household pet, etc. If the detected object is a human, the facial classifier may identify who the person is, a gender, an emotion, etc. In some implementations, if the image frames 240 (e.g., the video content) is accompanied by audio content, the sound and speech classifier may determine if someone is speaking and characterize what is said. Additionally or alternatively, the sound and speech classifier may identify one or more sounds, such as a gunshot, thunder, a horn, a siren or alarm, etc. In some implementations, an indication of a classifier associated with a frame of the image frames 240 (e.g. the video content) may be included in the metadata.

The semantic analysis of scene may include automatic scene understanding or user predefined event detection. An example of the automatic scene understanding may include detection of people fighting. Fighting can be detected when finding multiple pedestrians with certain body motions, can be associated with certain sounds and speech, or a combination thereof. Detecting fighting may be applicable in certain environments or locations, such as in a prison. Another example of a semantic analysis can involve a user defined event. For example, a user of the summary frame generator 120 can define a no parking zone in a scene of a street view (corresponding to a background) that is captured by a capture unit, such as a camera. An event of illegal parking in the no parking zone can be detected when a car is detected in the no parking zone and a driver has left the car.

The one or more image processing techniques (e.g., detection techniques, classification techniques, semantic analysis techniques, or a combination thereof) be implemented on an entirety of a frame or on a portion the frame. For example, the portion of the frame may correspond to a foreground blob that is detected after background subtraction has been performed on the frame. By applying the one or more image processing techniques on the portion rather than on the entirety of the image, the one or more image processing techniques may be performed more quickly and may use less power.

Thus, the system 200 of FIG. 2 may be configured to generate the summary frame 238. The summary frame 238 may illustrate multiple representations of an object included in the image frames 240 and corresponding to the motion event. The summary frame 238 may summarize motion of an object included in the image frames 240 in a single image that may quickly be viewed by a user. Accordingly, the user may be able to gain an understanding of the motion event based on the summary frame 238 and without having to watch a video clip corresponding to the motion event.

Figure 3:
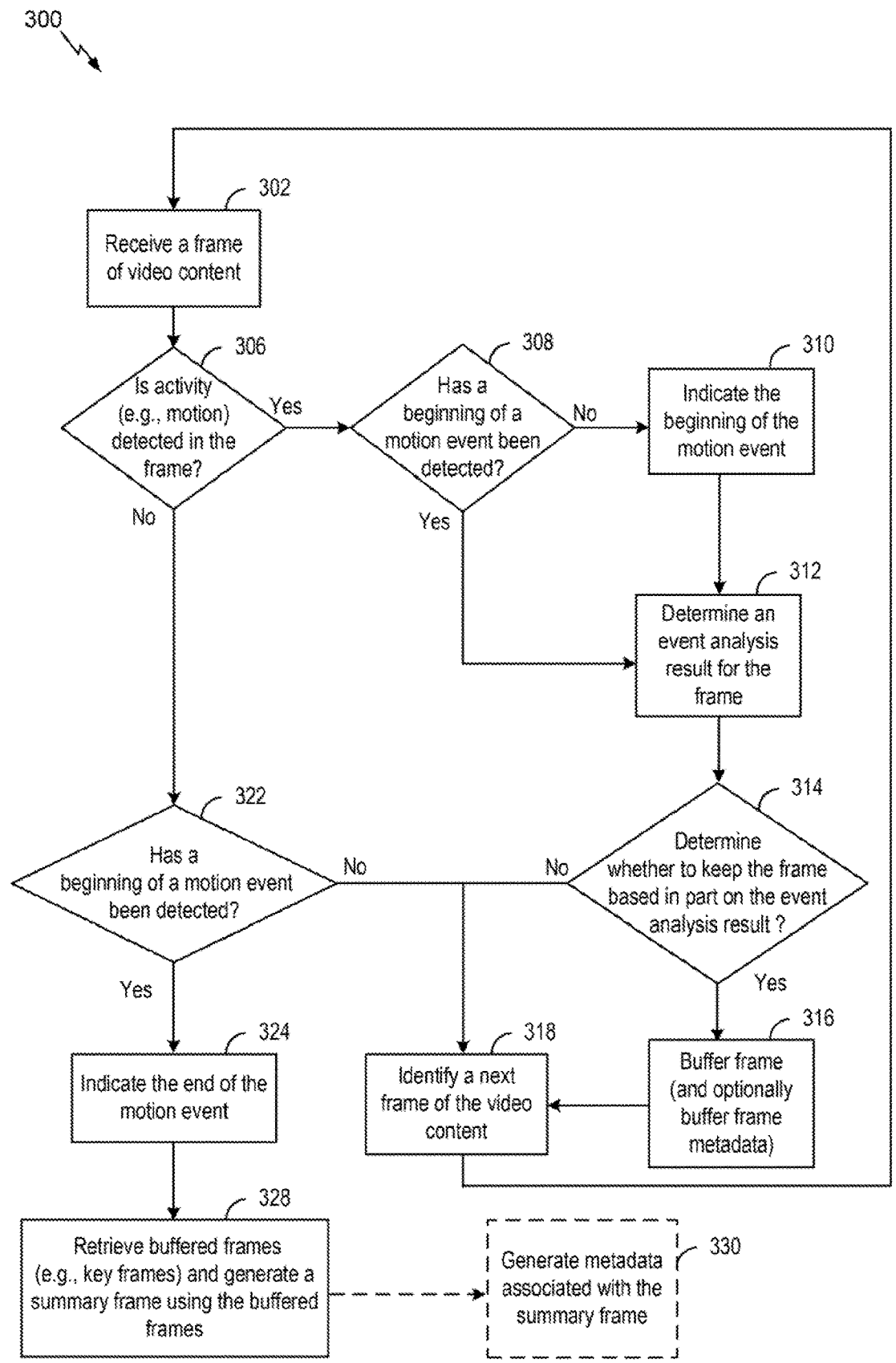
FIG. 3 is a flow diagram of a first illustrative example of a method of generating a summary frame.

Referring to FIG. 3, a flow diagram of a first illustrative example of a method 300 of generating a summary frame is depicted. The summary frame may include or correspond to the summary frame 122, the summary frame 150 of FIG. 1A, the summary frame 238, or the summary frame 250 of FIG. 2. The method 300 may be performed by the system 100 of FIG. 1A, the system 160 of FIG. 1B, the system 190 of FIG. 1C, system 200 (e.g., the summary frame generator 120) of FIG. 2, or a combination thereof.

An image frame of video content (e.g., an image frame of a stream of image frames) may be received, at 302. For example, the video content may include or correspond to the video content 140 of FIG. 1A, the video content 167 of FIGS. 1B-1C, or the image frames 240 of FIG. 2. A determination may be made whether activity (e.g., motion) is detected in the frame, at 306. For example, video analysis and activity determination may be performed by the event detector 212 of FIG. 2. To illustrate, the video analysis and activity test may be associated with performing one or more detection algorithms, such as image segmentation, color segmentation, image filtering, features from accelerated segment test (FAST), speeded up robust features (SURF), scale-invariant feature transform (SIFT), corner detection, edge detection, background subtraction, blob detection, etc. Additionally or alternatively, the video analysis and activity test may be associated with using one or more classification algorithms, a semantic analysis of scenes algorithm, or a combination thereof. To illustrate, to detect motion in the frame, background subtraction may be performed on a particular frame to determine a foreground blob. A size of the foreground blob may be determined and compared to a threshold size, at 306, to determine whether activity (e.g., motion) is detected.

If motion is detected, the method 300 may determine whether a beginning of a motion event has been detected, at 308. If no motion event has started, the method 300 may indicate the beginning of the motion event, at 310, and the method 300 may advance to determining an event analysis result for the frame, at 312. Alternatively, if the motion event has already started, the method 300 may advance to 312 (e.g., the detected activity may be considered part of the ongoing motion event rather than a start of a new motion event).

The method 300 may determine whether to keep the received frame based in part on the event analysis result, at 314. Determining the event analysis result, at 312, and determining whether to keep the received frame, 314, may include or correspond to determining an event analysis result corresponding to the frame, such as a relative motion value, determining an accumulated value based on the event analysis result, and comparing the accumulated value to a threshold. For example, such operations may be performed by the key frame selector 214 (e.g., the event analyzer 218) of FIG. 2.

If a determination is made to keep the received frame, the received frame may be buffered (at a buffer), at 316, and the method 300 may advance to identifying a next frame of the video content, at 318. The buffered frames may include or correspond to key frames, such as the key frames 236 of FIG. 2. In some implementations metadata of the buffered frame may also be buffered or otherwise stored, at 316. Alternatively, if a determination is made to not keep (e.g., discard) the received frame, the method 300 may advance to 318 without buffering the frame. After identifying the next frame, at 318, the method may return to 302.

At 306, if activity is not detected, the method 300 may determine whether the beginning of the motion event has been detected (e.g., has the motion event already started), at 322. If no motion event has been started, the method 300 may advance to 318. If the motion event has already been started, the method 300 may indicate an end of the event, at 324.

After the event has ended at 324, buffered frames (e.g., key frames) may be retrieved from the buffer and may generate a summary frame using the buffered frames, at 328. The summary frame may be generated using the image frames buffered at 316. For example, the summary frame may include or correspond to the summary frame 122, the summary frame 150 of FIG. 1, the summary frame 238, or the summary frame 250 of FIG. 2.

In some implementations, the method 300 may optionally generate metadata associated with the summary frame, at 330. For example, portions of metadata of the buffered frames may be combined to generate at least a portion of the metadata of the summary frame. In some implementations, the metadata of the summary frame may indicate which of the buffered frames were used to generate the summary frame.

Thus, the method 300 of FIG. 3 illustrates selecting and buffering one or more frames (e.g., key frames) prior to determining an end of a motion event. In response to the end of the motion event, the buffered key frames may be accessed to generate a summary frame.

Figure 4:
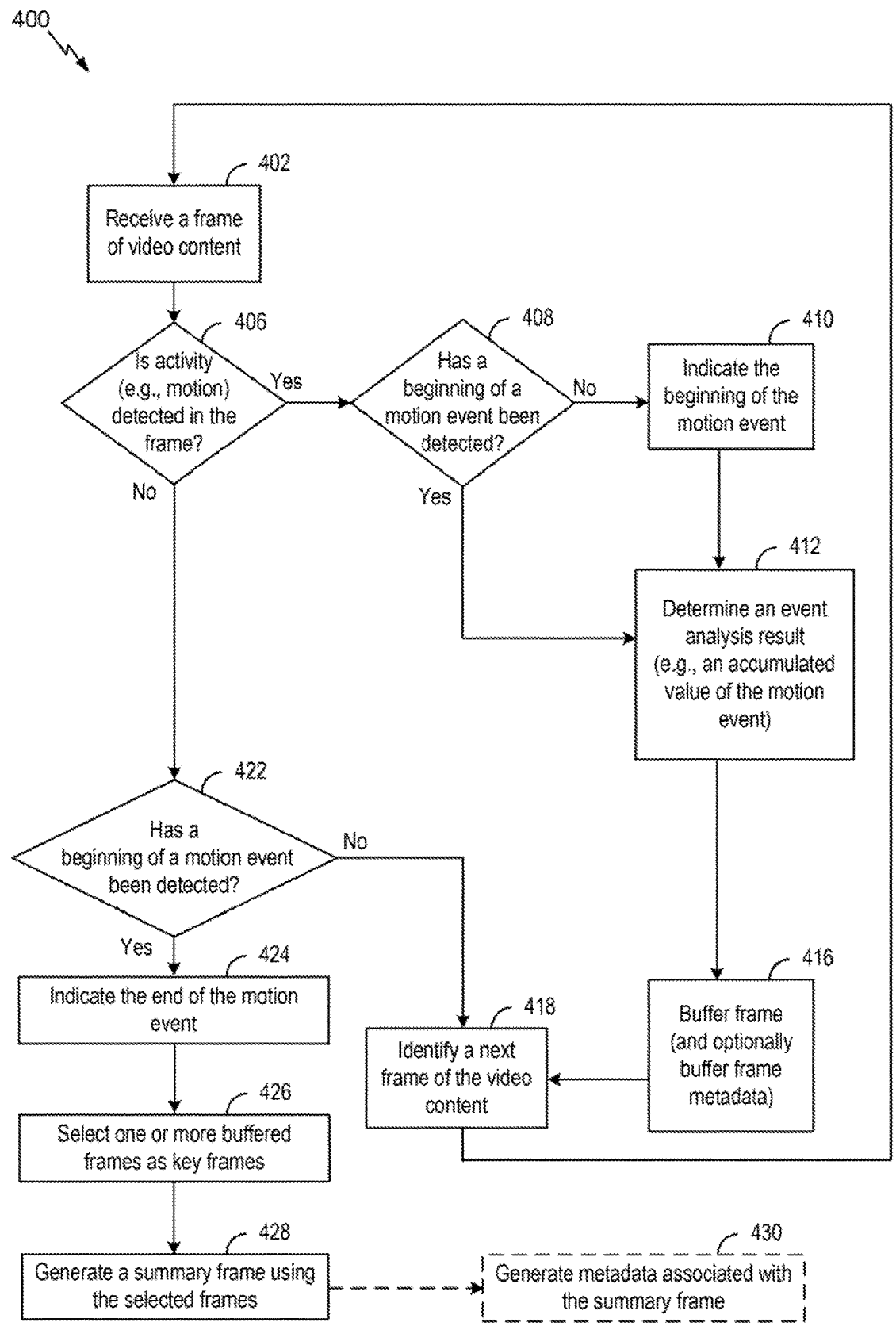
FIG. 4 is a flow diagram of a second illustrative example of a method of generating a summary frame.

Referring to FIG. 4, a flow diagram of a second illustrative example of a method 400 of generating a summary frame is depicted. The summary frame may include or correspond to the summary frame 122, the summary frame 150 of FIG. 1, the summary frame 238, or the summary frame 250 of FIG. 2. The method 400 may be performed by the system 100 of FIG. 1A, the system 160 of FIG. 1B, the system 190 of FIG. 1C, system 200 (e.g., the summary frame generator 120) of FIG. 2, or a combination thereof.

An image frame of video content (e.g., a stream of image frames) may be received, at 402. For example, the video content may include or correspond to the video content 140 of FIG. 1A, the video content 167 of FIGS. 1B-1C, or the image frames 240 of FIG. 2. A determination may be made whether activity (e.g., motion) is detected in the frame, at 406. For example, video analysis and activity determination may be performed by the event detector 212 of FIG. 2. To illustrate, the video analysis and activity test may be associated with performing one or more detection algorithms, such as image segmentation, color segmentation, image filtering, features from accelerated segment test (FAST), speeded up robust features (SURF), scale-invariant feature transform (SIFT), corner detection, edge detection, background subtraction, blob detection, etc. Additionally or alternatively, the video analysis and activity test may be associated with using one or more classification algorithms, a semantic analysis of scenes algorithm, or a combination thereof. To illustrate, the activity test, at 406, may perform background subtraction on a particular frame to determine a foreground blob. A size of the foreground blob may be determined and compared to a threshold size, at 406, to determine whether the particular frame corresponds to activity (e.g., motion).

If motion is detected, the method 400 determines whether a beginning of a motion event has been detected, at 408. If no motion event has started, the method 300 may indicate the beginning of the motion event, at 410, and the method 400 may advance to determining an event analysis result for the frame, at 412. Alternatively, if the motion event has already started, the method 400 may advance to 412 (e.g., the detected activity may be considered part of the ongoing motion event rather than a start of a new motion event).

At 412, the method 400 may determine an event analysis result. The event analysis result may be determined corresponding to the frame. For example, the event analysis result may be a relative motion value, an accumulated value (e.g., a total relative motion value of an event) of multiple frames, or both. For example, the event analysis result may be determined by the key frame selector 214 (e.g., the event analyzer 218) of FIG. 2.

After the event analysis, at 412, the method 400 may buffer (at a buffer) the frame, at 416. In some implementations metadata of the buffered frame may also be buffered or otherwise stored, at 416. The method 400 may advance to identifying a next frame of the video content, at 418. After identifying the next frame, at 418, the method may return to 402.

At 406, if activity is not detected, the method 400 may determine whether the beginning of the motion event has been detected (e.g., has the motion event already started), at 422. If no motion event has been started, the method 400 may advance to 418. If the motion event has already been started, the method 400 may indicate an end of the event, at 424.

After the event has ended at 424, the method 400 may select one or more buffered frames as key frames, at 426. For example, the key frame selection may be performed by the key frame selector 214 (e.g., the event analyzer 218) and the key frames may include or correspond to the key frames 236 of FIG. 2. To illustrate, in response to the event ending, the accumulated value (e.g., the total relative motion value of the event) may be identified. A threshold value may be determined by dividing the total relative motion value of the event may be divided by a predetermined number of key frames to be selected. After the threshold value is determined, the frames buffered, at 416, may be processed on a frame-by-frame basis to determine an event analysis result corresponding to the frame, such as a relative motion value, determine an accumulated value based on the event analysis result, and compare the accumulated value to the threshold. If a particular accumulated value is greater than or equal to the threshold, a particular frame corresponding to the particular accumulated value may be selected as a key frame (e.g., for use during summary frame generation).

The method 400 may include generating a summary frame, at 428. For example, the summary frame may include or correspond to the summary frame 122, the summary frame 150 of FIG. 1, the summary frame 238, or the summary frame 250 of FIG. 2.

In some implementations, the method 400 may optionally generate metadata associated with the summary frame, at 430. For example, portions of metadata of the one or more buffered frames selected as key frames may be combined to generate at least a portion of the metadata of the summary frame. In some implementations, the metadata of the summary frame may indicate which buffered key frames were used to generate the summary frame.

Thus, the method 400 of FIG. 4 illustrates selecting one or more key frames after determining an end of a motion event. Portions of the one or more key frames may be combined to generate a summary frame.

Figure 5:
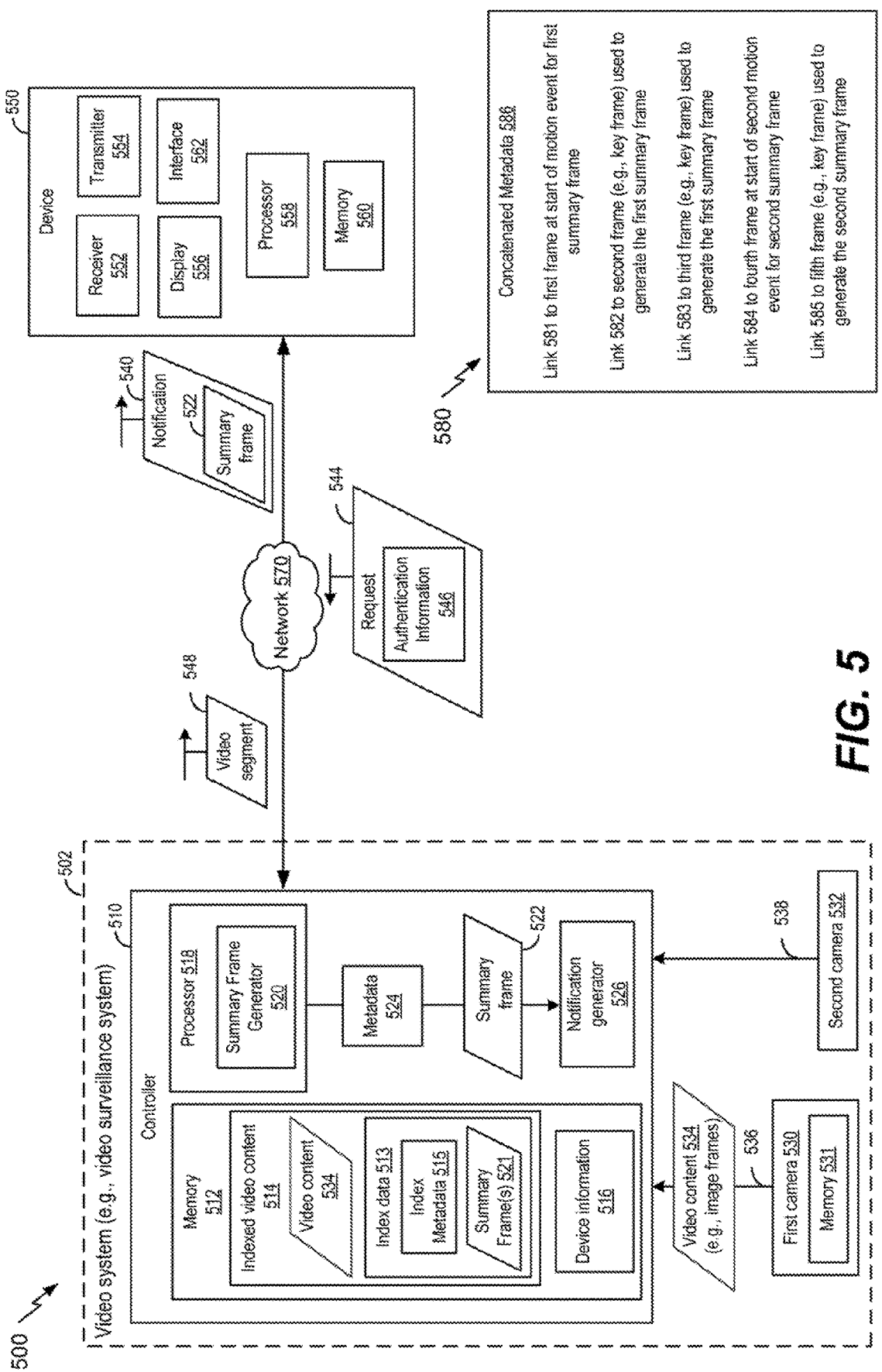
FIG. 5 is a block diagram of an illustrative system for processing image data to communicate a summary frame.

Referring to FIG. 5, an illustrative example of a system 500 operable to generate and communicate a summary frame is shown. The system 500 may include a video system 502 and a device 550. In some implementations, the video system 502 may be a video surveillance system, such as a closed circuit television (CCTV) system. Additionally or alternatively, the techniques described with reference to FIG. 5 may be used with electronic devices, mobile devices, vehicles, gaming consoles, automotive system consoles (e.g., ADAS), wearable devices (e.g., personal mounted cameras), head mounted displays (HMDs), etc. Additional examples include, but are not limited to, robots or robotic devices, unmanned aerial vehicles (UAVs), and drones.

The video system 502 may be communicatively coupled to the device 550 via a network 570. The network 570 may include a wired network, a wireless network, or a combination thereof.

The video system 502 may include a controller 510 and one or more capture units, such as one or more cameras. For example, the video system 502 may include a single camera or may include a plurality of cameras, such as a first camera 530 and a second camera 532. The first camera 530, the second camera 532, or both, may include or correspond to the camera 162 of FIGS. 1B-1C. In some implementations, the controller 510 may include or correspond to a device (e.g., an image processing device), such as a computer, a server, a tablet, a router, a camera, etc., as illustrative, non-limiting examples. The controller 510 may be coupled to the first camera 530 via a first connection 536 and may be coupled to the second camera 532 via a second connection 538. Each of the first connection 536 and the second connection 538 may include a wired connection, a wireless connection, or a combination thereof. In some implementations, the first camera 530 or the second camera 532 may include an Internet protocol (IP) camera. Although the video system 502 is described as having two cameras, in other implementations, the video system 502 may include more than two cameras or fewer than two cameras.

Each of the first camera 530 and the second camera 532 may be configured to generate video content of a corresponding field of view of the camera. The video content may include a sequence of image frames. For example, the first camera 530 may be configured to generate video content 534 (e.g., multiple image frames). The video content 534 may include or correspond to the video content 140 of FIG. 1A, the video content 167 of FIGS. 1B-1C, or the image frames 240 of FIG. 2. In some implementations, the first camera 530, the second camera 532, or both, may include a corresponding memory. For example, the first camera 530 may include a memory 531 configured to store one or more image frames e.g., the video content 534) generated by the first camera 530.

The first camera 530, the second camera 532, or both, may be mounted in a fixed (and stationary) position. If the first camera 530 is mounted in a fixed and stationary position, a background of the field of view of the first camera 530 may be considered to be stationary. For example, the background of the video content 534 (e.g., a video stream) may include features, such as buildings, trees, signs, etc., that remain fixed (or relatively fixed) for an extended period of time.

The controller 510 may include a memory 512, a processor 518, and a notification generator 526. The controller 510 may receive video content from one or more cameras, such as the first camera 530 and the second camera 532, and may provide the video content to the processor 518. For example, the processor 518 may receive the video content 534 from the first camera 530.

The memory 512 may include indexed video content 514 and device information 516. The indexed video content 514 may include the video content 534 and index data 513. The index data 513 may be generated as described with reference to FIG. 6. For example, the index data 513 may be generated by the processor 518 (e.g., an indexer). The index data 513 may include index metadata 515 and one or more summary frames 521. The index metadata 515 may include marker data that indicates one or more playback positions of the video content 534. As an example, the marker data may include a link (e.g., a uniform resource locator (URL)) to a storage location of the video content 534 and a selection of the link may initiate playback of the video content 534 beginning at a first playback position. The first playback position may correspond to a beginning of a motion event associated with a first summary frame of the one or more summary frames 521. Additionally or alternatively, the index metadata 515 may include second marker data that indicates a second playback position of the portion of the video content 534. The second playback position may correspond to a frame of the video content 534 used to generate a first representation of multiple representations of an object included in the first summary frame.

In some implementations, the index data 513 may include multiple summary frames, such as the first summary frame and a second summary frame. The second summary frame may be associated with a second portion of the video content 534 and may illustrate multiple representations of a second object included in the second portion of the video content 534. In this example, the index metadata 515 may include third marker data that indicates a third playback position that corresponds to the second portion of the video content 534.

In some implementations, if the index data 513 includes multiple summary frames, the index metadata 515 may be concatenated metadata, such as metadata that has been generated by combining at least a first portion of metadata corresponding to the first summary frame (of the one or more summary frames 521) and at least a second portion of meta data corresponding to the second summary frame (of the one or more summary frames 521). An illustrative example of concatenated metadata 586 is depicted at 580. The concatenated metadata 586 includes links 581-585. Each of the links 581-585 corresponds to different playback position of the video content 534. A first link 581 corresponds to a first frame at a start of a motion event associated with the first summary frame. A second link 582 corresponds to a second frame (e.g., a first key frame) of the video content 534 that was used to generate the first summary frame. A third link 583 corresponds to a third frame (e.g., a second key frame) of the video content 534 that was used to generate the first summary frame. A fourth link 584 corresponds to a fourth frame at a start of a motion event associated with the second summary frame. A fifth link 585 corresponds to a fifth frame (e.g., a key frame) of the video content 534 that was used to generate the second summary frame. Thus, in particular aspects, the metadata for summary frame(s) may be a playlist that can be used to "jump" to specific points in time within video content.

The device information 516 may be associated with the device 550 which may be configured to remotely access the video system 502 or may receive data from the video system 502. For example, the device information 516 may include data that indicates a device address (e.g., an email address, a telephone number, etc.) the device 550.

The processor 518, such as a digital signal processor (DSP), central processing unit (CPU), or a graphical processing unit (GPU), may include a summary frame generator 520. The summary frame generator 520 may include or correspond to the summary frame generator 120 of FIG. 1A or the summary frame generator 180 of FIGS. 1B-1C. The processor 518 (the summary frame generator 520) may be configured to detect a motion event period (e.g., a beginning of a motion event, an end of a motion event, or both) corresponding to a portion of the video content 534. The portion of the video content 534 corresponding to the motion event period may be referred to as a video segment 548 (e.g., a video clip). In some implementations, the video segment 548 may be stored in the memory 512.

The processor 518 (e.g., the summary frame generator 520) may be further be configured to generate a summary frame 522 associated with the portion of the video content 534. For example, the portion of the video content 534 may depict a motion event associated with an object. The summary frame 522 may provide a visual summary of the portion of the video content 534. For example, the summary frame 522, such as the summary frame 122 of FIG. 1A, the first summary frame 198, the summary frame 199 of FIG. 1C, the summary frame 238, or the summary frame 250 of FIG. 2, may illustrate multiple representations of the object. To generate the summary frame 522, the processor 518 (e.g., the summary frame generator 520) may be configured to select one or more key frames, such as the key frames 236 of FIG. 2. For example, the processor 518 may combine a first representation of the object from a first key frame and a second representation of the object from a second key frame to generate the summary frame 522.

The processor 518 may further be configured to generate metadata 524 associated with the summary frame 522. The metadata 524 may include or correspond to the metadata 124 of FIG. 1A or the metadata 187 of FIGS. 1B-1C. The metadata 524 may include an identifier of the video segment 548 (corresponding to the motion event period), an indication of a key frame used to generate a representation of the object included in the summary frame 522, a first timestamp associated with a beginning of the motion event period, a second timestamp associated with an end of the motion event period, a camera identifier associated with the first camera 530 that generated the video content 534, a link to a storage location of the memory 512 where the indexed video content 514 (or the video segment 548) is stored, or a combination thereof. In some implementations, the metadata 524 may be included in (e.g., embedded in) the summary frame 522. Additionally or alternatively, the metadata 524 may be stored at the memory 512. To illustrate, the metadata 524 may be included in the indexed video content 514 or the video segment 548 stored at the memory 112.

In some implementations, the processor 518 may be configured to index the video content 534 to generate the indexed video content 514. For example, the video content 534 may be indexed according to the first particular frame corresponding to the beginning of the motion event period, the one or more of the key frames associated with the motion event period, the second particular frame corresponding to the end of the motion event period, or the summary frame 522, or a combination thereof. Examples of indexing video content using one or more summary frames are described with reference to FIGS. 7A-7B. As another example, the video content 534 may be indexed based on an offset applied to the first particular frame, one or more of the key frames, the second particular frame, or a combination thereof. To illustrate, the video content 534 may be indexed using a frame at a first offset value (e.g., sixty frames) before the first particular frame corresponding to the beginning of the motion event period and using another frame at a second offset value (e.g., thirty frames) after the second particular frame corresponding to the end of the motion event period. In some implementations, the processor 518 may store the video segment 548 associated with the motion event period at the memory 512. For example, the video segment 548 may be stored at the memory 512 separate from (in addition to or instead of) the indexed video content 514.

The notification generator 526 may be configured to receive the summary frame 522, the metadata 524, or both, and to identify one or more devices, such as the device 550, to receive the summary frame 522. For example, in response to receiving the summary frame 522, the notification generator 526 may identify the metadata 524 and may determine a camera identifier of the first camera 530 that generated the video content 534. The notification generator 526 may access the device information 516 and identify one or more devices based on the camera identifier of the first camera 530. To illustrate, the notification generator 526 may determine that the device 550 is to be notified in response to the detected motion event and may identify an address (associated with the device 550) included in the device information 516. The notification generator 526 may generate a notification 540 that includes the summary frame 522 associated with the motion event period, the metadata 524, or an indicator identifying that the summary frame 522 has been generated. In some implementations, the notification 540 may include an email or a short message service (SMS) message, as illustrative, non-limiting examples. The video system 502 (e.g., the controller 510) may send the notification 540 to the address (e.g., the device 550) via the network 570, such as a wireless network.

The device 550 may include a receiver 552, a transmitter 554, a display 556, a processor 558, a memory 560, and an interface 562. In some implementations, the receiver 552, the transmitter 554, or both may be included in a transceiver (not shown). The receiver 552 may be configured to receive the notification 540 from the video system 502.

The display 556 may be configured to present an image (e.g., an image frame) or video content that includes multiple image frames. For example, the display 556 may be configured to present the summary frame 522. By presenting the summary frame 522 that is associated with a motion event period and that includes multiple representations of an object, a user of the device 550 may quickly review the summary frame 522 to gain an understanding of activity that occurred during the motion event period.

The interface 562 may include a user interface, such as a key pad, a touch screen, a microphone, a camera, a motion sensor (e.g., an ultrasonic or infrared sensor), a wireless interface, etc. In some implementations, the interface 562 may correspond to a graphical user interface (GUI) that is presented via the display 556. The interface 562 may be configured to receive an input, such as an input that corresponds to a selection to play the portion of the video content 534 that corresponds to the summary frame 522. For example, the input may be associated with a request 544 for the video segment 548 (e.g., a video clip of the video content 534) that corresponds to the summary frame 522. To illustrate, in response to viewing the summary frame 522 at the device 550, the user of the device 550 may request to view the video segment 548 (e.g., a video clip) corresponding to the summary frame 522. Accordingly, the user may provide the input via the interface 562 to initiate the request 544.

The processor 558, such as a digital signal processor (DSP), central processing unit (CPU), or a graphical processing unit (GPU), may be coupled to the memory 560. The memory 560 may be configured to store data, instructions, or both. The processor 558 may be configured to execute software (e.g., a program of one or more instructions stored in the memory 560. In response to the input received via the interface 562, the processor 558 may generate the request 544 for the video segment 548 that corresponds to the motion event summarized by the summary frame 522. In some implementations, the request 544 may include authentication information 546 that may be used to verify that the device 550 (or the user) is authorized to receive the video segment 548. Additionally or alternatively, the request 544 may include at least a portion of the metadata 524 that identifies the summary frame 522, the motion event period, or a combination thereof, as illustrative, non-limiting examples. The processor 558 may initiate sending the request 544 to the video system 502 (e.g., the controller 510). The transmitter 554 may be configured to transmit the request 544 to the video system 502 via the network 570 (e.g., via at least one network).

The controller 510 may receive the request 544 from the device 550 and may verify that the device 550 is authorized to receive the video segment 548 associated with the summary frame 522. For example, controller 510 may verify a user name and a password included in the authentication information 546 received from the device 550. To illustrate, the controller 510 may use the device information 516 to verify the user name and the password.

In response to the request 544, the controller 510 may identify the video segment 548 that corresponds to the summary frame 522. For example, the controller 510 may identify the video segment 548 based on the portion of the metadata 524 included in the request 544. In some implementations, the controller 510 (e.g., the processor 518) may retrieve the video segment 548 stored at the memory 512. In other implementations, the portion of the metadata 524 may include an index identifier that enables the controller 510 to access a portion of the indexed video content 514 that correspond to the video segment 548. The controller 510 may send the video segment 548 to the device 550 via the network 570. A first data size of the notification 540 (that includes the summary frame 522) may be less than a second data size of the video segment 548. Accordingly, the notification 540 that includes the summary frame 522 (and not the video segment 548) may use less network bandwidth and may be provided more quickly to the device 550 than a notification that includes the video segment 548.

During operation, the controller 510 may detect a motion event period corresponding to the video content 534 (e.g., multiple image frames) received from the first camera 530. The controller 510 may generate the summary frame 522 that illustrates multiple representations of an object. The object may be included in a portion of the video content 534 that corresponds to the motion event period. After the summary frame 522 is generated, the summary frame 522 may be included in the notification 540 that is sent to the device 550.

The device 550 may receive the notification 540 of the motion event period from the video system 502 (e.g., a video surveillance system). The device 550 may present the summary frame 522 included in the notification 540 via the display 556. The summary frame 522 presented via the display 556 may provide a user of the device 550 a single image that summarizes the video content 534 corresponding to a motion event period. To illustrate, the video system 502 may be installed at a home of the user of the device 550 and the first camera 530 may be mounted on the home to have a field of view associated with scene outside a front door of the home. The controller 510 may detect a motion event period each time a person, such as a delivery man, approaches the front door and may generate a corresponding summary frame that is sent to the device 550.

After receiving the notification 540 that includes the summary frame 522, the device 550 may send the request 544 to the video system 502 (e.g., the controller 510) for the video segment 548 associated with the summary frame 522, such as the video segment 548 corresponding to the motion event period. The video system 502 (e.g., the controller 510) may receive the request 544 from the device 550 and, responsive to the request 544, may send the video segment 548 to the device 550. The device 550 may receive the video segment 548 and may store the video segment 548 at the memory 560. Additionally or alternatively, the device 550 may present the video segment 548 via the display 556 of the device 550. In some implementations, the video segment 548 may be streamed from the video system 502 to the device 550 in response to the request 544.

In some implementations, the notification 540 may include a single summary frame, such as the summary frame 522. In other implementations, the notification 540 may include multiple summary frames. For example, the processor 518 may detect a first motion event period associated with a first portion of the video content 534 and may detect a second motion event period associated with a second portion of second video content generated by the first camera 530 or by the second camera 532. The processor 518 may generate the summary frame 522 associated with the first motion event period and may generate a second summary frame associated with the second motion event period. The notification 540 may include the summary frame 522 and the second summary frame. The first motion event may have a first duration that is the same or different from a second duration of the second motion event. In some implementations, the first duration and the second duration may not be limited to minimum or a maximum amount of time. In other implementations, at least one of the first duration or the second duration may be limited in time, such that the first duration or the second duration is greater than a first threshold, less than a second threshold, or both. Alternatively or additionally, the first motion event period and the second motion event period may be at least partially overlapping in time. In other implementations, the first motion event and the second motion event may be non-overlapping in time.

In some implementations, the notification generator 526 may be configured to generate the notification 540 in response to determining an end of a motion event period. Additionally or alternatively, the notification 540 may be generated in response to the summary frame 522 being generated. In other implementations, the notification generator 526 may be configured to generate a notification at predetermined intervals. As an illustrative non-limiting example, the notification generator 526 may generate a notification every three hours. Optionally, a notification without summary frame(s) may be generated if no motion events were detected during the preceding three hour period. As another example, a first interval may be eight hours long and may occur from 9 a.m. to 5 p.m., and a second interval may be one hour long and may occur several times from 5 p.m. to 9 a.m. If the notification generator 526 generates notifications at predetermined intervals, each notification may include one or more summary frames that were generated since a most recent notification was sent. In some implementations, the notification generator 526 may not send a notification at every predetermined interval if no summary frames have been generated. For example, if no summary frames have been generated between a first time and a second time and if the second time corresponds to a predetermined time interval, the notification generator may not send a notification at the second time.

In some implementations, if the video system 502 (e.g., the controller 510) is configured to send a notification at a predetermined time, such as after a time period, the memory 512 may be configured to store video content (or frames thereof) during the time period. At the predetermined time, the summary frame generator 520 may be configured to access the stored video content and analyze the video content to identify motion events included in the video content. For each identified motion event, the summary frame generator 520 may generate a corresponding summary frame. Each summary frame generated based on the video content (associated with the time period) may be included in the same notification generated by the notification generator 526.

In some implementations, the device 550 may include an application (e.g., a software application executable by the processor 558) that enables secure communication between the video system 502 and the device 550. In such implementations, the notification 540, the request 544, the video segment 548, or a combination thereof, may be communicated using the application. Additionally or alternatively, the application may enable the device 550 to access the video system 502. For example, the application may enable the device 550 to access the memory 512 (e.g., the device information 516 or at least a portion of the indexed video content 514), the video content 534 generated by the first camera 530, video content generated by the second camera 532, as illustrative, non-limiting examples. In some implementations, the application may enable a user of the device 550 to set one or more preferences associated with generation and transmission of summary frames, notifications, or both. For example, the one or more preferences may indicate how often notifications are sent to the devices, which cameras the device 550 is to received notifications for, or how many key frames to select for a motion event period, as illustrative, non-limiting examples.

Although the controller 510 has been described as being separate from one or more cameras, in other implementations the controller 510, or components thereof, may being included in a camera, such as the first camera 530, the second camera 532, or both. As an illustrative, non-limiting example, the second camera 532 may include a memory (e.g., the memory 512) and an image processor (e.g., the processor 518). In some implementations, the memory 531 of the first camera 530 may correspond to the memory 512 of the controller 510. For example, the memory 531 may be configured to store the indexed video content 514, the device information 516, or a combination thereof.

In some implementations, the first camera 530 may be configured to generate one or more summary frames and to provide the one or more summary frames to the controller 510 (that is separate from the first camera 530) or to the device 550. For example, in some implementations, the first camera 530 may send a first notification that includes a first summary frame to the device 550 via the network 570. As another example, in other implementations, the first camera 530 may generate a first summary frame and may send a first notification that includes the first summary frame to the controller 510 via the first connection 536. After receiving the first notification, the controller 510 may send a second notification that includes the first summary frame to the device 550 via the network 570. In some implementations, video content, indexed video content, a video segment, or a summary frame may be stored at the memory 531 of the first camera 530, the memory 512 of the controller 510, or both.

In some implementations, the memory 512 may store parameters, settings, or other information associated with operation of the video system 502. For example, parameters or settings of the video system 502 may include or indicate the device information 516, account information (e.g., user name, user address, one or more cameras authorized to be accessed by a user), a mode value (e.g., indicating the mode specified by the mode controller 178 of FIGS. 1B-1C), one or more time periods associated with a concatenation mode, camera location information, or a combination thereof, as illustrative, non-limiting examples. To illustrate, the memory 512 may store parameters or setting associated with operation of the summary frame generator 520. For example, the parameters or settings associated with operation of the summary frame generator 520 may include or indicate a number of key frames to be used to generate the summary frame 522, a mode value (e.g., indicating the mode specified by the mode controller 178 of FIGS. 1B-1C), one or more time periods associated with a concatenation mode, one or more threshold values (e.g., the threshold 226 of FIG. 2), or a combination thereof, as illustrative, non-limiting examples. Additionally or alternatively, the parameters or settings may be associated with operation of the notification generator 526. For example, the parameters or settings associated with the notification generator 526 may include or indicate a mode value (e.g., indicating the mode specified by the mode controller 178 of FIGS. 1B-1C), one or more time periods associated with a concatenation mode, a message format of the notification 540, whether the notification is to include the summary frame generator 520, the metadata 524, or the video segment 548, or a combination thereof, as illustrative, non-limiting examples.

Although one or more aspects may be described herein as including operations being performed at a specific device, it should be understood that in other examples such operations, components, or devices may be associated with the "cloud." For example, in other implementations, the video content 534, the indexed video content 514, the device information 516, the summary frame 522, the metadata 524, or a combination thereof may be stored at a device (e.g., a server) included in the network 570. Additionally or alternatively, the summary frame generator 520 may be included in the network 570.

By sending the notification 540 that includes the summary frame 522 associated with a motion event period, a data size of the notification 540 may be reduced as compared to sending a notification that includes the video segment 548 a video clip) associated with the motion event period. Accordingly, the notification 540 that includes the summary frame 522 (and not the video segment 548) may be provided more quickly, using less power and less bandwidth, to the device 550 than a notification that includes the video segment 548. Additionally, by sending the summary frame 522 instead of sending the video segment 548, a user of the device 550 may quickly review the summary frame 522 to gain an understanding of activity that occurred during the motion event period.

Figure 6:
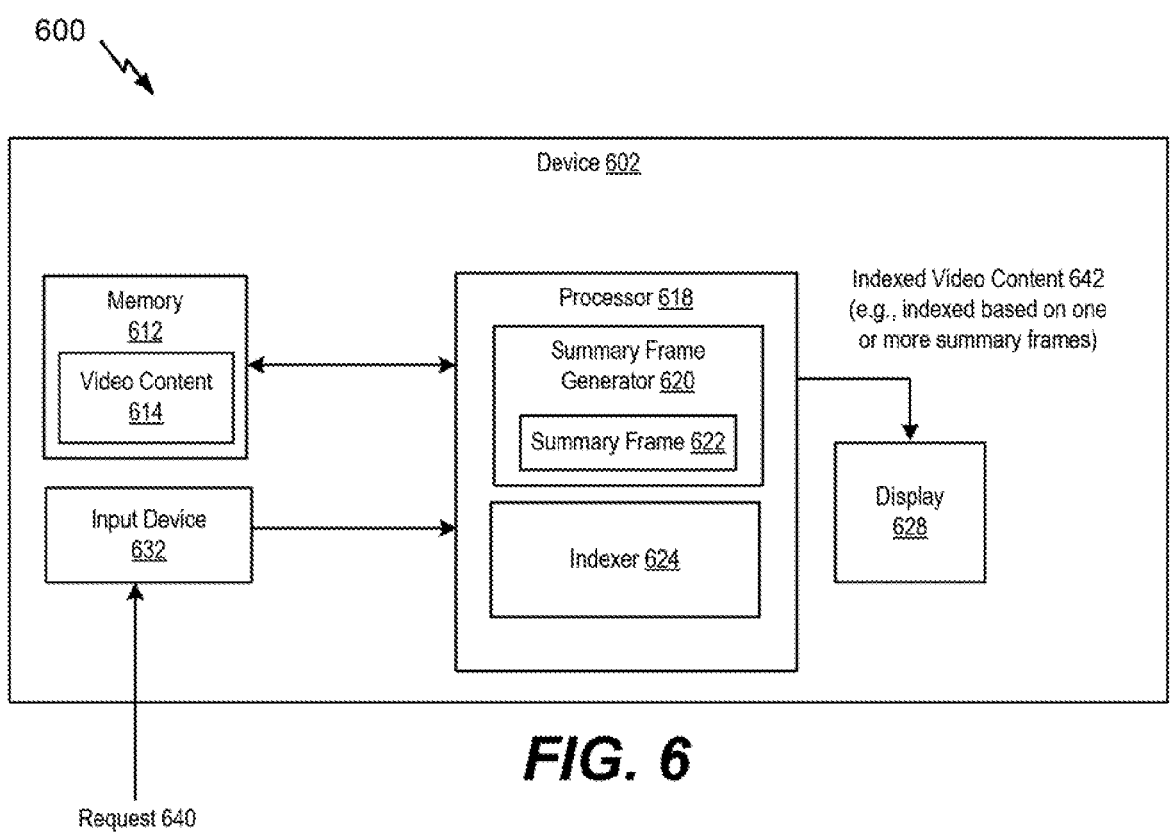
FIG. 6 is a block diagram of an illustrative example of a device configured to index video content using a summary frame.

Referring to FIG. 6, an illustrative example of a system 600 operable to index video content using a summary frame is shown. The system 600 may include or correspond to the system 100 of FIG. 1A, the system 160 of FIG. 1B-1C, the system 200, or the system 500 (e.g., the video system 502, the controller 510, the first camera 530, the second camera 532, or the device 550) of FIG. 5.

The system 600 may include a device 602. The device 602 may include a playback device, such as computer, a laptop, a mobile device, a camera, or a server, as illustrative, non-limiting examples. In some implementations, the device 602 may be included in a video surveillance system, such as a closed circuit television (CCTV) system. Additionally or alternatively, the device 602 may include or be included in an electronic device, a mobile device, a vehicle, a gaming console, an automotive system console (e.g., ADAS), a wearable device (e.g., personal mounted camera), a head mounted display (HMDs), etc. Additional examples include, but are not limited to, a robot or a robotic device, an unmanned aerial vehicle (UAVs), and a drone. Furthermore, although one or more aspects may be described herein as including operations being performed at a device, it should be understood that in other examples such operations can be performed in the "cloud."

The device 602 may include a memory 612, an input device 632, a processor 618, and a display 628 (e.g., a screen). The memory 612 may include video content 614. In some implementations, the video content 614 may be stored as a data file having a file name. The video content 614 may include or correspond to the video content 140 of FIG. 1A, the video content 167 of FIGS. 1B-1C, the image frames 240 of FIG. 2, or the video content 534 of FIG. 5. In some implementations, the memory 612 may include multiple data files (e.g., multiple video files) and each data file may correspond to different video content. For example, a first data file of the multiple data files may correspond to first video content and a second data file of the multiple data files may include or correspond to second video content.

The input device 632 may be configured to receive one or more inputs. The input device 632, such as a user interface, may include a mouse, a touch pad, a keyboard, a touch screen, a microphone, a motion sensor, a camera, a display, a wireless receiver, etc. The one or more inputs may include or indicate a request 640, such as a request to generate or provide an indexed version of the video content 614. In some implementations, the request 640 may identify or be associated with the video content 614. For example, the request 640 may include the file name of the file that includes the video content 614.

The processor 618 may be configured to generate indexed video content 642. In some implementations, the indexed video content may include or correspond to the indexed video content 514 of FIG. 5. The processor 618 may include a summary frame generator 620 and an indexer 624. The summary frame generator 620 may include or correspond to the summary frame generator 120 of FIG. 1A, the summary frame generator 180 of FIGS. 1B-1C, or the summary frame generator 520 of FIG. 5. The summary frame generator 620 may be configured to determine whether the video content 614 includes one or more motion events. For each motion event included in the video content 614, the summary frame generator 620 may be configured to generate a corresponding summary frame, such as a summary frame 622, that includes multiple representations of at least one corresponding object during the motion event.

The indexer 624 may be configured to index the video content 614 based on one or more summary frames generated by the summary frame generator 620. To illustrate, the indexer 624 may index the video content 614 to generate the indexed video content 642. The processor 618 may be configured to provide the indexed video content 642 to an output device, such as the display 628 (e.g., a screen). In some implementations, the processor 618 may be configured to initiate transmission of the indexed video content 642 to another device via a transmitter (not shown). The display 628 may be configured to present a representation of the indexed video content 642, as described with reference to FIGS. 7A-7B. Although the display 628 is described as being included in the device 602, in other implementations, the display 628 may be external to the device 602. For example, the display 628 may be coupled to the device 602 via a wired connection, a wireless connection, or a combination thereof. Additionally or alternatively, the display 628 may be configured to present at least one summary frame (of the video content), such as the summary frame 622, generated by the summary frame generator 620.

During operation, the device 602 may receive the request 640 to index the video content 614. The processor 618 may receive the request 640 via the input device 632. The processor 618 may identify an indicator associated with video content 614. In response to the indicator, the processor 618 may access the video content 614. The summary frame generator 620 may identify one or more motion events included in the video content. For example, the summary frame generator 620 may identify a first motion event that begins at a first time and may identify a second motion event that begins at a second time. The summary frame generator 620 may generate a first summary frame associated with the first motion event and may generate a second summary frame associated with the second motion event.

The indexer 624 may index the video content 614 based on the one or more summary frames (e.g., the first summary frame and the second summary frame) generated by the summary frame generator 620. For example, the indexer 624 may index a timeline of the video content 614 at a first location (corresponding to the first time) using the first summary frame. The indexer 624 may index the timeline at a second location (corresponding to the second time) using the second summary frame. In some implementations, the indexed video content 642 may include or correspond to the indexed timeline. The processor 618 may provide the indexed video content 642 to be presented via the display 628.

In some implementations, the processor 618 may cause the indexed video content 642 to be stored at the memory 612. After the indexed video content 642 is stored at the memory 612, the device may receive a second request for an indexed version of the video content 614. In response to the second request, the processor 618 may determine whether the indexed video content 642 is present in the memory 612. If the indexed video content 642 is present in the memory 612, the processor 618 may access the indexed video content from the memory 612 and provide the indexed video content 642 to the display 628. Alternatively, if the processor 618 determines that the indexed video content 642 is not present in the memory 612, the processor 618 may access the video content 614 and generate the indexed video content 642 using the summary frame generator 620 and the indexer 624.

In other implementations, the processor 618 may be configured to output one or more generated summary frames. For example, the processor 618 may generate a single summary frame based on the video content 614, such as a single summary frame that corresponds to a motion event in all or a portion of the video content 614 or a single summary frame that corresponds to an entirety of the video content 614. As another example, the processor 618 may generate multiple summary frames, where each summary frame corresponds to a portion of the video content 614. When multiple summary frames are generated, the associated portions of the video content 614 may be non-overlapping or may at least partially overlap in time. In some implementations, a portion of the video content 614 corresponding to a summary frame may have a fixed duration (e.g., thirty seconds), a minimum duration (e.g., 10 seconds), or a combination thereof. In other implementations, the duration of the portion may be based on a duration of a motion event period detected in the video content 614. In some examples, if the processor 618 generates multiple summary frames for a single video file, the multiple summary frames may be concatenated and provided to the display 628 as a group.

In some implementations, the device 602 may include or may be coupled to a capture unit, such as a camera, that is configured to generate the video content 614. For example, the camera may generate the video content 614 and provide the video content 614 to the memory 612. Additionally or alternatively, in some implementations, the device 602 may include or be coupled to a second memory. The second memory may store video content, such as one or more data files, where each data file includes corresponding video content. For example, the device 602 may be coupled to the second memory via a wired connection, a wireless connection, or a combination thereof. To illustrate, the second memory may be in the "cloud" and the device 602 may access the second memory via a wired network, a wireless network, or a combination thereof. In some implementations, the request 640 may request the device 602 to index video content stored at the second memory or to generate one or more summary frames based on the video content stored at the second memory.

In some implementations, one or more summary frames output by the processor 618 may include metadata. Metadata for a particular summary frame may include an identifier or a link that corresponds to a time (e.g., a location) or a portion of the video content 614 associated with the particular summary frame. The particular summary frame may be presented via the display 628. In response to a user selection of the particular summary frame, the metadata may be used to access the video content 614 and the processor 618 may cause the video content 614 (or corresponding portion thereof) to be presented via the display 628. In some implementations, presentation of the video content 614 (or portion thereof) may begin at a video frame that corresponds to a start of a motion event that caused generation of the particular summary frame. For example, the processor 618 may skip a beginning of the video content 614 and may start playing a middle portion of the video content 614.

In some implementations, the processor 618 (e.g., the indexer 624) may be configured to generate index data for the video content 614. For example, the index data may include or correspond to the index data 513 of FIG. 5. The index data may include a summary frame, such as the summary frame 622, and metadata. The metadata may include marker data that indicates a playback position of the video content, where the playback position may be associated with the summary frame 622. In some implementations, the memory 612 may be configured to store the index data.

In a particular illustrative example, the playback position may correspond to a beginning of a motion event included in the video content. The marker data may include a link, such as a uniform resource locator (URL), to a storage location of the video content 614. A selection of the link (e.g., automatically or by a user via the display 628 or the input device 632) may be configured to initiate playback of the video content 614 at the playback position. In some implementations, the metadata may include second marker data that indicates a second playback position of the portion of the video content. The second playback position may correspond to a frame of the video content 614 used by the summary frame generator 620 to generate a first representation of the multiple representations illustrated by the summary frame 622.

In some implementations, the index data may include a second summary frame (not shown) associated with a second portion of the video content 614. The second summary frame may be generated by the summary frame generator 620 and may illustrate multiple representations of a second object included in the second portion of the video content 614. If the index data includes the second summary frame, the metadata may include third marker data that indicates a third playback position that corresponds to the second portion of the video content 614.

The processor 618 (e.g., the indexer 624) may send the index data to the display 628. The display 628 may present a timeline corresponding to a time period of the video content 614. The timeline may include one or more markers. Each marker of the one or more markers may correspond to a different summary frame generated based on the video content 614.

In a particular implementation, the display 628 may be configured to present a graphical user interface (GUI) that includes the summary frame 622 that illustrates a first set of representations of an object. In some implementations, the summary frame 622 is associated with a portion of the video content 614. Additionally, the processor 618 may be electrically coupled to the display 628 and configured to receive a selection indicating a particular representation of the first set of representations. For example, the input device 632 may be configured to generate the selection. To illustrate, the selection may be included in a particular request for playback of the video content 614 at (e.g., starting from) a playback position associated with the particular representation indicated by the selection.

Referring to FIGS. 7A-7J, examples of interfaces to present at least one summary frame are shown. Each of the examples of FIGS. 7A-7J includes a corresponding interface, such as a user interface, that may be presented via a display 702. In some implementations, the user interface may include a graphical user interface (GUI). The display 702 may include or correspond to the user interface 130 of FIG. 1A, the display 556 of FIG. 5, or the display 628 of FIG. 6. It is noted that the examples described with reference to FIGS. 7A-7J are not intended to be limiting. For example, an aspect of one example of FIGS. 7A-7J may be combined with another aspect of a different example of FIGS. 7A-7J to produce an interface. Additionally, it is noted, that in the examples of FIGS. 7A-7J, no aspect or feature is considered to be required to enable two aspects of different examples of FIGS. 7A-7J to be combined.

Figure 7A:
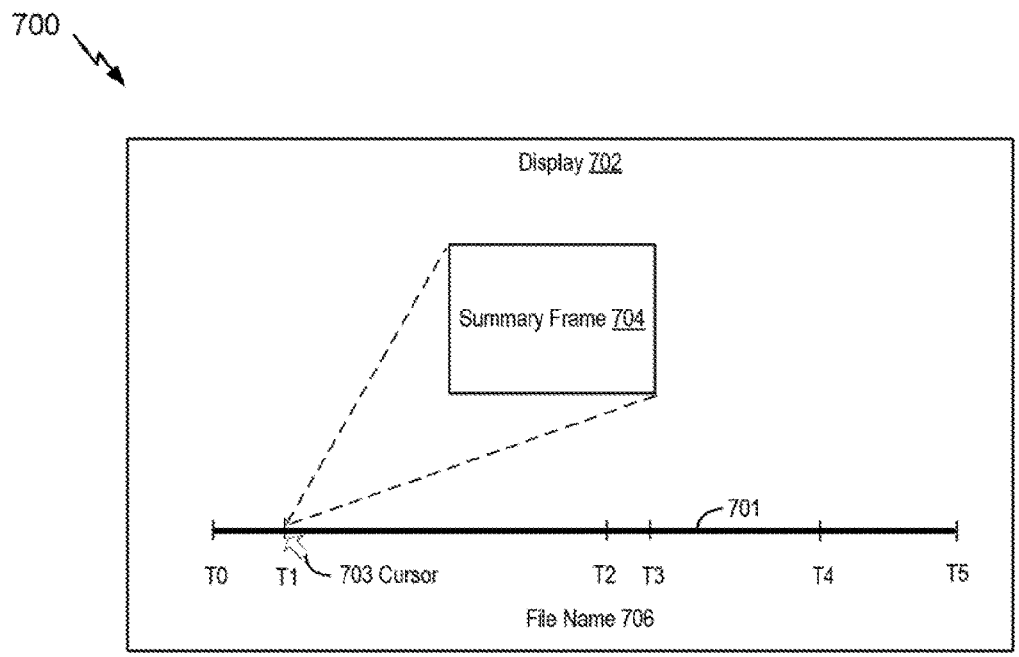
FIGS. 7A-7J are examples of interfaces to present a summary frame, a portion of video content based on the summary frame, or both.

FIG. 7A includes a first example 700 of an interface that includes a timeline 701 of video content, such as the video content 614 of FIG. 6. A file name 706 that corresponds to the video content is presented below the timeline. The timeline 701 is indexed using one or more time markers (alternatively referred to as index markers). For example, the time marks may include a first time marker T0, a second time marker T1, a third time marker T2, a fourth time marker T3, a fifth time marker T4, and a sixth time marker T5. The first time marker T0 may correspond to an initial frame of the video content and the sixth time marker T5 may correspond to final frame of the video content. The initial frame and the final frame may not include summary frames. In some implementations, the timeline 701 may not include the first time marker T0 and the sixth time marker T5. Each of the second time marker T1, the third time marker T2, the fourth time marker T3, and the fifth time marker T4 may correspond to a different summary frame.

A user that interacts with the display 702 may control a cursor 703. If the cursor is positioned over or near one of the time markers T0-T5 of the timeline 701, a summary frame corresponding to the time marker may be presented via the display 702. To illustrate, as depicted in the first example 700, the cursor 703 is near the second time marker T1 which corresponds to a summary frame 704. Accordingly, the summary frame 704 is presented (above the timeline 701) via the display 702. The summary frame 704 may summarize a motion event that is associated with the second time marker T1.

Figure 7B:
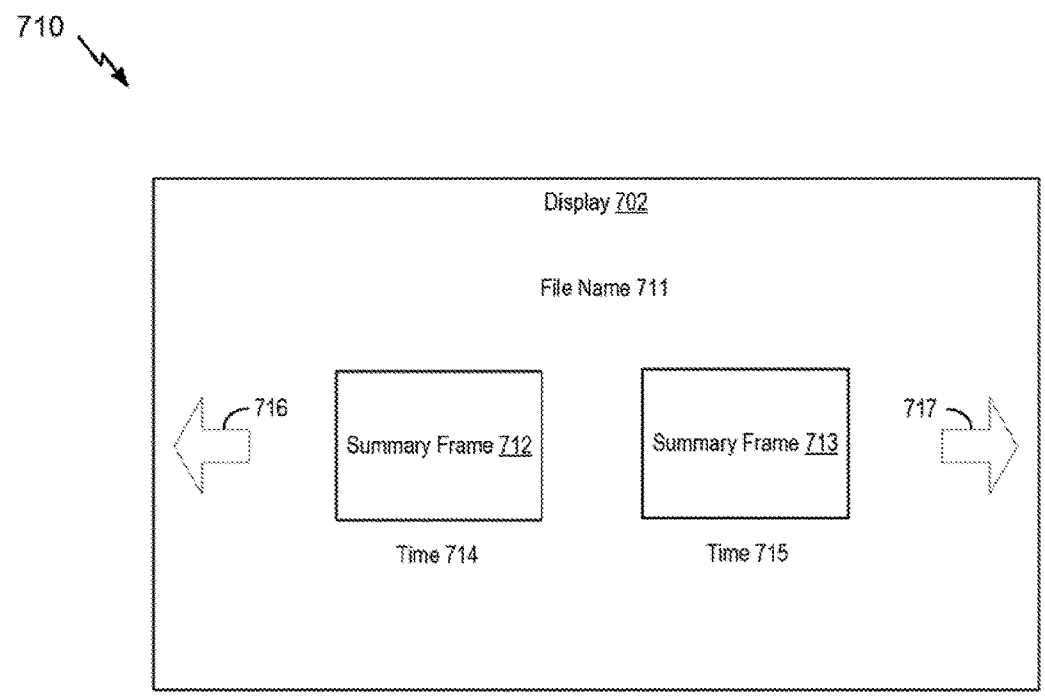

FIG. 7B includes a second example 710 of an interface that may be presented via the display 702. The second example 710 includes a file name 711 that corresponds to video content, such as the video content 614 of FIG. 6. The video content may be indexed using one or more summary frames, such as a first summary frame 712 and a second summary frame 713. The display 702 includes the first summary frame 712 and the second summary frame 713. The first summary frame 712 may be associated with a first motion event included in the video content and the second summary frame 713 may be associated with a second motion event included in the video content. The first motion event may have occurred at a first time 714 and the second motion event may have occurred at a second time 715. The first time 714 and the second time 715 (e.g., timestamps) may also be presented, as shown. In some implementations, the display 702 may also indicate, for each summary frame, a duration of the motion event that corresponds to the summary frame.

The second example 710 may also include arrows, such as a first arrow 716 and a second arrow 717. The first arrow 716 and the second arrow 717 may enable a user to view different summary frames that are used to index the video content. To illustrate, a user that interacts with the display 702 may select the first arrow 716 to cause the display to present another summary frame corresponding to a motion event that occurred prior in time to a motion event corresponding to the first summary frame 712. If no summary frame exists that is prior in time to the first summary frame 712, the first arrow 716 may not be included in the display 702. The user may select the second arrow 717 to cause the display to present another summary frame corresponding to a motion event that occurred subsequent in time to a motion event corresponding to the second summary frame 713. If no summary frame exists that is subsequent in time to the second summary frame 713, the second arrow 717 may not be included in the display 702.

In other implementations, multiple summary frames may be organized and presented using a different format. For example, the multiple summary frames may be presented in a tiled format, a list format, a rolodex format, or a mosaic format, as illustrative, non-limiting examples.

Figure 7C:
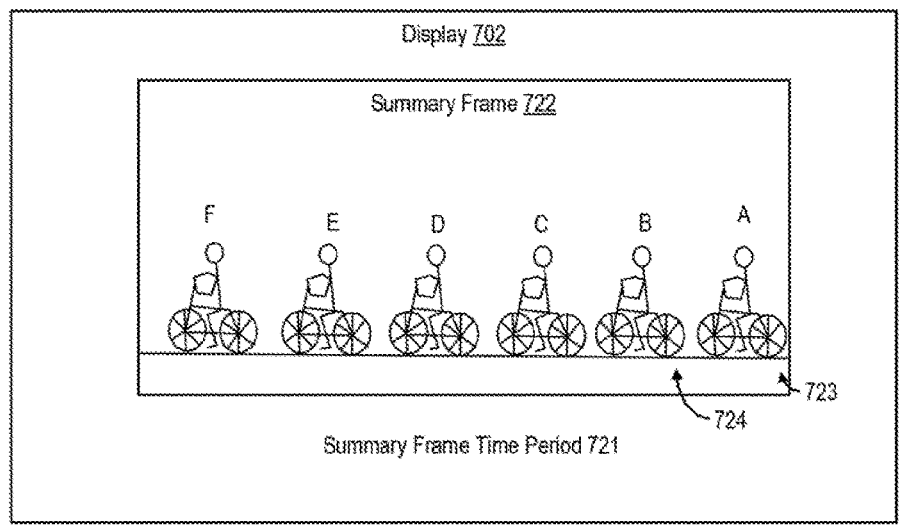

FIG. 7C includes a third example 720 of an interface that may be presented via the display 702. In the third example 720, the display 702 is configured to present a summary frame 722 and a summary frame time period 721. The summary frame 722 may be associated with at least a portion of video content. The summary frame time period 721 may indicate a beginning time, an end time, or a duration of the at least a portion of the video content associated with the summary frame 722.

The summary frame 722 may include multiple representations of an object, such as a person on a bicycle. For example, the multiple representations may include a first representation 723 and a second representation 724. The summary frame 722 may include one or more indicators that indicate a time sequence of representations. As depicted in the third example 720 the one or more indicators include the letters "A", "B", "C", "D", "E", and "F". In some implementations, each indicator may correspond to a different representation. To illustrate, the indicator "A" may correspond to the first representation 723 and the indicator "B" may correspond to the second representation "B". Accordingly, the one or more indicators included in the summary frame 722 may indicate that the object (e.g., the person on the bicycle) traveled from the right to left with reference to the summary frame 722. Although the one or more indicators have been described as being letters, the one or more indicators are not limited to letters. For example, the one or more indicators may be presented as numbers, arrows, letters, timestamps, or a combination thereof, as illustrative, non-limiting examples.

Figure 7D:
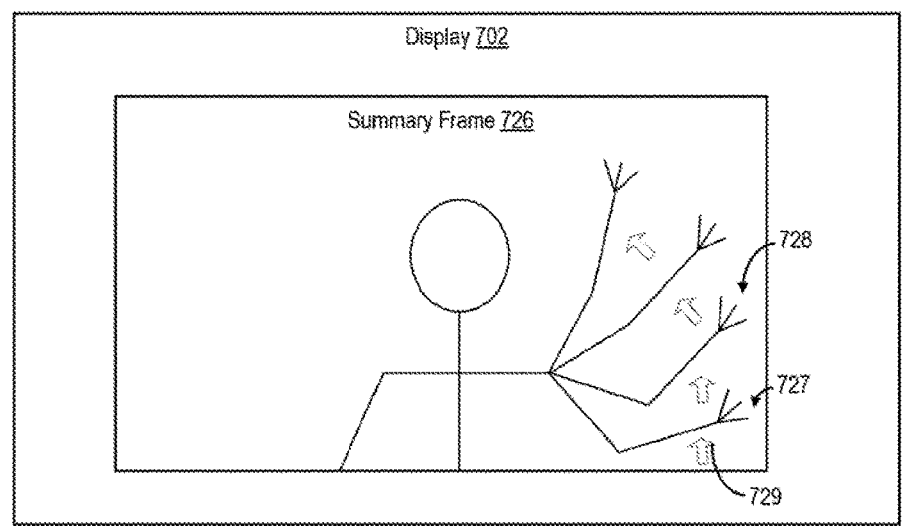

FIG. 7D includes a fourth example 725 of an interface that may be presented via the display 702. In the fourth example 725, the display 702 is configured to present a summary frame 726. The summary frame 726 may be associated with at least a portion of video content. The summary frame 726 may include multiple representations of an object, such as an arm of a person. For example, the multiple representations may include a first representation 727 and a second representation 728. The summary frame 726 may include one or more indicators that indicate a sequence of the multiple representations in time. As depicted in the fourth example 725, the one or more indicators include arrows, such as an arrow 729. Although multiple indicators are described with reference to FIG. 7D, in other implementations, the summary frame 726 may include a single indicator, such as a single arrow or a single line segment, that indicates a travel path of an object (e.g., an arm).

Figure 7E:
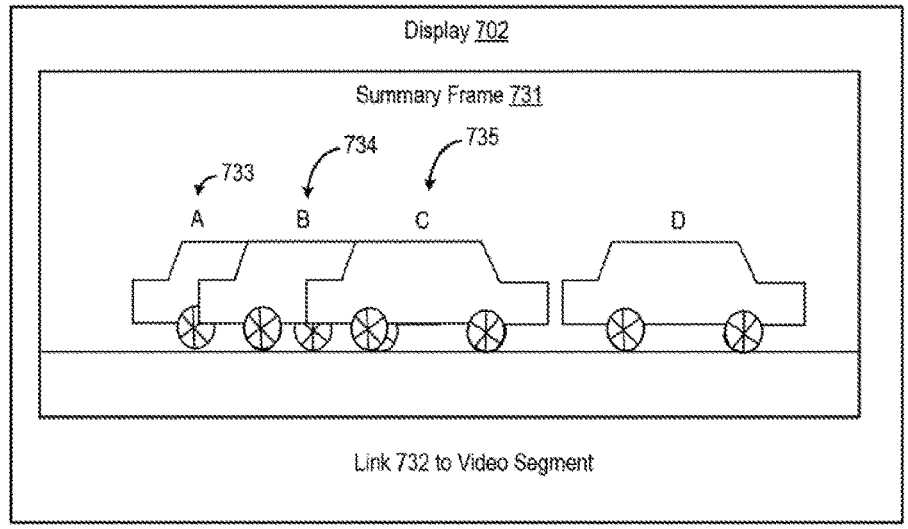

FIG. 7E includes a fifth example 730 of an interface that may be presented via the display 702. In the fifth example 730, the display 702 is configured to present a summary frame 731 and a link 732 to a video segment. The summary frame 731 may be associated with at least a portion of video content. The link 732 may provide a link to video segment that is associated with the portion of the video content. To illustrate, if the link 732 presented via the display 702 is selected by a user, the display 702 may display the video segment (e.g., a video clip) corresponding to the summary frame 731.

The summary frame 731 may include multiple representations of an object, such as a car. For example, the multiple representations may include a first representation 733, a second representation 734, and a third representation 735. The summary frame 731 may include one or more indicators that indicate a sequence of the multiple representations in time. As depicted in the third example 720 the one or more indicators include the letters "A", "B", "C", and "D". The one or more indicators included in the summary frame 731 may indicate that the object (e.g., the car) traveled from the left to right with reference to the summary frame 731. As depicted in the summary frame 731, a representation later in time may be "layered above" a representation earlier in time. To illustrate, the second representation 734 overlaps the first representation 733 and the third representation 735 overlaps the first representation 733 and the second representation 734. In other implementations, a particular representation may be "layered above" one or more representations that are later in time with respect to the particular representation.

Figure 7F:
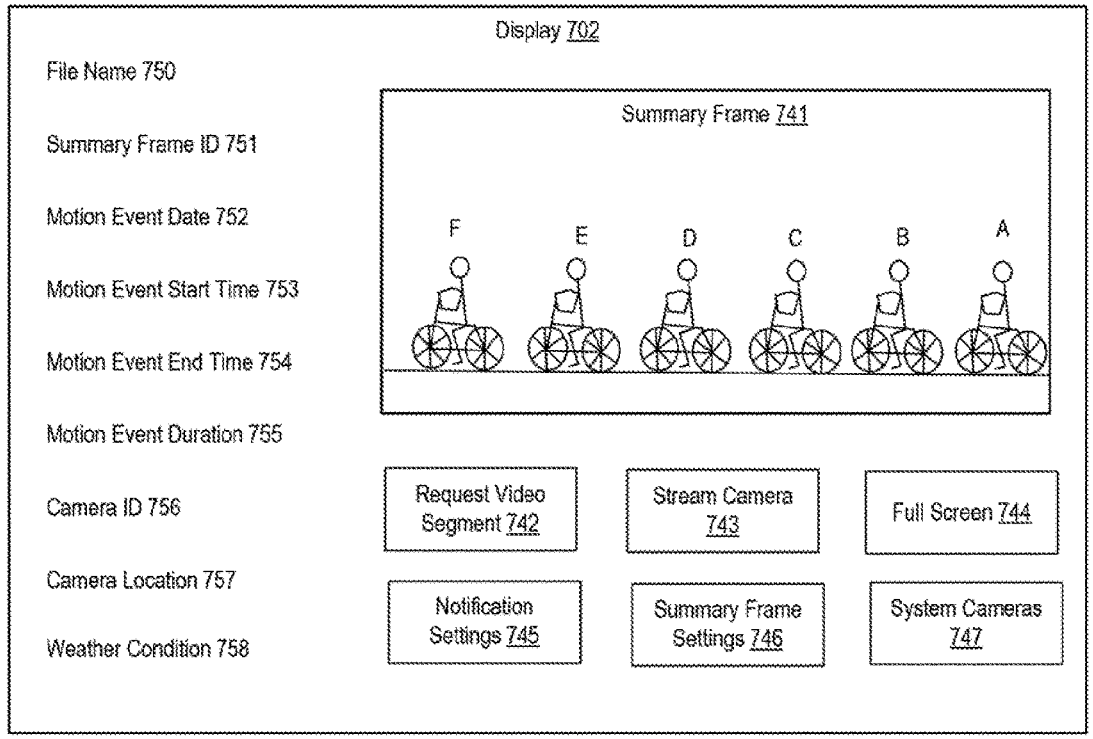

FIG. 7F includes a sixth example 740 of an interface that may be presented via the display 702. In the sixth example 740, the display 702 is configured to present a summary frame 741, data values 750-758 (e.g., textual information), and selectable features 742-747. The summary frame 741 may be associated with at least a portion of video content. The video content may have been generated by a camera. The video content may be included in a data file having a file name. The summary frame 741 may be associated with a motion event included in the video content.

The data values 750-758 may correspond to metadata associated with the summary frame 741. For example, the metadata may include or correspond to the metadata 124 of FIG. 1A, the metadata 187 of FIG. 1B-1C, or the metadata 524 of FIG. 5. The data values 750-758 may include a file name 750, a summary frame identifier 751, a motion event date 752, a motion event start time 753, a motion event end time 754, a motion event duration 755, a camera identifier 756, a camera location 757, and a weather condition 758. The file name 750 may include or correspond to the data file that includes the video content. The summary frame identifier 751 may uniquely identify the summary frame 741. The motion event date 752, the motion event start time 753, the motion event end time 754, and the motion event duration 755 may correspond to the motion event included in the video content. The camera identifier 756 and the camera location 757 may include or correspond to the camera that generated the video content. The weather condition 758 may indicate an environmental condition determined (e.g., detected) in the video content, measured by the camera during generation of the video content, or determined by the camera during generation of the video content, such as by accessing a third-party weather information service.

The selectable features 742-747 may include a request video segment feature 742, a stream camera feature 743, a full screen feature 744, a notification settings feature 745, a summary frame settings feature 746, and a system cameras feature 747. In response to a user selection of the request video segment feature 742, the display 702 may present a video clip of the portion of the video content that corresponds to the summary frame 741. In response to a user selection of the stream camera feature 743, the display 702 may display a video stream (e.g., a real-time video stream) generated by the camera. In response to a user selection of the full screen feature 744, the display 702 may display a full screen version of the summary frame 741. In response to a user selection of the notification settings feature 745, the display 702 may present an interface that enables user to set or modify one or more notification settings or notification parameters, such as a device address where a notification, such the notification 540 of FIG. 5, is to be delivered. The one or more notification settings or notification parameters may be associated with operation of a notification generator, such as the notification generator 126 of FIG. 1A, the notification generator 182 of FIGS. 1B-1C, the notification generator 526 of FIG. 5, or a combination thereof.

In response to a user selection of the summary frame settings feature 746, the display 702 may present an interface that enables user to set or modify one or more summary frame settings or summary frame parameters, such as a number of representations (of an object) to be included in a particular summary frame, such as the summary frame 741. The one or more summary frame settings or summary frame parameters may be associated with operation of a summary frame generator, such as the summary frame generator 120 of FIG. 1A, the summary frame generator 180 of FIGS. 1B-1C, the summary frame generator 520 of FIG. 5, the summary frame generator 620 of FIG. 6, or a combination thereof. In some implementations, in response to setting or changing a particular summary frame setting or a particular summary frame parameter, the summary frame 741 presented via the display 702 may be updated. For example, if a number of representations to be included in the summary frame 741 is changed from six to seven, the summary frame 741 may be updated to include seven representations of a person on a bicycle.

In response to a user selection of the system cameras feature 747, the display 702 may present an indication (e.g., a list, a map, etc.) of one or more cameras available to a particular user. For example, the particular user may be authorized to receive one or more summary frames from each of the one or more cameras. As another example, the particular user may be authorized to stream video content generated by each of the one or more cameras. In some examples, the user may be able to user the interface activate, deactivate, or reorient cameras included in the list of cameras.

Figure 7G:
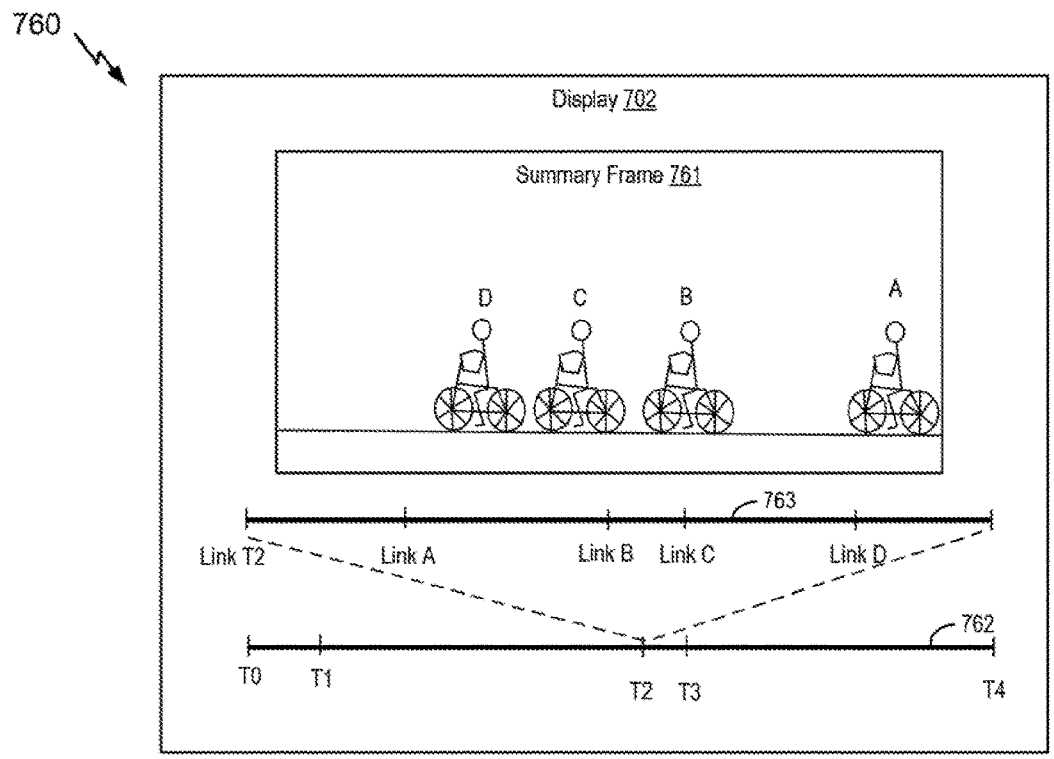

FIG. 7G includes a seventh example 760 of an interface that may be presented via the display 702. In the seventh example 760, the display 702 is configured to present a summary frame 761 associated with a portion of video content, a first timeline 762 corresponding to the video content, and a second timeline 763 corresponding to the portion of the video content. The first timeline 762 includes time marks T0-T4. A first time mark T0 corresponds a beginning of the video content, a second time mark T1 is associated with a first summary frame, a third time mark T2 is associated with a second summary frame (e.g., the summary frame 761), a fourth time mark T3 is associated with a third summary frame, and a fifth time mark T4 corresponds to an end of the video content.

In response to a selection of one of the time marks T1-T3, a corresponding summary frame is presented. For example, the seventh example 760 depicts presentation of the summary frame 761 in response to selection of the third time mark T2. The second timeline 763 of the portion of the video content may also be displayed. The second timeline 763 also includes multiple time marks. Each of the time marks in the second timeline 763 correspond to a different playback position (e.g., a different frame) of the portion video content and may include a link that, when selected, causes playback of the video content at (e.g., starting from) the playback position. For example, a first time mark (Link T2) corresponds to a first frame of the portion of video content. A second time mark (Link A) corresponds to a second frame used as a first key frame to generate the summary frame 761, a third time mark (Link B) corresponds to a third frame used as a second key frame to generate the summary frame 761, a fourth time mark (Link C) corresponds to a fourth frame used as a third key frame to generate the summary frame 761, and a fifth time mark (Link D) corresponds to a fifth frame used as a fourth key frame to generate the summary frame 761. In some examples, playback may also, or alternatively, be initiated based on selection of a particular representation of a set of representations included in the summary frame 761. For example, a selection of a particular representation (of a person on a bike) that corresponds to the indicator "B" may initiate playback of the video content at the third frame.

Figure 7H:
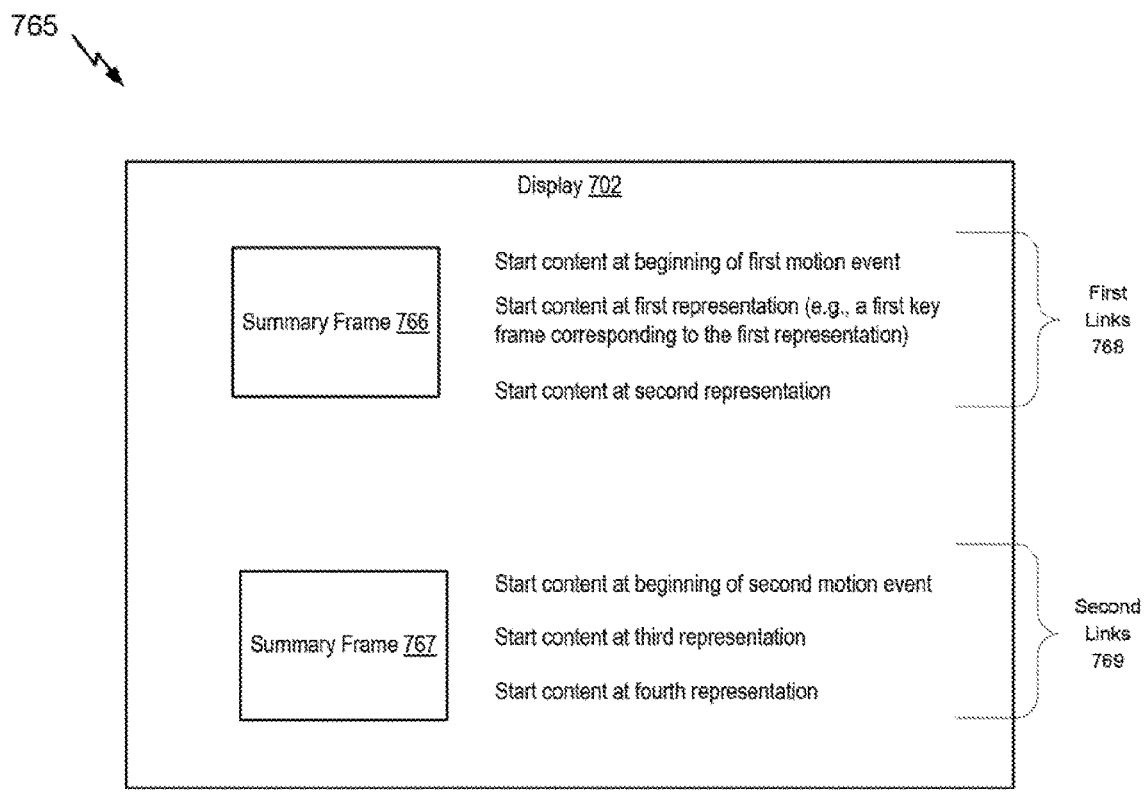

FIG. 7H includes an eighth example 765 of an interface that may be presented via the display 702. In the eighth example 765, the display 702 is configured to concurrently present a first summary frame 766 and a second summary frame 767. The first summary frame 766 may be associated with a first motion event and may include a first set of representations of a first object during the first motion event. For example, the first set of representations may include at least two representations, such as a first representation and a second representation. The first representation may correspond to a first key frame used to generate the first summary frame 766 and the second representation may correspond to a second key frame used to generate the first summary frame 766. The second summary frame 767 may be associated with a second motion event and may include a second set of representations of a second object during the second motion event. For example, the second set of representations may include at least two representations, such as a third representation and a fourth representation. The third representation may correspond to a third key frame used to generate the second summary frame 767 and the fourth representation may correspond to a fourth key frame used to generate the second summary frame 767. The first object and the second object may be the same object or may be different objects.

The display 702 may also be configured to present a first set of links 768 and a second set of links 769. The first set of links 768 may correspond to the first summary frame 766 and the second set of links 769 may correspond to the second summary frame 767. Each link, when selected, may be configured to initiate playback of video content at a corresponding playback position.

Figure 7I:
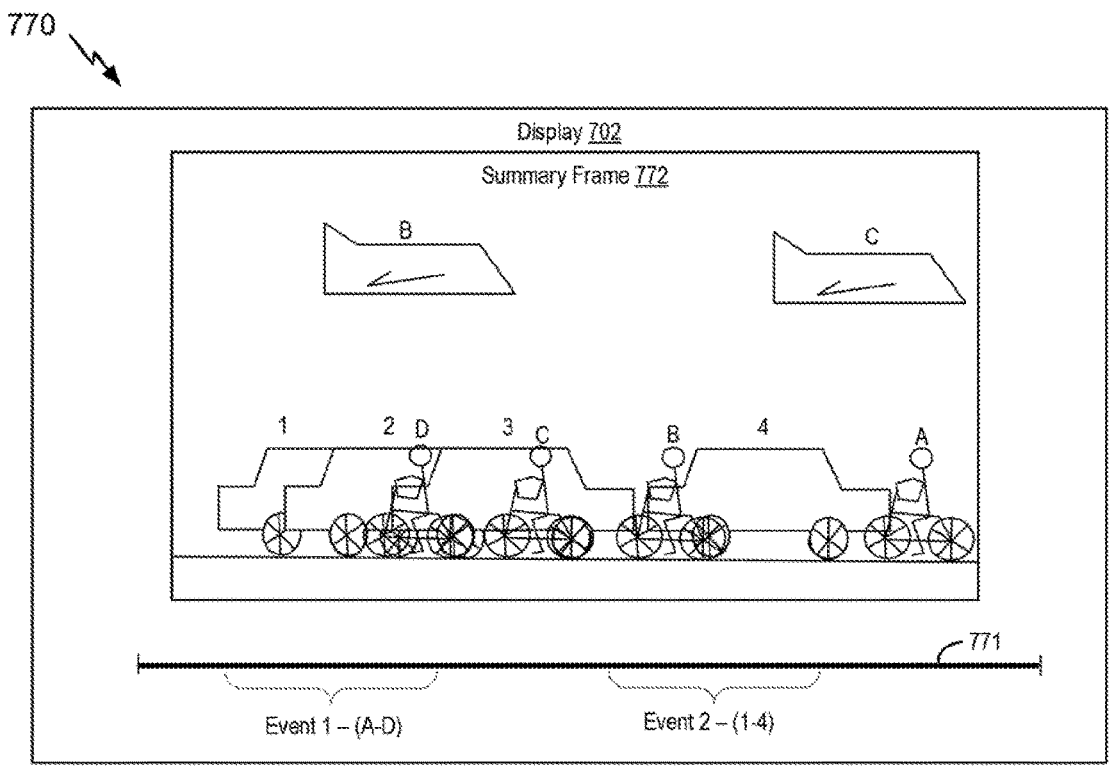

FIG. 7I includes a ninth example 770 of an interface that may be presented via the display 702. In the ninth example 770, the display 702 is configured to present a summary frame 772 and a timeline 771. The timeline 771 corresponds to video content that includes two motion events, such as event 1 and event 2. For each motion event, four key frames were selected to generate a set of representations. During the first motion event, two objects (e.g., an airplane and a person on a bicycle) were in motion. It is noted that the airplane was detected in two out of the four key frames of the first event. During the second motion event, a car was in motion. The summary frame 772 represents an implementation of a concatenated summary frame that includes multiple sets of representations from multiple motion events (e.g., event 1 and event 2). Selection of the event 1 on the timeline 771 may cause the summary frame 772 to present a first set of representations corresponding to the event 1 and to remove (e.g., hide) a second set of representations associated with the event 2.

Figure 7J:
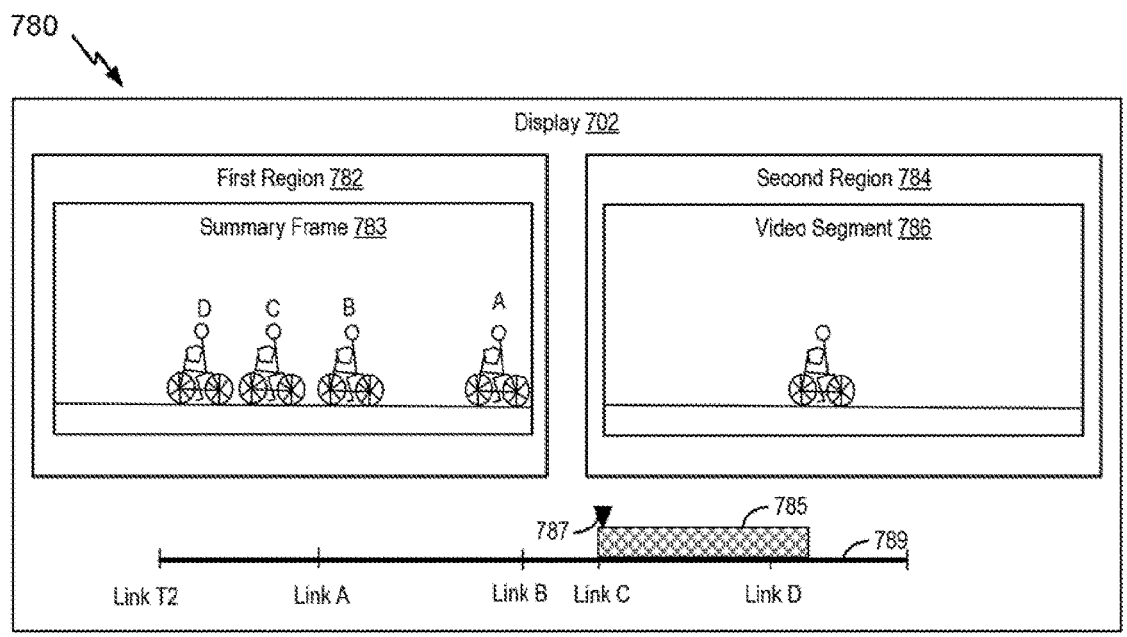

FIG. 7J includes a tenth example 780 of an interface that may be presented via the display 702. In the tenth example 780, the display 702 is configured to present a first region 782 (e.g., a summary frame region, such as a GUI window), a second region 784 (e.g., a playback region, such as another GUI window), and a timeline 789. The first region 782 may include one or more summary frames. For example, the first region 782 may include a summary frame 783 that is associated with a portion (e.g., a motion event) of video content. The timeline 789 may correspond to the portion of video content. The timeline 789 may be indexed according to a beginning of the motion event and according to one or more key frames used to generate the summary frame 783.

The second region 784 may be configured to present a video segment 786 (e.g., a video clip), as described herein. The timeline 789 may enable a user to identify a playback portion 785 (e.g., a time period) of the video content to be played in the second region 784. A playback position indicator 787 may indicate a frame of the video content being presented in the second region 784. In other implementations, one of the representations included in the summary frame 783 may be selected to initiate, in the second region 784, playback of the video content at a playback position corresponding to the representation. Additionally, one or more of the time marks (e.g., links) used to index the timeline 789 may also be selected to initiate, in the second region 784, presentation of video content at a particular playback position.

Although the first region 782 and the second region 784 are illustrated as being side by side in the display 702 of FIG. 7J, in other implementations, the first region 782 and the second region 784 may be positioned differently. For example, the first region 782 may be positioned partially or completely "above" (e.g., superimposed on) the second region 784, or vice versa. Additionally or alternatively, in some implementations, a location of the first region 782, a location of the second region 784, or both may be movable. For example, the location of one or more of the regions 782, 784 in the display 702 may be moved in response to an input. To illustrate, a user may touch the first region 782 of the display 702 followed by the user touching a new location of the display 702 where the first region 782 is to be moved. Alternatively, the user may select and "drag" the regions 782, 784 to desired positions of the display 702.

It should be noted that although various examples described herein reference user selection via input, such as on a touch screen, it is to be understood that in alternative implementations, "selections" may be performed in other ways. For example, a selection may be made via touch, tracking of a user's eye (e.g., gaze detection), "hovering" a hand, finger, stylus, or other device over an item without providing touch input, etc.

In some implementations, an aspect of one example of FIGS. 7A-7J may be combined with another aspect of a different example of FIGS. 7A-7J to produce an interface. To illustrate, the second example 710 of FIG. 7B may include a corresponding timeline, as described with reference to the first example 700 of FIG. 7A, for each of the first summary frame 712 and the second summary frame 713.

Figure 8:
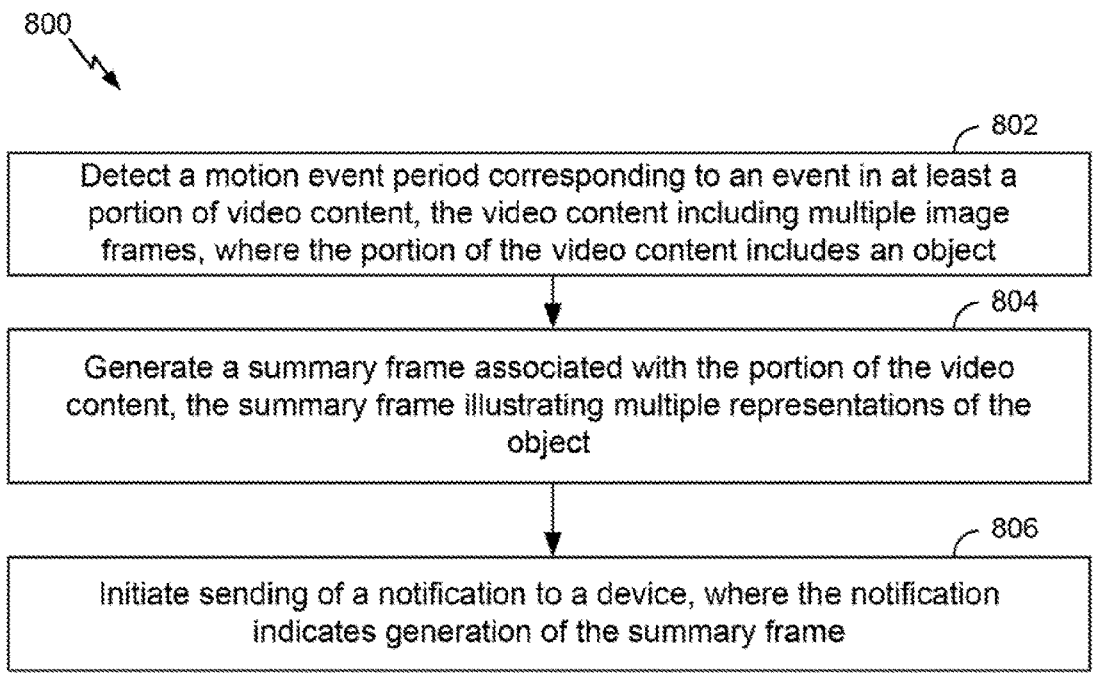
FIG. 8 is a flow diagram of a third illustrative example of a method of generating a summary frame.

Referring to FIG. 8, a flow diagram of an illustrative example of a method 800 of generating a summary frame is depicted. The summary frame may include or correspond to the summary frame 122 of FIG. 1A, the first summary frame 198, the second summary frame 199 of FIG. 1C, the summary frame 238 of FIG. 2, the summary frame 522 of FIG. 5, the summary frame 622 of FIG. 6, the summary frame 704 of FIG. 7A, the first summary frame 712, the second summary frame 713 of FIG. 7B, the summary frame 722 of FIG. 7C, the summary frame 726 of FIG. 7D, the summary frame 731 of FIG. 7E, the summary frame 741 of FIG. 7F, the summary frame 761 of FIG. G, the first summary frame 766, the second summary frame 767 of FIG. 7H, the summary frame 772 of FIG. 7I, the summary frame 783 of FIG. 7J, or a combination thereof. The method 800 may be performed by the device 102 (e.g., the processor 118) of FIG. 1A, the camera 162 (e.g., processor 174) of FIGS. 1B-1C, the summary frame generator 120 of FIG. 2, the video system 502 (e.g., the controller 510, the first camera 530, or the second camera 532) of FIG. 5, the device 602 (e.g., the processor 618) of FIG. 6, or a combination thereof.

The method 800 may include detecting a motion event period corresponding to an event in at least a portion of video content, the video content including multiple image frames, where the portion of the video content includes an object at 802. The data content may be received from a camera or a memory (e.g., a buffer). The video content may include or correspond to the video content 140 (or the video content 114) of FIG. 1A, the video content 167 of FIG. 1B-1C, the image frames 240 of FIG. 2, the video content 534 of FIG. 5, or the video content 614 of FIG. 6. In some implementations, detecting the motion event period may include detecting a beginning of the motion event period and detecting an end of the motion event period.

The method 800 may further include generating a summary frame associated with the portion of the video content, the summary frame illustrating multiple representations of an object, at 804. The summary frame provides a visual summary of the motion event period. In some implementations, the notification may include multiple summary frames, such as a first summary frame corresponding to a first motion event and a second summary frame corresponding to a second motion event. The method 800 may further include initiating sending of a notification to a device, where the notification indicates generation of the summary frame, at 806. For example, the notification may include the summary frame or may include an indicator that indicates the summary frame is being or has been generated. The notification may include or correspond to the notification 128 of FIG. 1A, the notification 188 of FIGS. 1B-1C, the notification 540 of FIG. 5, or a combination thereof. The device may include or correspond to the controller 510 of FIG. 1 or the device 550 of FIG. 1.

In some implementations, the method 800 may include maintaining a background model based on at least one of the multiple image frames. For example, frame differencing, mean filtering, Gaussian averaging, etc. may be applied to the at least one of the multiple image frames to generate the background model. The background model may be used to identify a beginning of the motion event period, an end of the motion event period, or both. To illustrate, the beginning of the motion event period may be identified by comparing an image frame (of the multiple image frames) to the background model. In response to identifying the beginning of the motion event period, the method 800 may include indexing the video content based on the image frame.

In some implementations, the method 800 may include selecting two or more image frames of the multiple image frames as key frames. The two or more image frames may be buffered during the motion event period. The video content may be indexed using each of the two or more image frames selected as key frames. For example, the video content may be indexed to generate indexed video content, such as the indexed video content 170 of FIGS. 1B-1C, the indexed video content 514 of FIG. 5, or the indexed video content 642 of FIG. 6. Additionally, the method 800 may include, for each of the two or more image frames, combining a representation of the object from the image frame with the background model.

In some implementations, selecting the two or more image frames may include, for each image frame of the multiple image frame, analyzing the image frame to determine a corresponding analysis result value. Multiple analysis result values of the multiple image frames may be added together to determine a total analysis result value of the motion event period. The total analysis result value may be divided by a number of key frames to determine a threshold value.

In other implementations, selecting a first image frame of the two or more image frames may include analyzing the first image frame to determine a corresponding analysis result value. An accumulated value may be determined based on the corresponding analysis result value. For example, the accumulated value may be determined by adding the corresponding analysis result value to an existing accumulated value. The method 800 may include comparing the accumulated value to a threshold value. The first image frame may be selected as a key frame in response to the accumulated value being greater than or equal to the threshold value.

The method 800 thus enables generation of the summary frame associated with a motion event period. The summary frame may enable a viewer of the summary frame to quickly gain an understanding of activity that occurred during the motion event period. Additionally, by sending the notification that includes the summary frame to a device, a data size of the notification may be reduced as compared to sending a notification that includes a video segment (e.g., a video clip) associated with the motion event period. Further, the notification that includes the summary frame (and not the video segment) may be provided more quickly, using less power and less bandwidth, than a notification that includes the video segment.

Figure 9:
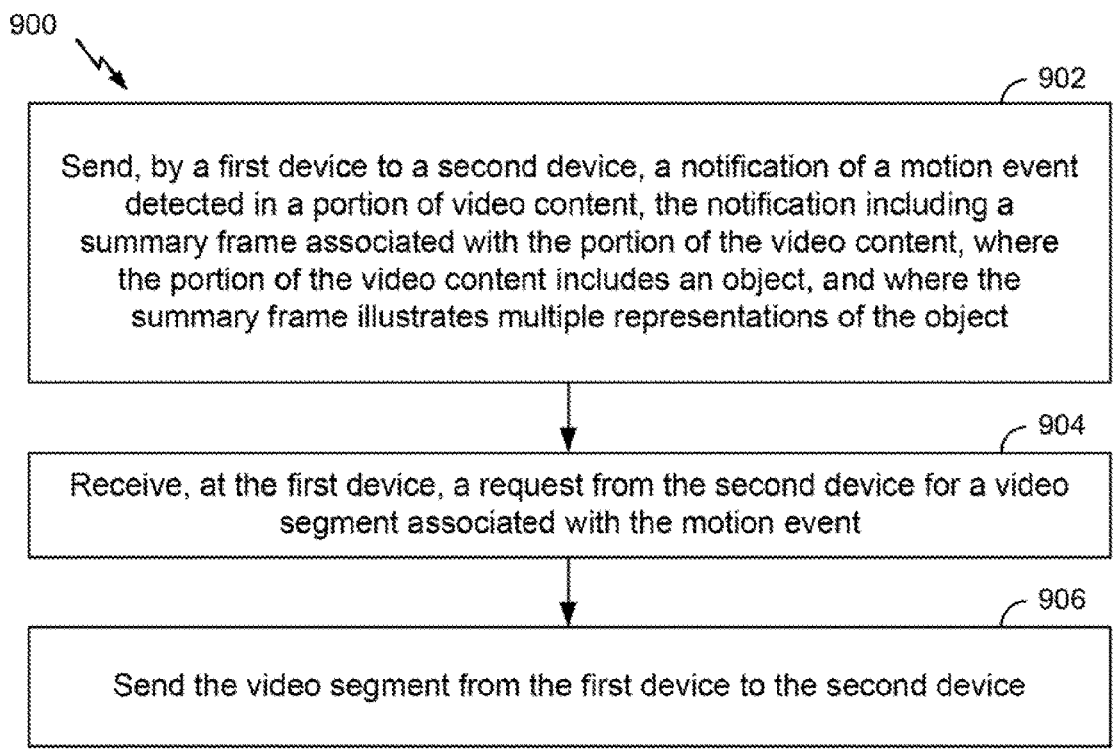
FIG. 9 is a flow diagram of an illustrative example of a method of communicating a summary frame.

Referring to FIG. 9, a flow diagram of an illustrative example of a method 900 of communicating a summary frame is depicted. The summary frame may include or correspond to one or more of the summary frames 122, 198, 199 of FIGS. 1A-1C, the summary frame 238 of FIG. 2, the summary frame 522 of FIG. 5, the summary frame 622 of FIG. 6, one or more of the summary frames 704, 712, 713, 722, 726, 731, 741, 761, 766, 767, 772, 783 of FIGS. 7A-7J, or a combination thereof. The method 900 may be performed by the device 102 of FIG. 1A, the camera 162 of FIGS. 1B-1C, the video system 502 (e.g., the controller 510, the first camera 530, or the second camera 532), the device 550 of FIG. 5, the device 602 of FIG. 6, or a combination thereof.

The method 900 may include sending, by a first device to a second device, a notification of a motion event detected in a portion of video content, the notification including a summary frame associated with the portion of the video content, where the portion of the video content includes an object, and where the summary frame illustrates multiple representations of the object, at 902. The portion of the video content may include an entirety of the video content or less than the entirety of the video content. In some implementations, the first device may be included in a video surveillance system and the video content may have been generated by a capture device (e.g., a camera) of the video surveillance system. The second device may include or correspond to the device 550 of FIG. 5.

The method 900 may further include receiving, at the first device, a request from the second device for a video segment associated with the motion event, at 904. For example, the request may include or correspond to the request 544 of FIG. 5. In some implementations, in response to receiving the request, a camera identifier of a camera that generated the video segment (e.g., that generated one or more image frames included in the video segment) may be determined. The video segment may be received from a storage location based on the camera identifier. To illustrate, the method 900 may include accessing the video segment from a memory of a camera that generated the video content.

The method 900 may also include sending the video segment from the first device to the second device, at 906. For example, the video segment may include or correspond to the video segment 548 of FIG. 5. In some implementations, a first data size of the notification may be less than a second data size of the video segment.

In some implementations, the notification may include a single summary frame. In other implementations, the notification may include multiple summary frames, such as a first summary frame and a second summary frame. The first summary frame may be associated with a first video segment and the second summary frame may be associated with a second video segment. The first summary frame may illustrate multiple representations of a first object included in the first video segment and the second summary frame may illustrate multiple representations of a second object included in the second video segment. The first object and the second object may be different objects or may be the same object. In some implementations the first video segment and the second video segment may be generated by the same camera. In other implementations, the first video segment and the second video segment may be generated by different cameras.

In some implementations, the method 900 may include receiving authentication information from the second device. For example, the authentication information may include or correspond to the authentication information 546 of FIG. 1. The method 900 may include validating the authentication information prior to sending the video segment to the second device. The authentication information may be validated to ensure that the device is authorized to receive the video segment.

In some implementations, the summary frame may include metadata, such as the metadata 124 of FIG. 1A, the metadata 187 of FIG. 1B-1C, or the metadata 524 of FIG. 5. The metadata may include an identifier of the video segment, an indicator of an image frame of the video segment used to generate a representation of the multiple representations, a first timestamp associated with a start of the video segment, a second timestamp associated with an end of the video segment, a link to a storage location of a memory where the video segment is stored, or a combination thereof.

The method 900 thus enables the summary frame associated with a motion event to be provided to the second device prior to sending the video segment to the second device. The summary frame may enable a viewer of the summary frame at the second device to quickly gain an understanding of activity that occurred during the motion event without having to view the video segment. Accordingly, a user of the second device may decide to request the video segment after receiving the summary frame. Additionally, by sending the notification that includes the summary frame to the second device, a data size of the notification may be reduced as compared to sending the video segment to the second device. Accordingly, the notification that includes the summary frame (and not the video segment) may be provided to the second device more quickly, using less power and less bandwidth, than providing the video segment.

Figure 10:
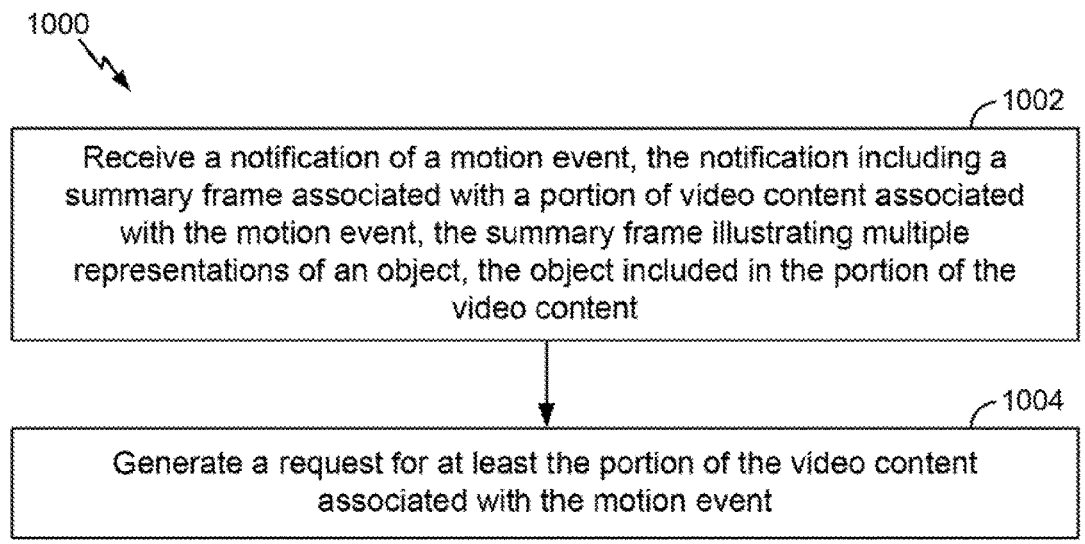
FIG. 10 is a flow diagram of an illustrative example of a method of receiving a summary frame.

Referring to FIG. 10, a flow diagram of an illustrative example of a method 1000 of receiving a summary frame is depicted. The summary frame may include or correspond to one or more of the summary frames 122, 198, 199 of FIGS. 1A-1C, the summary frame 238 of FIG. 2, the summary frame 522 of FIG. 5, the summary frame 622 of FIG. 6, one or more of the summary frames 704, 712, 713, 722, 726, 731, 741, 761, 766, 767, 772, 783 of FIGS. 7A-7J, or a combination thereof. The method 1000 may be performed by the device 102 of FIG. 1A, the camera 162 of FIGS. 1B-1C, the video system 502 (e.g., the controller 510, the first camera 530, or the second camera 532), the device 550 of FIG. 5, the device 602 of FIG. 6, or a combination thereof.

The method 1000 may include receiving a notification of a motion event, the notification including a summary frame associated with a portion of video content associated with the motion event, the summary frame illustrating multiple representations of an object, the object included in the portion of the video content, at 1002. For example, the notification may include or correspond to the notification 128 of FIG. 1A, the notification 188 of FIGS. 1B-1C, the notification 540 of FIG. 5, or a combination thereof. The notification may be received from a device, such as a device included in a video surveillance system. In some implementations, the notification may include an email message or a short message service (SMS) message, as illustrative, non-limiting examples. In some implementations, the notification may be received via a wireless network. After receiving the notification, the summary frame may be presented via a display coupled to a device that received the notification.

The method 1000 may further include generating a request for at least the portion of the video content associated with the motion event, at 1004. For example, the request may include or correspond to the request 544 of FIG. 5. The video content may include or correspond to the video content 140 (or the video content 114) of FIG. 1A, the video content 167 of FIG. 1B-1C, the image frames 240 of FIG. 2, the video content 534 of FIG. 5, or the video content 614 of FIG. 6. In some implementations, after sending the request, the method 1000 may include receiving the portion of the video content. In response to receiving the portion of the video content, the portion of the video content may be presented via a display, stored in a memory, or both.

In some implementations, an input may be received via an interface, such as a user interface (e.g., a key pad, a touch screen, a microphone, etc.). For example, the interface may include or correspond to user interface 130 of FIG. 1A, the interface 562 of FIG. 5, or the input device 632 of FIG. 6. The input may be associated with initiating the request. For example, the request may be generated in response to receiving the input. Additionally, in response to the input, the request may be transmitted via at least one network, such as a wireless network, as an illustrative, non-limiting example.

The method 1000 thus enables a device to receive the summary frame to enable a viewer of the summary frame to quickly gain an understanding of activity that occurred during the motion event. Accordingly, based on the summary frame, the user may decide whether to request a video segment (e.g., a video clip) corresponding to the motion event.

Figure 11:
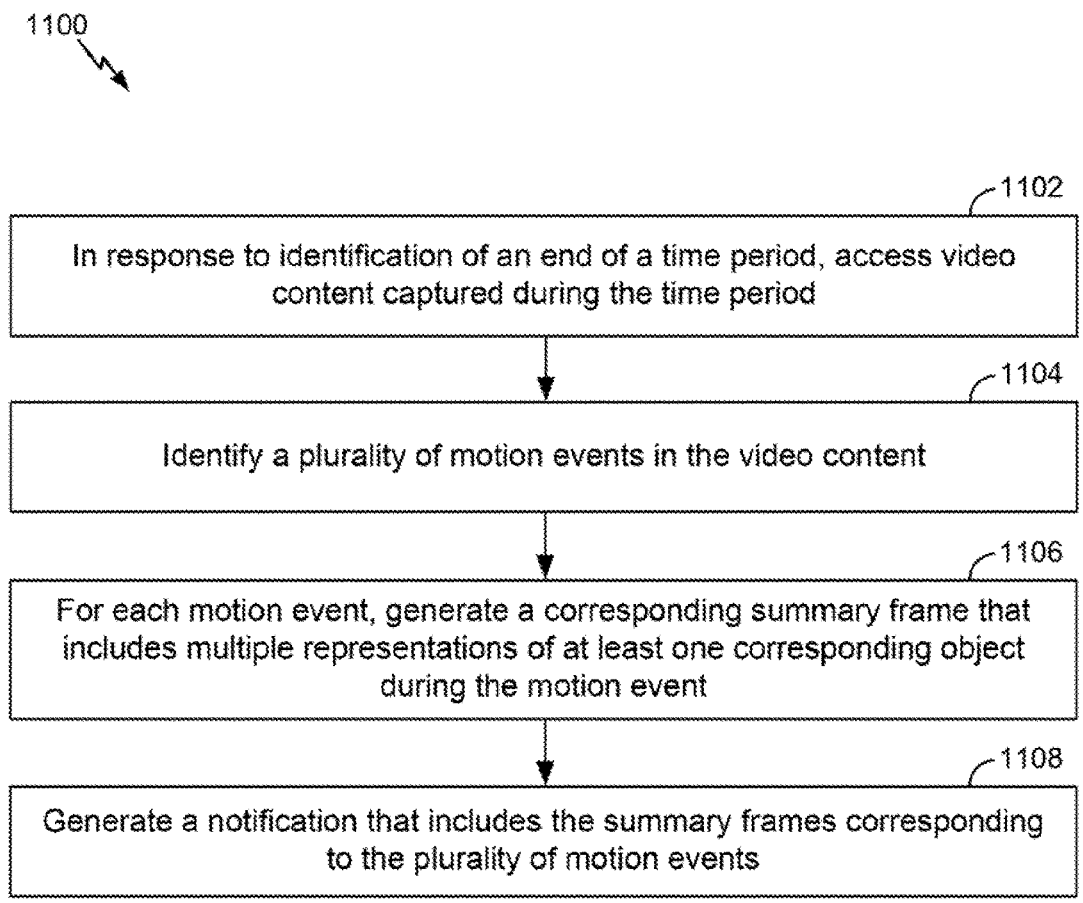
FIG. 11 is a flow diagram of an illustrative example of a method of concatenating multiple summary frames.

Referring to FIG. 11, a flow diagram of an illustrative example of a method 1100 of "concatenating" multiple summary frames is depicted. The multiple summary frames may include or correspond to one or more of the summary frames 122, 198, 199 of FIGS. 1A-1C, the summary frame 238 of FIG. 2, the summary frame 522 of FIG. 5, the summary frame 622 of FIG. 6, one or more of the summary frames 704, 712, 713, 722, 726, 731, 741, 761, 766, 767, 772, 783 of FIGS. 7A-7J, or a combination thereof. The method 1100 may be performed by the device 102 of FIG. 1A, the camera 162 of FIGS. 1B-1C, the video system 502 (e.g., the controller 510, the first camera 530, or the second camera 532), the device 550 of FIG. 5, the device 602 of FIG. 6, or a combination thereof.

The method 1100 may include, in response to identification of an end of a time period, accessing video content captured during the time period, at 1102. The video content may include or correspond to the video content 140 (or the video content 114) of FIG. 1A, the video content 167 of FIG. 1B-1C, the image frames 240 of FIG. 2, the video content 534 of FIG. 5, or the video content 614 of FIG. 6. The method 1100 may further include identifying a plurality of motion event in the video content, at 1104. The method 1100 may also include, for each motion event, generating a corresponding summary frame that includes multiple representation of a least one corresponding object during the motion event, at 1106. The method 1100 may include generating a notification that includes the summary frames corresponding to the plurality of motion events, at 1108. To illustrate, the notification may include a summary frame concatenation, such as the summary frame concatenation 196 of FIG. 1C. For example, the notification may include or correspond to the notification 128 of FIG. 1A, the notification 188 of FIGS. 1B-1C, the notification 540 of FIG. 5, or a combination thereof. The method 1100 thus enables generation of a notification that includes multiple summary frames.

Figure 12:
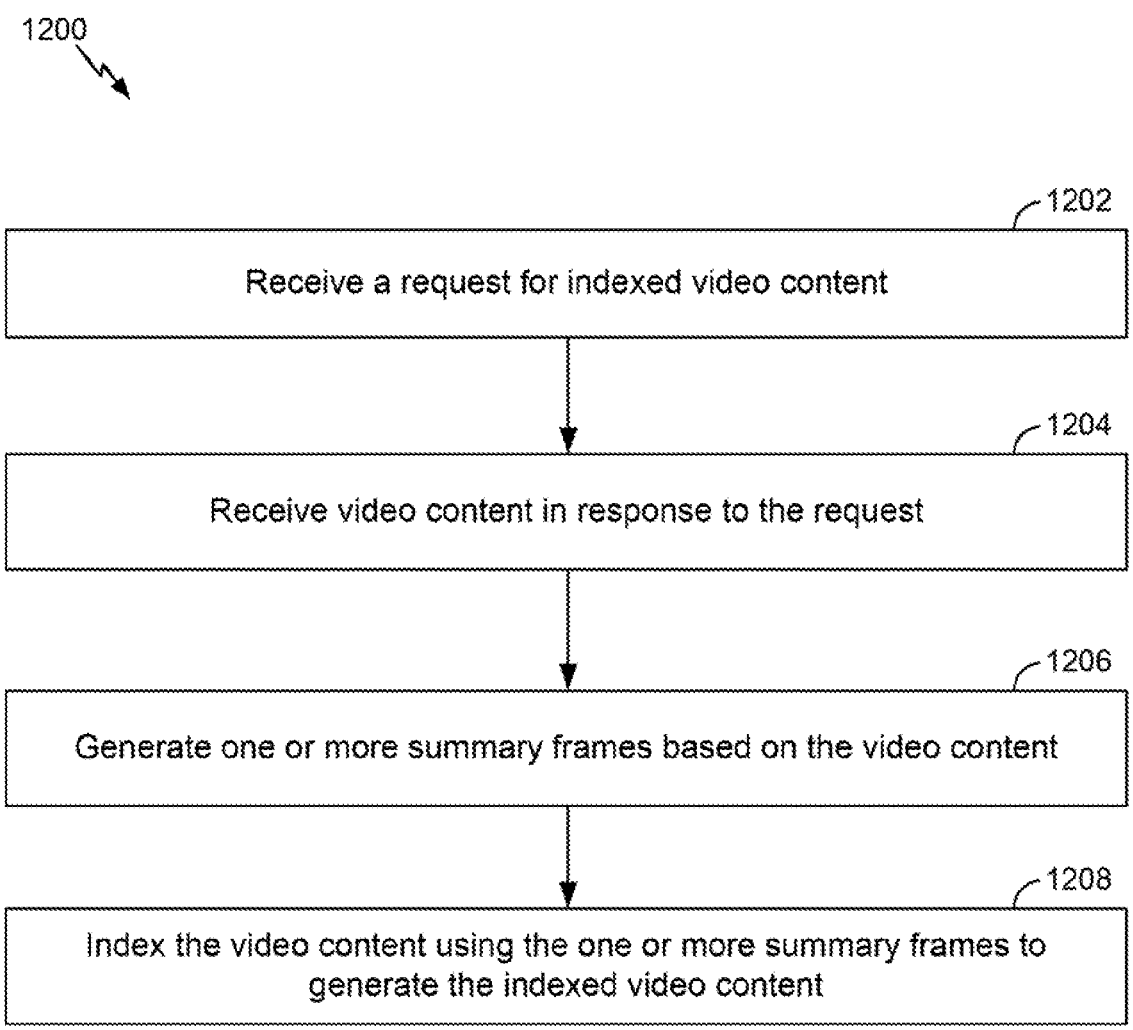
FIG. 12 is a flow diagram of an illustrative example of a method of indexing video content.

Referring to FIG. 12, a flow diagram of an illustrative example of a method 1200 of indexing video content is depicted. The method 1200 may be performed by the device 102 of FIG. 1A, the camera 162 of FIGS. 1B-1C, the video system 502 (e.g., the controller 510, the first camera 530, or the second camera 532), the device 550 of FIG. 5, the device 602 of FIG. 6, or a combination thereof.

The method 1200 may include receiving a request for indexed video content, at 1202. For example, the request may include or correspond to the request 640 of FIG. 6. The video content may include or correspond to the video content 140 (or the video content 114) of FIG. 1A, the video content 167 of FIG. 1B-1C, the image frames 240 of FIG. 2, the video content 534 of FIG. 5, or the video content 614 of FIG. 6.

The method 1200 may also include receiving video content in response to the request, at 1204. For example, the video content may include or correspond to the video content 140 (or the video content 114) of FIG. 1A, the video content 167 of FIG. 1B-1C, the image frames 240 of FIG. 2, the video content 534 of FIG. 5, or the video content 614 of FIG. 6. In some implementations, receiving the video content may include accessing the video content from a memory, such as the memory 612 of FIG. 2.

The method 1200 may further include generating one or more summary frames based on the video content, at 1206. The one or more summary frames may include or correspond to one or more of the summary frames 122, 198, 199 of FIGS. 1A-1C, the summary frame 238 of FIG. 2, the summary frame 522 of FIG. 5, the summary frame 622 of FIG. 6, one or more of the summary frames 704, 712, 713, 722, 726, 731, 741, 761, 766, 767, 772, 783 of FIGS. 7A-7J, or a combination thereof.

The method 1200 may include indexing the video content using the one or more summary frames to generate the indexed video content, at 1208. For example, the indexed video content may include or correspond to the indexed video content 170 of FIGS. 1B-1C, the indexed video content 514 of FIG. 5, or the indexed video content 642 of FIG. 6. The method 1200 thus enables indexing of video content using one or more summary frames.

The methods of FIGS. 3, 4, and 8-12 may be implemented by a field-programmable gate array (FPGA) device, an application-specific integrated circuit (ASIC), a processing unit such as a graphical processing unit (GPU), a central processing unit (CPU), a digital signal processor (DSP), a controller, another hardware device, firmware device, or any combination thereof. As an example, the methods of FIGS. 3, 4, and 8-12 can be performed by one or more processors that execute instructions to detect or track line segments associated with one or more images. As an example, the method 300 of FIG. 3, the method 400 of FIG. 4, the method 800 of FIG. 8, the method 900 of FIG. 9, the method 1000 of FIG. 10, the method 1100 of FIG. 11, the method 1200 of FIG. 12, or a combination thereof, can be performed by one or more processors that execute instructions to generate or communicate a summary frame. To illustrate, a portion of one of the methods of FIG. 3, 4, or 8-12 may be combined with a second portion of one of one of the methods of FIG. 3, 4, or 8-12. Additionally, one or more steps described with reference to one of the methods of FIG. 3, 4, or 8-12 may be optional, may be performed at least partially concurrently, or may be performed in a different order than shown or described.

Figure 13:
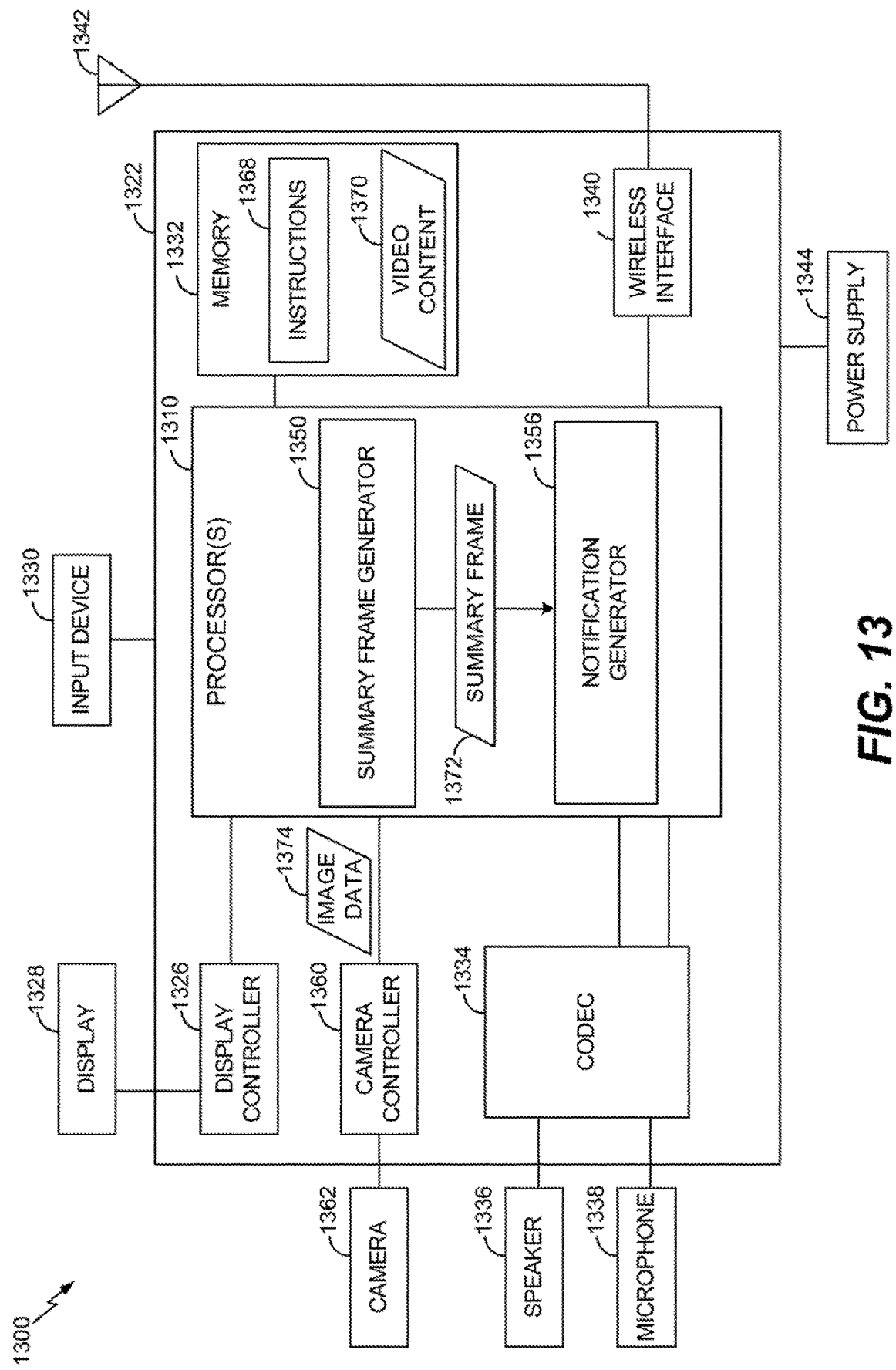
FIG. 13 is a block diagram of a device that is operable to support various aspects of one or more methods, systems, apparatuses, or computer-readable storage devices disclosed herein.

Referring to FIG. 13, a block diagram of a particular illustrative example of an electronic device 1300, such as a wireless communication device, is depicted. The device 1300, or components thereof, may include or correspond to the system 100 (e.g., the device 102) of FIG. 1A, the system 160 (e.g., the camera 162) of FIG. 1B, the system 190 (e.g., the camera 162) of FIG. 1C, the system 200 of FIG. 2, the system 500 (e.g., the controller 510, the first camera 530, the second camera 532, the device 550) of FIG. 5, the system 600 (e.g., the device 602) of FIG. 6, or components thereof.

In some implementations, the device 1300, or components thereof, may be included in, or may be used to implement, a video surveillance system, such as a closed circuit television (CCTV) system. To illustrate, the device 1300 may be a camera device, may include a camera, or may include a video system controller. Additionally or alternatively, the device 1300 may include a playback device, such as computer, a laptop, a mobile device (e.g., a smartphone, a tablet computer, etc.), or a server, as illustrative, non-limiting examples. Additionally or alternatively, the device 1300 may be included in a vehicle, a gaming console, an automotive system console (e.g., ADAS), a wearable device (e.g., a personal mounted camera), a head mounted display (HMD), etc. For example, the device 1300 may be included in a vehicle. Additional examples include, but are not limited to, being included in a robot or a robotic device, an unmanned aerial vehicle (UAV), or a drone. Examples of a vehicle can include a motor vehicle (e.g., a car, a truck, a motorcycle, a bus, or a train), a watercraft (e.g., a ship or a boat), an aircraft (e.g., an airplane or a helicopter), a spacecraft (e.g., a space shuttle), a bicycle, or another vehicle. A vehicle may be a wheeled vehicle, a tracked vehicle, a railed vehicle, an airborne vehicle, or a skied vehicle, as illustrative non-limiting examples. In some cases, a vehicle may be operated by one or more drivers. In other cases, a vehicle may be a computer-controlled vehicle, such as an autonomous vehicle.

The device 1300 includes at least one processor 1310, such as a digital signal processor (DSP), central processing unit (CPU), or a graphical processing unit (GPU), coupled to a memory 1332. The memory 1332 may include or correspond to the memory 112 of FIG. 1A, the memory 166 of FIGS. 1B-1C, the memory 512 of FIG. 5, the memory 612 of FIG. 6, or a combination thereof. The processor 1310 may be configured to process image data 1374 associated with one or more images (e.g., one or more image frames). The image data 1374 may include or correspond to the video content 140 (or the video content 114) of FIG. 1A, the video content 167 of FIG. 1B-1C, the image frames 240 of FIG. 2, the video content 534 of FIG. 5, or the video content 614 of FIG. 6.

The processor 1310 includes a summary frame generator 1350 and a notification generator 1356. The summary frame generator 1350 may include or correspond to the summary frame generator 120 of FIG. 1A, the summary frame generator 180 of FIGS. 1B-1C, the summary frame generator 520 of FIG. 5, the summary frame generator 620 of FIG. 6, or a combination thereof. The notification generator 1356 may include or correspond to the notification generator 126 of FIG. 1A, the notification generator 182 of FIGS. 1B-1C, the notification generator 526 of FIG. 5, or a combination thereof. The summary frame generator 1350 may be configured to process the image data 1374 to generate a summary frame 1372. The summary frame 1372 may include or correspond to one or more of the summary frames 122, 198, 199 of FIGS. 1A-1C, the summary frame 238 of FIG. 2, the summary frame 522 of FIG. 5, the summary frame 622 of FIG. 6, one or more of the summary frames 704, 712, 713, 722, 726, 731, 741, 761, 766, 767, 772, 783 of FIGS. 7A-7J, or a combination thereof. The summary frame generator 1350 may provide the summary frame 1372 to the notification generator 1356. The notification generator 1356 may be configured to generate a notification (e.g., a message) that includes summary frame 1372.

The memory 1332 includes instructions 1368 (e.g., executable instructions), such as computer-readable instructions or processor-readable instructions, and video content 1370. The video content 1370 may include or correspond to the image data 1374. In some implementations, the video content 1370 may include at least a portion of the image data 1374 or an indexed version of the image data 1374. The instructions 1368 may include one or more instructions that are executable by a computer, such as by each of the processor 1310.

To illustrate, the instructions 1368 may be executable by the processor 1310 to cause the processor 1310 to perform operations including detect a motion event period corresponding an event in a portion of video content. The video content including multiple image frames and the portion of the video content includes an object. The operations may further include generating a summary frame associated with the portion of the video content, the summary frame illustrating multiple representations of the object. The operations may further include initiating sending of a notification to a device. The notification may include the summary frame.

As another illustrative, non-limiting example, the instructions 1368 may be executable by the processor 1310 to cause the processor 1310 to perform operations including initiating sending, by a device to a second device, a notification of a motion event detected in a portion of video content. The notification may include a summary frame associated with the portion of the video content. The portion of the video content may include an object. The summary frame may illustrate multiple representations of the object. The operations may further include receiving, at the device, a request from the second device for a video segment associated with the motion event. The operations further include initiating sending of the video segment from the device to the second device.

As another illustrative, non-limiting example, the instructions 1368 may be executable by the processor 1310 to cause the processor 1310 to perform operations including initiating presentation of a graphical user interface (GUI) via a display coupled to the processor. The GUI may include a summary frame associated with a portion of video content. The summary frame may illustrate a first set of representations of an object included in the portion of the video content. The GUI may include textual information based on metadata associated with the summary frame.

As another illustrative, non-limiting example, the instructions 1368 may be executable by the processor 1310 to cause the processor 1310 to perform operations including generating index data for video content. The index data may include a summary frame and metadata. The summary frame may be associated with a portion of the video content and may illustrate multiple representations of an object included in the portion of the video content. The metadata may include marker data that indicates a playback position of the video content. The playback position may be associated with the summary frame.

As another illustrative, non-limiting example, the instructions 1368 may be executable by the processor 1310 to cause the processor 1310 to perform operations including identifying a summary frame included in a notification received from a device. The summary frame may illustrate multiple representations of an object during a motion event associated with video content. The operations may further include generating a request for the video content associated with the motion event and initiating sending the request to the device.

As another illustrative, non-limiting example, the instructions 1368 may be executable by the processor 1310 to cause the processor 1310 to perform operations including presenting a summary frame at a display device. The summary frame may illustrate multiple representations of an object included in a portion of video content. The operations may also include identifying a playback position corresponding to the portion of the video content, the playback position identified based on the summary frame, and initiating playback of the video content at the playback position.

In some implementations, the memory 1332 may include code (e.g., interpreted or complied program instructions) that may be executed by the processor 1310 to cause the processor 1310 to perform functions as described with reference to the summary frame generator 120 of FIG. 1A, the summary frame generator 180 of FIGS. 1B-1C, the summary frame generator 520 of FIG. 5, the summary frame generator 620 of FIG. 6, to perform at least a portion of one or more of the methods FIGS. 3, 4, 8-12, or a combination thereof. To further illustrate, Example 1 below depicts illustrative pseudo-code (e.g., simplified C-code in floating point) that may be compiled and stored in the memory 1332. Example 1 provides a non-linear key frame selection algorithm with predetermined key frame number. The non-linear key frame selection algorithm selects key frames non-linearly according to event analysis result. Using the non-linear key frame selection algorithm of Example 1, more frames are likely to be selected for use in generating a summary frame when an event measurement value from an event analysis is high, and fewer frames are likely to be selected when the event measurement value is low.

EXAMPLE 1

```
accu = threshold           /* Initiate an accumulator value (accu) to he equal to a
                              threshold. Event analysis of frame i is represented as
                              "ea[i]". The threshold can be selected based on total
                              value of ea[i], i from 1 to N, where i corresponds to a
                              frame and is a positive integer, and where N is a positive
                              integer greater than i. */
kfIndex=0                  /*Initiate key frame index value (kfIndex) to be equal to
                              zero*/
For i = 1 to N, i++        /*Loop of N frame of an event recorded in video
                              clip*/
   accu = accu + ea[i]     /*Accumulate event analysis (ea[i]) result of frame i
                              into an accumulator of event measurement */
   IF accu >= threshold    /*If value of the accumulator is greater
                              than or equal to the threshold */
      keyFrame[kfIndex] = i   /*Select frame i as key frame*/
      kfIndex = kfIndex + 1   /*Move on to the next key frame*/
      accu = accu − threshold /*Remove threshold value from the
                                 accumulator*/
   End if
End loop
```

To select a predetermined number key frames, such as M key frames (where M is a positive integer greater than 1), the threshold value may be set according to:

threshold=Sum($ea[i]$)/($M-1$).

Alternatively, to have a dynamically adaptive key frame number, the threshold can be set to a predetermined constant. By setting the threshold to the predetermined constant, a motion event with significant activities may get more key frames and a motion event with little actives may have relatively fewer key frames.

FIG. 13 also shows a display controller 1326 that is coupled to the processor 1310 and to a display 1328. The display 1328 may include or correspond to the user interface 130 of FIG. 1A, the display 556 of FIG. 5, the display 628 of FIG. 6, or the display 702 of FIGS. 7A-7F. A coder/decoder (CODEC) 1334 can also be coupled to the processor 1310. A speaker 1336 and a microphone 1338 can be coupled to the CODEC 1334. The processor 1310 may also be coupled to a camera controller 1360 that is coupled to a camera 1362. The camera 1362 may include or correspond to the capture unit 164 of FIGS. 1B-1C, the first camera 530, or the second camera 532 of FIG. 5. The camera controller 1360 may communicate image data 1374 to the processor 1310. The image data 1374 may be based on one or more images captured by the camera 1362.

The device 1300 may also include a wireless interface 1340, such as a wireless controller, can be coupled to the processor 1310 and to an antenna 1342. In some implementations, the wireless interface 1340 may be coupled to the antenna 1342 via a transceiver (not shown). The transceiver may include a transmitter, a receiver, or both. The transceiver may be configured to transmit one or more messages generated by the device 1300 and to receive one or more messages transmitted to the device 1300 by other devices. For example, the transceiver may be configured to transmit a notification generated by the notification generator 1356, such as a notification that includes the summary frame 1372.

In a particular implementation, the processor 1310, the display controller 1326, the camera controller 1360, the memory 1332, the CODEC 1334, and the wireless interface 1340 are included in a system-in-package or system-on-chip device 1322. In some implementations, an input device 1330 and a power supply 1344 are coupled to the system-on-chip device 1322. Moreover, in some implementations, as illustrated in FIG. 13, the display 1328, the input device 1330, the speaker 1336, the microphone 1338, the antenna 1342, the camera 1362, and the power supply 1344 are external to the system-on-chip device 1322. However, each of the display 1328, the camera 1362, the input device 1330, the speaker 1336, the microphone 1338, the antenna 1342, and the power supply 1344 can be coupled to a component of the system-on-chip device 1322, such as an interface or a controller.

In conjunction with one or more of the described aspects of FIGS. 1-13, a first apparatus is disclosed that may include means for generating a summary frame associated with the portion of the video content, the summary frame illustrating multiple representations of an object included in the portion of the video content. The means for generating the summary frame may include or correspond to the device 102, the processor 118, the summary frame generator 120 of FIG. 1A, the camera 162, the processor 174, the summary frame generator 180 of FIGS. 1B-1C, the background generator 210, the key frame selector 214, the combiner 228 of FIG. 2, the controller 510, the processor 518, the summary frame generator 520, the first camera 530, the second camera 532, the device 550, the processor 558 of FIG. 5, the device 602, the processor 618, the summary frame generator 620 of FIG. 6, the summary frame generator 1350, the processor 1310 programmed to execute the instructions 1368 of FIG. 13, one or more other, structures, devices, or circuits configured to generate the summary frame, or any combination thereof.

The first apparatus may also include means for transmitting a notification to a device, where the notification includes the summary frame. The means for transmitting may include or correspond to the transmitter 132 of FIG. 1A, the transmitter 184 of FIGS. 1B-1C, the transmitter 554 of FIG. 5, the wireless interface 1340 of FIG. 13, a transmitter, a transceiver, one or more other, structures, devices, or circuits configured to transmit the notification, or any combination thereof. The notification may include an email or a short message service (SMS) message, as illustrative, non-limiting examples. In some implementations, the means for generating and the means for transmitting are included in a video surveillance system.

In some implementations means for generating video content may include or correspond to the capture unit 164 of FIGS. 1B-1C, the first camera 530, the second camera 532 of FIG. 5, a camera, an Internet protocol (IP) camera, one or more other, structures, devices, or circuits configured to generate video content, or any combination thereof.

In conjunction with one or more of the described aspects of FIGS. 1-13, a second apparatus is disclosed that may include means for presenting a summary frame. The summary frame may illustrate multiple representations of an object included in a portion of video content. The means for presenting may include or correspond to the device 102, the user interface 130 of FIG. 1A, the device 550, the display 556 of FIG. 5, the device 602, the display 628 of FIG. 6, the display 1328 of FIG. 13, a screen, a display, a monitor, a television, a projector, one or more other, structures, devices, or circuits configured to present the summary frame, or any combination thereof.

The second apparatus may also include means for identifying a playback position corresponding to the portion of the video content. The playback position may be identified based on the summary frame. The means for identifying may include or correspond to the device 102, the processor 118 of FIG. 1A, the processor 174 of FIGS. 1B-1C, the controller 510, the processor 518, the first camera 530, the second camera 532, the device 550, the processor 558 of FIG. 5, the device 602, the processor 618 of FIG. 6, the processor 1310 programmed to execute the instructions 1368 of FIG. 13, one or more other, structures, devices, or circuits configured to generate the summary frame, or any combination thereof.

The second apparatus may also include means for initiating playback of the video content at the playback position. The means for identifying may include or correspond to the device 102, the processor 118, the user interface 130 of FIG. 1A, the processor 174, the receiver 186 of FIGS. 1B-1C, the controller 510, the processor 518, the first camera 530, the second camera 532, the device 550, the display 556, the processor 558, the interface 562 of FIG. 5, the device 602, the processor 618, the display 628, the interface 632 of FIG. 6, the input device 1330, the camera 1336, the speaker 1336, the microphone 1338, the display 1328, the display controller 1326, the processor 1310 programmed to execute the instructions 1368 of FIG. 13, a screen, a display, a monitor, a television, a projector, one or more other, structures, devices, or circuits configured to generate the summary frame, or any combination thereof.

In some implementations, the second apparatus may include means for receiving a selection of the summary frame or at least one representation of the multiple representations. The playback of the video content at the playback position may be initiated based on the selection. The means for receiving may include or correspond to the device 102, the processor 118, the user interface 130 of FIG. 1A, the capture unit 164, the processor 174, the receiver 186 of FIGS. 1B-1C, the controller 510, the processor 518, the first camera 530, the second camera 532, the device 550, the processor 558, the receiver 552, the interface 562, the display 556 of FIG. 5, the device 602, the processor 618, the input device 632, the display 628 of FIG. 6, the input device 1330, the camera 1336, the speaker 1336, the microphone 1338 the processor 1310 programmed to execute the instructions 1368 of FIG. 13, include a mouse, a touch pad, a keyboard, a touch screen, a microphone, a motion sensor, a camera, a display, a wireless receiver, one or more other, structures, devices, or circuits configured to receive the selection, or any combination thereof.

One or more of the disclosed aspects may be implemented in a system or an apparatus, such as the electronic device 1300, that may include a communications device, a fixed location data unit, a mobile location data unit, a mobile phone, a cellular phone, a satellite phone, a computer, a tablet, a portable computer, a display device, a media player, or a desktop computer. Alternatively or additionally, the electronic device 1300 may include a set top box, an entertainment unit, a navigation device, a personal digital assistant (PDA), a monitor, a computer monitor, a television, a tuner, a radio, a satellite radio, a music player, a digital music player, a portable music player, a video player, a digital video player, a digital video disc (DVD) player, a portable digital video player, a satellite, a vehicle, any other device that includes a processor or that stores or retrieves data or computer instructions, or a combination thereof. As another illustrative, non-limiting example, the system or the apparatus may include remote units, such as hand-held personal communication systems (PCS) units, portable data units such as GPS enabled devices, meter reading equipment, or any other device that includes a processor or that stores or retrieves data or computer instructions, or any combination thereof.

Although one or more of FIGS. 1-13 may illustrate systems, apparatuses, or methods according to the teachings of the disclosure, the disclosure is not limited to these illustrated systems, apparatuses, or methods. One or more functions or components of any of FIGS. 1-13 as illustrated or described herein may be combined with one or more other portions of another function or component of FIGS. 1-13. Accordingly, no single example described herein should be construed as limiting and examples of the disclosure may be suitably combined without departing from the teachings of the disclosure.

Those of skill in the art would further appreciate ha the various illustrative logical blocks, configurations, modules, circuits, and algorithm steps described in connection with the aspects disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the examples disclosed herein may be implemented directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient (e.g., non-transitory) storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A device comprising:
a processor configured to generate index data for video content, the index data including a summary frame and metadata, the summary frame associated with a portion of the video content and illustrating multiple representations of an object included in the portion of the video content;
a memory configured to store the index data; and
a display, the display configured to:
present a first timeline corresponding to the video content, the first timeline including a marker corresponding to the summary frame; and
in response to selection of the marker, present the summary frame represented at a first region on the display, the first timeline represented at a second region on the display, and a second timeline represented at a third region on the display offset from the first region, the second timeline corresponding to the portion of the video content, the second timeline having a first time mark linking to a first storage location of the video content associated with a first representation of the multiple representations of the object, the second timeline having a second time mark linking to a second storage location of the video content associated with a second representation of the multiple representations of the object, the first time mark corresponding to a first object representation depicted in the summary frame, and the second time mark corresponding to a second object representation depicted in the summary frame.

2. The device of claim 1, wherein the metadata includes marker data that indicates a playback position of the video content, the playback position associated with the summary frame, wherein the portion of the video content corresponds to a motion event included in the video content, and wherein the playback position corresponds to a beginning of the motion event.

3. The device of claim 1, wherein, in response to selection of the first time mark, the processor is configured to initiate playback of the video content at a position associated with the first representation of the multiple representations.

4. The device of claim 3, wherein the first time mark is associated with a uniform resource locator (URL) that links to the first storage location of the video content.

5. The device of claim 1, wherein, in response to selection of the second time mark, the processor is configured to initiate playback of the video content at a position associated with the second representation of the multiple representations.

6. The device of claim 1, wherein the index data includes a second summary frame associated with a second portion of the video content and illustrates multiple representations of a second object included in the second portion of the video content.

7. The device of claim 6, wherein the first timeline includes a second marker corresponding to the second summary frame.

8. A device comprising:
a display configured to:
present a first timeline corresponding to video content, the first timeline including a marker corresponding to a summary frame, and the summary frame illustrating multiple representations of an object included in a portion of the video content; and
in response to selection of the marker, present the summary frame represented at a first region on the display, the first timeline represented at a second region on the display, and a second timeline represented at a third region on the display offset from the first region, the second timeline corresponding to the portion of the video content, the second timeline having a first time mark linking to a first storage location of the video content associated with a first representation of the multiple representations of the object, the second timeline having a second time mark linking to a second storage location of the video content associated with a second representation of the multiple representations of the object, the first time mark corresponding to a first indicator depicted in the summary frame, and the second time mark corresponding to a second indicator depicted in the summary frame; and a processor configured to identify a playback position corresponding to the portion of the video content, the playback position identified based on user selection of a particular time mark of the second timeline, and to initiate playback of the video content at the playback position.

9. The device of claim 8, wherein the summary frame corresponds to metadata that indicates the playback position, and wherein the processor is configured to identify the playback position based on the metadata.

10. The device of claim 9, wherein the metadata indicates one or more playback positions of the video content, the one or more playback positions included in the portion of the video content, and wherein each of the one or more playback positions corresponds to the summary frame.

11. The device of claim 8, wherein, in response to selection of the first time mark, the processor is configured to initiate the playback of the video content at a position associated with the first representation of the multiple representations.

12. The device of claim 8, wherein the processor is configured to identify the playback position in response to receiving an input, and wherein the input corresponds to a selection to play the portion of the video content that corresponds to the summary frame.

13. The device of claim 12, wherein the input comprises a selection of a representation of the multiple representations, the representation generated based on a frame of the video content, and wherein the playback position corresponds to the frame.

14. The device of claim 8, wherein the display is configured to present a second summary frame based on user selection of a different marker of the first timeline, wherein the second summary frame illustrates multiple representations of a second object included in a second portion of the video content.

15. The device of claim 14, wherein the display is configured to concurrently present the second summary frame and a particular second timeline, the particular second timeline corresponding to the second summary frame.

16. The device of claim 14, wherein the processor is configured to access metadata to identify the playback position, and wherein the metadata includes a primary link corresponding to the playback position associated with the portion of the video content and a secondary link corresponding to a second playback position associated with the second portion of the video content.

17. The device of claim 8, wherein, in response to the playback being initiated by the processor, the display is configured to present the video content starting from the playback position.

18. The device of claim 8, wherein the summary frame illustrates multiple representations of a second object included in a second portion of the video content.

19. The device of claim 8, further comprising a memory configured to store the video content.

20. An apparatus comprising:
a display configured to present at least one graphical user interface (GUI), the at least one GUI including a first timeline corresponding to video content, and, in response to a first selection of a particular marker of at least one marker of the first timeline, present a summary frame represented at a first region of the display, the first timeline represented at a second region on the display, and a second timeline represented at a third region on the display offset from the first region, the second timeline corresponding to a portion of the video content, the summary frame illustrating a first set of representations of an object identified in the portion of the video content, the second timeline having a first time mark linking to a first storage location of the video content associated with a first representation of the first set of representations of the object, the second timeline having a second time mark linking to a second storage location of the video content associated with a second representation of the first set of representations of the object, the first time mark corresponding to a first indicator depicted in the summary frame, and the second time mark corresponding to a second indicator depicted in the summary frame; and a processor electrically coupled to the display and configured to receive a second selection indicating a particular representation of the first set of representations.

21. The apparatus of claim 20, further comprising an input device configured to generate the second selection, and wherein the second selection is included in a request for playback of the video content at a playback position associated with the particular representation.

22. The apparatus of claim 20, wherein the at least one GUI includes textual information based on metadata associated with the summary frame, and wherein the textual information comprises a file name, a summary frame identifier, a motion event date, a motion event start time, a motion event end time, a motion event duration, a camera identifier, a camera location, a weather condition, or any combination thereof.

23. The apparatus of claim 20, wherein the first region is a summary frame GUI window of the at least one GUI that presents the summary frame.

24. The apparatus of claim 23, wherein the summary frame GUI window is further configured to present a second summary frame concurrently with presentation of the summary frame, the second summary frame illustrating a second set of representations of a second object.

25. The apparatus of claim 23, wherein the at least one GUI includes a playback GUI window configured to present a video clip of video content associated with the summary frame.

26. The apparatus of claim 25, wherein the playback GUI window is presented concurrently with the summary frame GUI window.

27. The apparatus of claim 20, wherein, in response to a third selection of the first time mark, the processor is configured to initiate playback of the video content at a position associated with the first representation of the first set of representations.

28. The apparatus of claim 20, wherein the summary frame indicates a time sequence of the first set of representations.

29. An apparatus comprising:
   means for presenting:
      a first timeline corresponding to video content, the first timeline including at least one marker; and
      in response to selection of a particular marker of the at least one marker, a summary frame represented at a first region on the means for presenting, the first timeline represented at a second region on the means for presenting, and a second timeline represented at a third region on the means for presenting offset from the first region, the second timeline corresponding to a portion of the video content, the summary frame illustrating multiple representations of an object included in the portion of the video content, the second timeline having a first time mark linking to a first storage location of the video content associated with a first representation of the multiple representations of the object, the second timeline having a second time mark linking to a second storage location of the video content associated with a second representation of the multiple representations of the object, the first time mark corresponding to a first indicator depicted in the summary frame, and the second time mark corresponding to a second indicator depicted in the summary frame;
   means for identifying a playback position corresponding to the portion of the video content, the playback position identified based on the summary frame; and
   means for initiating playback of the video content at the playback position.

30. The apparatus of claim 29, further comprising means for receiving a selection of the summary frame or at least one representation of the multiple representations, wherein the playback of the video content at the playback position is initiated based on the selection.

31. The device of claim 1, wherein the first region is a first graphical user interface window, and wherein the second region is a second graphical user interface window.

32. The device of claim 1, wherein the first region corresponds to a summary frame region to present the summary frame, and wherein the display is further configured to present a video clip represented at a fourth region on the display.

33. The device of claim 32, wherein the video clip, in response to selection of the first time mark, includes a segment of the video content associated with the first representation of the multiple representations of the object.

34. The device of claim 1, wherein a portion of the metadata that is associated with the summary frame includes marker data that indicates one or more playback positions associated with the summary frame.

35. The device of claim 8, wherein the summary frame is associated with metadata that indicates the playback position.

* * * * *